United States Patent
Wu et al.

(10) Patent No.: US 11,864,003 B2
(45) Date of Patent: Jan. 2, 2024

(54) METHOD AND DEVICE IN COMMUNICATION NODES FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/097,174

(22) Filed: Jan. 13, 2023

(65) Prior Publication Data

US 2023/0156487 A1    May 18, 2023

Related U.S. Application Data

(63) Continuation of application No. 17/384,819, filed on Jul. 26, 2021, now Pat. No. 11,653,226.

(30) Foreign Application Priority Data

| Jul. 30, 2020 | (CN) | 202010748144.0 |
| Aug. 5, 2020 | (CN) | 202010779599.9 |
| Aug. 19, 2020 | (CN) | 202010837358.5 |

(51) Int. Cl.
*H04W 16/28* (2009.01)
*H04L 1/1812* (2023.01)
*H04L 1/1867* (2023.01)
*H04W 4/40* (2018.01)
*H04W 92/18* (2009.01)

(52) U.S. Cl.
CPC .......... *H04W 16/28* (2013.01); *H04L 1/1819* (2013.01); *H04L 1/1893* (2013.01); *H04L 1/1896* (2013.01); *H04W 4/40* (2018.02); *H04W 92/18* (2013.01)

(58) Field of Classification Search
CPC ....... H04W 16/28; H04W 4/40; H04W 92/18; H04L 1/1819; H04L 1/1893; H04L 1/1896
See application file for complete search history.

(56) References Cited

U.S. PATENT DOCUMENTS

| 2017/0041971 A1* | 2/2017 | Kim | H04W 76/14 |
| 2019/0115996 A1* | 4/2019 | Wu | H04L 1/0003 |
| 2019/0342944 A1* | 11/2019 | Chatterjee | H04L 5/0082 |

(Continued)

*Primary Examiner* — Abdullahi Ahmed

(57) ABSTRACT

A method and a device in a node for wireless communications. A first node monitors or drops monitoring a first signal in a first resource block; and transmits a second signal in a second resource block. The second resource block corresponds to a first index; the first resource block is reserved for a HARQ-ACK for a bit block set transmitted in a third resource block; when a first condition set is fulfilled, a spatial relation of the second signal is unrelated to the first index; when the first condition set is unfulfilled, the first index is used for determining the spatial relation of the second signal; the first condition set relates to whether the first signal is conveyed in the first resource block. The method above provides an easy implementation of beamforming in a V2X system, which optimizes gains of beamforming and also prevents complicated signaling interaction.

20 Claims, 10 Drawing Sheets

(56) References Cited

U.S. PATENT DOCUMENTS

| | | | |
|---|---|---|---|
| 2020/0196332 A1* | 6/2020 | Yokomakura | H04L 5/0048 |
| 2021/0250152 A1* | 8/2021 | Zhang | H04B 7/088 |
| 2022/0015085 A1* | 1/2022 | Zhang | H04B 7/0695 |
| 2022/0021495 A1* | 1/2022 | Zhang | H04L 5/0048 |
| 2022/0210811 A1* | 6/2022 | Yeo | H04L 1/1854 |

* cited by examiner

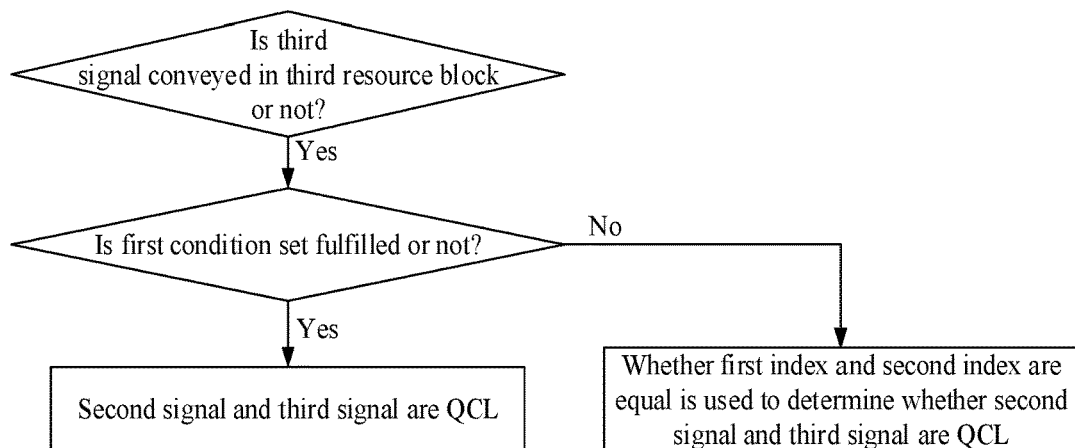
FIG. 12
First condition set { First signal is conveyed in first resource block
First signal indicates whether a bit block set transmitted in third resource block is correctly received
FIG. 13
First condition set { Number of signals comprised by first signal sub-group is greater than first threshold
FIG. 14
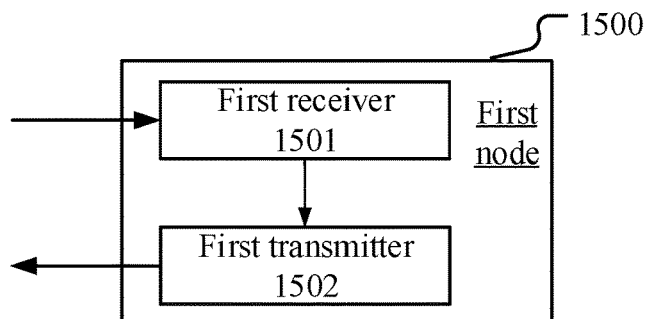
FIG. 15
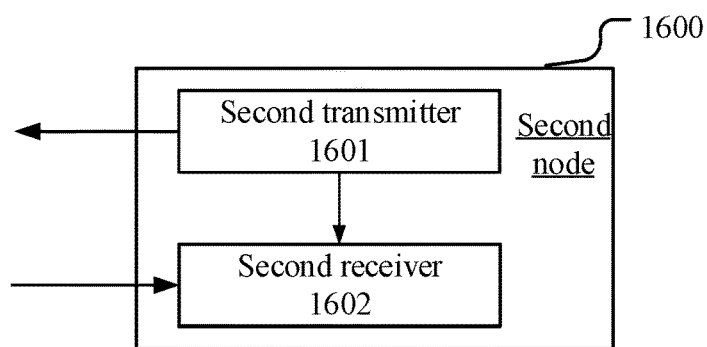
FIG. 16 first power value = min (first reference power value, first power threshold)

FIG. 33 first reference power value ∝ first coefficient × first pathloss

FIG. 34

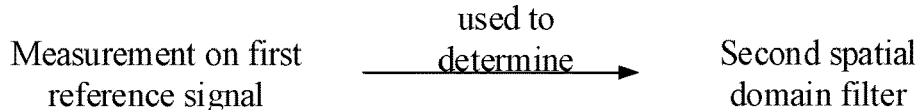

FIG. 35 second power value = min (second reference power value, second power threshold)

FIG. 36 second reference power value ∝ second coefficient × second pathloss

FIG. 37

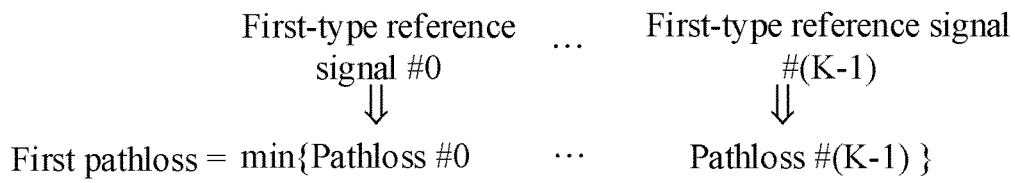

FIG. 38

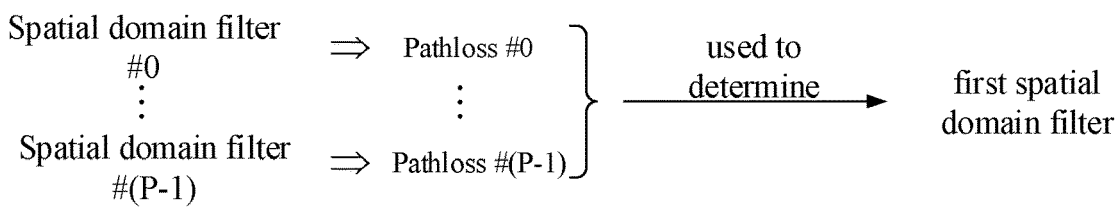

FIG. 39 first power value = min (first reference power value, third reference power value)

FIG. 40 first power value = min (first reference power value, third reference power value, first power threshold)

FIG. 41 first power value = min (first reference power value, third reference power value, first power threshold, third power threshold)

FIG. 42 third reference power value ∝ third coefficient × third pathloss

FIG. 43

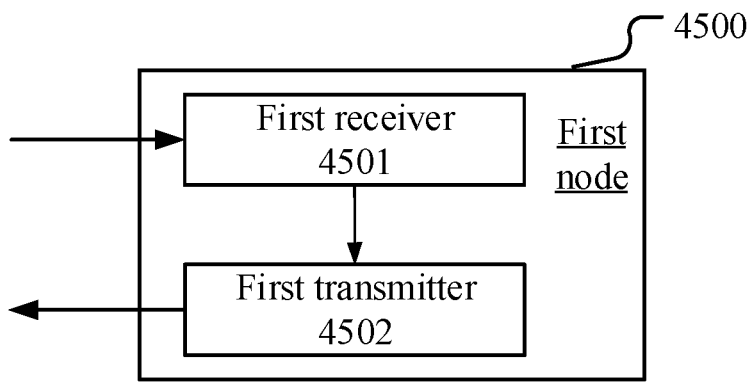
FIG. 44
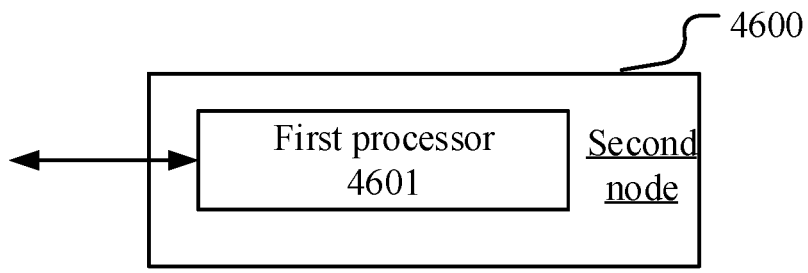
FIG. 45
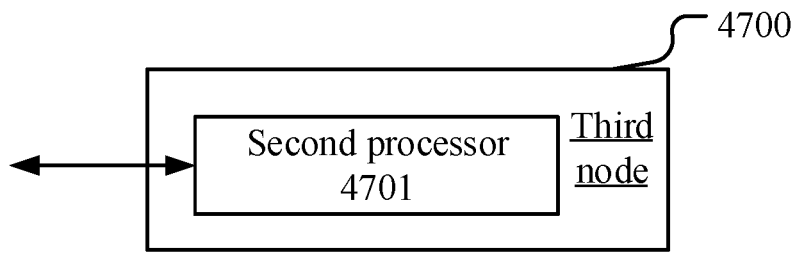
FIG. 46
FIG. 47

METHOD AND DEVICE IN COMMUNICATION NODES FOR WIRELESS COMMUNICATION

CROSS REFERENCE TO RELATED APPLICATIONS

This application is a continuation of the U.S. patent application Ser. No. 17/384,819, filed on Jul. 26, 2021, which claims the priority benefit of Chinese Patent Application No. 202010748144.0, filed on 30 Jul. 2020, and the priority benefit of Chinese Patent Application No. 202010779599.9, filed on 5 Aug. 2020, and the priority benefit of Chinese Patent Application No. 202010837358.5, filed on 19 Aug. 2020, the full disclosure of which is incorporated herein by reference.

BACKGROUND

Technical Field

The present disclosure relates to transmission methods and devices in wireless communication systems, and in particular to a method and device of sidelink-related transmission in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was started.

SUMMARY

A WI of NR R (release) 17 was approved at the 3GPP RAN #86 Plenary, including reference by the V2X system under FR2 band. In the FR2 band, there are two important means of guaranteeing performance, namely, massive MIMO and beam-based transmission. Multiple antennas form a narrow beam through beamforming, so that energy can be concentrated in a specific direction, thus enhancing the communication quality. Since the way of V2X resource occupation differs a lot from a Uu interface, the commonly used scheme of beam management or transmission for the Uu interface cannot be directly applied in the V2X system. To sum up, it is necessary to find out how to support beamforming in the V2X system, in view of that, the present disclosure disclosed a solution. It should be noted that although only V2X and beamforming-based transmission scenarios were stated above for example, this disclosure is also applicable to other scenarios such as cellular network and precoding-based transmissions, where similar technical effects can be achieved. Additionally, the adoption of a unified solution for various scenarios (including but not limited to V2X, cellular network, beamforming-based and precoding-based transmissions) contributes to the reduction of hardcore complexity and costs. If no conflict is incurred, the embodiments of a first node in the present disclosure and the characteristics of the embodiments can be applied to a second node, and vice versa. And the embodiments in the present disclosure and the characteristics of the embodiments can be arbitrarily combined if there is no conflict.

To ensure beam alignment between both sides of communication, the concept of beam management and beam-based channel measurement/feedback was introduced in NR R15 and R16. Resource occupation and Channel State Information (CSI) reporting in V2X are implemented quite differently from Uu interface, so the scheme of beam management generally used on the Uu interface is not directly applicable to the V2X system. Therefore, how to conduct beam management in the V2X system needs to be addressed, and for that, the present disclosure provides a solution. It should be noted that although only V2X and beamforming-based transmission scenarios were stated above for example, this disclosure is also applicable to other scenarios such as cellular network and precoding-based transmissions, where similar technical effects can be achieved. Additionally, the adoption of a unified solution for various scenarios (including but not limited to V2X, cellular network, beamforming-based and precoding-based transmissions) contributes to the reduction of hardcore complexity and costs. If no conflict is incurred, the embodiments of a first node in the present disclosure and the characteristics of the embodiments can be applied to a second node, and vice versa. And the embodiments in the present disclosure and the characteristics of the embodiments can be arbitrarily combined if there is no conflict.

Compared with the existing Long-term Evolution (LTE) V2X system, an NR V2X system has a distinctive feature of supporting unicast transmission and power control based on sidelink pathloss. Based on the conclusion drawn at the 3GPP RAN1 #97 conference, when a node is simultaneously configured with downlink pathloss-based power control and sidelink pathloss-based power control, the node will choose a smaller value of power values respectively acquired through the two methods. A significant technical feature of an NR system is support for beam-based transmission. Due to the beam directivity, how a node interferes with other nodes is highly dependent on the beam adopted. Therefore, how to control the interference to the cellular network in a beam-based V2X transmission becomes an issue, for which the present disclosure provides a solution. It should be noted that although only V2X and beam-based transmission scenarios were stated above for example, this disclosure is also applicable to other scenarios such as cellular network and non-beam transmissions, where similar technical effects can be achieved. Additionally, the adoption of a unified solution for various scenarios (including but not limited to V2X, cellular network, beam-based and non-beam transmissions) contributes to the reduction of hardcore complexity and costs. If no conflict is incurred, the embodiments of any node in the present disclosure and the characteristics of the embodiments can be applied to any other node, and vice versa. And the embodiments in the present disclosure and the characteristics of the embodiments can be arbitrarily combined if there is no conflict.

The present disclosure provides a method in a first node for wireless communication, comprising:
monitoring a first signal in a first resource block, or, dropping monitoring a first signal in a first resource block; and
transmitting a second signal in a second resource block;
herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, a problem to be solved in the present disclosure includes how a transmitting end chooses a Tx beam in a V2X system. As proposed by the above method, a Tx beam is determined through HARQ feedback, hence a solution to this problem.

In one embodiment, characteristics of the above method include: if a signal transmitted by a beam can be received correctly, the transmitting end will continue to use that beam; otherwise, the transmitting end will resort to beam switching or beam sweeping.

In one embodiment, advantages of the above method include offering a simple way of implementing beam-based transmission in the V2X system.

In one embodiment, advantages of the above method include: selecting a beam according to the actual transmission quality helps improve the transmission performance and prevent complicated signaling interaction and excessive overhead produced therefrom.

According to one aspect of the present disclosure, comprising:
transmitting a first information block;
herein, the second resource block and the third resource block are respectively resource blocks of K resource blocks, K being a positive integer greater than 1; the first information block is used to determine the K resource blocks and K indexes, the K indexes respectively corresponding to the K resource blocks; any index of the K indexes is a non-negative integer; and the first index is one of the K indexes that corresponds to the second resource block.

In one embodiment, advantages of the above method include: by adopting the technique of beam sweeping in reserved resources, the reliability of data transmission can be increased.

According to one aspect of the present disclosure, comprising: transmitting a third signal in the third resource block, or, dropping transmission of any signal in the third resource block;
herein, the third signal carries a first bit block set, while the first signal carries a HARQ-ACK for the first bit block set.

According to one aspect of the present disclosure, characterized in that the third resource block corresponds to a second index; the first index and the second index are respectively used to determine a first reference signal and a second reference signal; when the first condition set is not fulfilled, the first reference signal is used to determine the spatial relation of the second signal; when the first condition set is fulfilled, the second reference signal is used to determine the spatial relation of the second signal.

In one embodiment, advantages of the above method include: a switch between beam sweeping and a specific beam according to an actual received quality can optimize the gains of beamforming and avoid complicated signaling interaction and extra overhead that may accompany.

According to one aspect of the present disclosure, characterized in that the third resource block corresponds to a second index; when the first condition set is fulfilled and the third signal is conveyed in the third resource block, the second signal and the third signal are QCL; when the first condition set is not fulfilled and the third signal is conveyed in the third resource block, whether the first index is equal to the second index is used to determine whether the second signal and the third signal are QCL.

According to one aspect of the present disclosure, characterized in that the first condition set comprises the first signal being conveyed in the first resource block and the first signal indicating that a bit block set transmitted in the third resource block is correctly received.

According to one aspect of the present disclosure, characterized in that the first node is a UE.

According to one aspect of the present disclosure, characterized in that the first node is a relay node.

The present disclosure provides a method in a second node for wireless communication, comprising: transmitting a first signal in a first resource block, or, dropping transmission of any signal in the first resource block; and
receiving a second signal in a second resource block;
herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

According to one aspect of the present disclosure, comprising:
receiving a first information block;
herein, the second resource block and the third resource block are respectively resource blocks of K resource blocks, K being a positive integer greater than 1; the first information block is used to determine the K resource blocks and K indexes, the K indexes respectively corresponding to the K resource blocks; any index of the K indexes is a non-negative integer; and the first index is one of the K indexes that corresponds to the second resource block.

According to one aspect of the present disclosure, comprising:
blind detecting a third signal in the third resource block;
herein, the third signal carries a first bit block set, while the first signal carries a HARQ-ACK for the first bit block set.

According to one aspect of the present disclosure, characterized in that the third resource block corresponds to a second index; the first index and the second index are respectively used to determine a first reference signal and a second reference signal; when the first condition set is not fulfilled, the first reference signal is used to determine the spatial relation of the second signal; when the first condition set is fulfilled, the second reference signal is used to determine the spatial relation of the second signal.

According to one aspect of the present disclosure, characterized in that the third resource block corresponds to a second index; when the first condition set is fulfilled and the third signal is conveyed in the third resource block, the second signal and the third signal are QCL; when the first condition set is not fulfilled and the third signal is conveyed in the third resource block, whether the first index is equal to the second index is used to determine whether the second signal and the third signal are QCL.

According to one aspect of the present disclosure, characterized in that the first condition set comprises the first signal being conveyed in the first resource block and the first signal indicating that a bit block set transmitted in the third resource block is correctly received.

The present disclosure provides a first node for wireless communication, comprising:
- a first receiver, which monitors a first signal in a first resource block, or, drops monitoring a first signal in a first resource block; and
- a first transmitter, which transmits a second signal in a second resource block;
- herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

The present disclosure provides a second node for wireless communication, comprising:
- a second transmitter, which transmits a first signal in a first resource block, or, drops transmission of any signal in a first resource block; and
- a second receiver, which receives a second signal in a second resource block;
- herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

The present disclosure provides a method in a first node for wireless communication, comprising:
- transmitting a first signal set;
- herein, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is capable of triggering a second CSI report in the first time window; when the first condition set is fulfilled, the first node is unable to trigger the second CSI report in the first time window; when the first condition set is not fulfilled, the first node is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, a problem to be solved in the present disclosure includes how to perform beam management and beam-based CSI measurement/reporting in a V2X system. The method given above allows a User to trigger multiple CSI reports in a time window and then sends multiple reference signals to enable a receiving user to choose a Transmitting (Tx) or Receiving (Rx) beam, thus addressing the problem.

In one embodiment, characteristics of the above method include: the first CSI report and the second CSI report correspond to a same reference signal used for channel measurement, and the first node can transmit the reference signal repeatedly in the first time window to make it easier for a receiving user to select a Rx beam.

In one embodiment, characteristics of the above method include: the first CSI report and the second CSI report correspond to two different reference signals used for channel measurement, and the first node can transmit the two different reference signals respectively in the first time window to make it easier for a receiving user to select a transmitting (Tx) beam.

In one embodiment, advantages of the above method include: using a simple way of implementing beam management and beam-based CSI measurement/reporting in a V2X system.

In one embodiment, advantages of the above method include: reducing the latency in beam management, thus improving efficiency.

According to one aspect of the present disclosure, characterized in that the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

According to one aspect of the present disclosure, characterized in that time-domain resources occupied by the S signals are respectively used for determining S time windows, and the S time windows are used for determining the first time window.

According to one aspect of the present disclosure, comprising:
- receiving a first information block;
- herein, the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first channel quality and the second quality being real numbers respectively, the first received quality being unequal to the second received quality.

According to one aspect of the present disclosure, comprising:
transmitting a third signal in a first time-frequency resource block;
herein, a target receiver of the third signal is a target receiver of the first signal set; a target channel quality is used for determining a Modulation and Coding Scheme (MCS) employed by the third signal, and the target channel quality is either the first channel quality or the second channel quality; whether the first time-frequency resource block is reserved is used for determining the target channel quality between the first channel quality and the second channel quality.

In one embodiment, characteristics of the above method include: the first node can determine whether a target receiver of the third signal is capable of receiving the third signal with a best Rx beam based on whether the first time-frequency resource block is reserved and determine a suitable MCS for the third signal accordingly.

In one embodiment, advantages of the above method include: improving the efficiency and reliability of V2X transmission.

According to one aspect of the present disclosure, comprising:
transmitting a second information block;
herein, the second information block comprises configuration information of the first reference signal and a first parameter, the first parameter being used to determine the first time window.

According to one aspect of the present disclosure, characterized in that the first node is a UE.

According to one aspect of the present disclosure, characterized in that the first node is a relay node.

The present disclosure provides a method in a second node for wireless communication, comprising:
receiving a first signal set;
herein, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is capable of triggering a second CSI report in the first time window; when the first condition set is fulfilled, the transmitter of the first signal set is unable to trigger the second CSI report in the first time window; when the first condition set is not fulfilled, the transmitter of the first signal set is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

According to one aspect of the present disclosure, characterized in that the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

According to one aspect of the present disclosure, characterized in that time-domain resources occupied by the S signals are respectively used for determining S time windows, and the S time windows are used for determining the first time window.

According to one aspect of the present disclosure, comprising:
transmitting a first information block;
herein, the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first channel quality and the second quality being real numbers respectively, the first received quality being unequal to the second received quality.

According to one aspect of the present disclosure, comprising:
receiving a third signal in a first time-frequency resource block;
herein, a transmitter of the third signal is a transmitter of the first signal set; a target channel quality is used for determining an MCS of the third signal, and the target channel quality is either the first channel quality or the second channel quality; whether the first time-frequency resource block is reserved is used for determining the target channel quality between the first channel quality and the second channel quality.

According to one aspect of the present disclosure, comprising:
receiving a second information block;
herein, the second information block comprises configuration information of the first reference signal and a first parameter, the first parameter being used to determine the first time window.

According to one aspect of the present disclosure, characterized in that the second node is a base station.

According to one aspect of the present disclosure, characterized in that the second node is a relay node.

The present disclosure provides a first node for wireless communication, comprising:
a first processor, transmitting a first signal set;
herein, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is capable of triggering a second CSI report in the first time window; when the first condition set is fulfilled, the first node is unable to trigger the second CSI report in the first time window; when the first condition set is not fulfilled, the first node is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

The present disclosure provides a second node for wireless communication, comprising:

the second processor, receiving a first signal set;
herein, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is capable of triggering a second CSI report in the first time window; when the first condition set is fulfilled, the transmitter of the first signal set is unable to trigger the second CSI report in the first time window; when the first condition set is not fulfilled, the transmitter of the first signal set is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

The present disclosure provides a method in a first node for wireless communication, comprising:

receiving a first reference signal; and
transmitting a first signal;
herein, a transmitting (Tx) power of the first signal is a first power value, a first reference power value is used for determining the first power value, and the first reference power value is linear with a first pathloss; a first spatial domain filter is used for transmitting the first signal; the first node uses the first spatial domain filter to measure the first reference signal to obtain the first pathloss; a transmitter of the first reference signal is different from a target receiver of the first signal.

In one embodiment, a problem to be solved in the present disclosure includes how to precisely estimate and control the interference with the cellular network when beam-based transmission is adopted in the V2X system. As described in the above-mentioned method, a spatial domain filter used for sidelink transmission is adopted to receive a DL reference signal and estimate DL pathloss, thus solving the problem.

In one embodiment, characteristics of the above method include: the first reference signal is a downlink reference signal, and the first signal is transmitted in sidelink; a spatial domain Tx filter of the first signal is used for receiving the first reference signal and estimating a downlink (DL) pathloss for power control of sidelink transmission.

In one embodiment, advantages of the above method include: by using a spatial domain filter matching with a Tx beam of the first signal to measure DL pathloss, it would be more accurate to estimate the interference of sidelink transmission to a cellular network; it can thus avoid a degradation of sidelink performance due to restrictions over the sidelink transmitting power caused by overestimation of such interference.

According to one aspect of the present disclosure, characterized in that a measurement on the first reference signal is used for determining a second spatial domain filter, the first spatial domain filter being different from the second spatial domain filter.

According to one aspect of the present disclosure, comprising:

transmitting a second signal;
herein, a transmitting (Tx) power of the second signal is a second power value, the second reference power value is used for determining the second power value, and the second reference power value is linear with a second pathloss; the first node uses a second spatial domain filter to measure the first reference signal to obtain the second pathloss; a transmitter of the first reference signal is the same as a target receiver of the second signal.

According to one aspect of the present disclosure, comprising:

receiving other reference signal(s) of K first-type reference signals other than the first reference signal, K being a positive integer greater than 1, the first reference signal being one of the K first-type reference signals;
herein, the first node uses the first spatial domain filter to measure the K first-type reference signals respectively to obtain K pathlosses; the first pathloss is a smallest one of the K pathlosses; a transmitter of any first-type reference signal of the K first-type reference signals is a transmitter of the first reference signal.

In one embodiment, advantages of the above method include: when working in a multi-Transmitter-Receiver-Point (multi-TRP)/panel mode, a base station succeeds in controlling the interference of V2X transmission to each TRP/panel effectively.

According to one aspect of the present disclosure, characterized in that the first spatial domain filter is one of P spatial domain filters, P being a positive integer; the first node uses the P spatial domain filters to measure the first reference signal respectively to obtain P pathlosses, and the P pathlosses are used for determining the first spatial domain filter out of the P spatial domain filters.

In one embodiment, advantages of the above method include: with a balance between the V2X transmitting power and beam gains, the V2X transmission quality can be optimized to the largest extent.

According to one aspect of the present disclosure, comprising:

receiving a third signal;
herein, the third signal is used to determine a third pathloss; the first reference power value and a third reference power value are jointly used for determining the first power value, the third reference power value being linear with the third pathloss; a transmitter of the third signal is different from a transmitter of the first reference signal.

According to one aspect of the present disclosure, comprising:

receiving a first information block;
herein, the first information block is used for determining configuration information of the first reference signal.

According to one aspect of the present disclosure, characterized in that the first node is a UE.

According to one aspect of the present disclosure, characterized in that the first node is a relay node.

The present disclosure provides a method in a second node for wireless communication, comprising:

transmitting a first reference signal;
herein, a transmitter of a first signal uses a first spatial domain filter to measure the first reference signal to obtain a first pathloss; a transmitting (Tx) power of the first signal is a first power value, a first reference power value is used for determining the first power value, and the first reference power value is linear with the first pathloss; the first spatial domain filter is used for transmitting the first signal; a target receiver of the first signal is different from the second node.

According to one aspect of the present disclosure, characterized in that a measurement on the first reference signal is used for determining a second spatial domain filter, the first spatial domain filter being different from the second spatial domain filter.

According to one aspect of the present disclosure, comprising:
receiving a second signal;
herein, a transmitting (Tx) power of the second signal is a second power value, the second reference power value is used for determining the second power value, and the second reference power value is linear with a second pathloss; a transmitter of the first signal uses a second spatial domain filter to measure the first reference signal to obtain the second pathloss; a target receiver of the second signal is the second node.

According to one aspect of the present disclosure, comprising:
transmitting other reference signal(s) of K first-type reference signals other than the first reference signal, K being a positive integer greater than 1, the first reference signal being one of the K first-type reference signals;
herein, a transmitter of the first signal uses the first spatial domain filter to measure the K first-type reference signals respectively to obtain K pathlosses; the first pathloss is a smallest one of the K pathlosses.

According to one aspect of the present disclosure, characterized in that the first spatial domain filter is one of P spatial domain filters, P being a positive integer; a transmitter of the first signal uses the P spatial domain filters to measure the first reference signal respectively to obtain P pathlosses, and the P pathlosses are used for determining the first spatial domain filter out of the P spatial domain filters.

According to one aspect of the present disclosure, characterized in that a third signal is used to determine a third pathloss; the first reference power value and a third reference power value are jointly used for determining the first power value, the third reference power value being linear with the third pathloss; a transmitter of the third signal is different from the second node.

According to one aspect of the present disclosure, comprising:
transmitting a first information block;
herein, the first information block is used for determining configuration information of the first reference signal.

According to one aspect of the present disclosure, characterized in that the second node is a base station.

According to one aspect of the present disclosure, characterized in that the second node is a relay node.

The present disclosure provides a method in a third node for wireless communication, comprising:
receiving a first signal;
herein, a Tx power of the first signal is a first power value, a first reference power value is used for determining the first power value, and the first reference power value is linear with a first pathloss; a first spatial domain filter is used for transmitting the first signal; a transmitter of the first signal uses the first spatial domain filter to measure a first reference signal to obtain the first pathloss; a transmitter of the first reference signal is different from the third node.

According to one aspect of the present disclosure, characterized in that a measurement on the first reference signal is used for determining a second spatial domain filter, the first spatial domain filter being different from the second spatial domain filter.

According to one aspect of the present disclosure, characterized in that a transmitter of the first signal transmits a second signal, and a target receiver of the second signal is the same as a transmitter of the first reference signal; a Tx power of the second signal is a second power value, the second reference power value is used for determining the second power value, and the second reference power value is linear with a second pathloss; a transmitter of the first signal uses a second spatial domain filter to measure the first reference signal to obtain the second pathloss.

According to one aspect of the present disclosure, characterized in that the first reference signal is one of K first-type reference signals, K being a positive integer greater than 1; a transmitter of the first signal uses the first spatial domain filter to measure the K first-type reference signals respectively to obtain K pathlosses; the first pathloss is a smallest one of the K pathlosses; a transmitter of any first-type reference signal of the K first-type reference signals is a transmitter of the first reference signal.

According to one aspect of the present disclosure, characterized in that the first spatial domain filter is one of P spatial domain filters, P being a positive integer; a transmitter of the first signal uses the P spatial domain filters to measure the first reference signal respectively to obtain P pathlosses, and the P pathlosses are used for determining the first spatial domain filter out of the P spatial domain filters.

According to one aspect of the present disclosure, characterized in that a third signal is used by a transmitter of the first signal for determining a third pathloss; the first reference power value and a third reference power value are jointly used for determining the first power value, the third reference power value being linear with the third pathloss; a transmitter of the third signal is different from a transmitter of the first reference signal.

According to one aspect of the present disclosure, characterized in that the third node is a UE.

According to one aspect of the present disclosure, characterized in that the third node is a relay node.

The present disclosure provides a first node for wireless communication, comprising:
a first receiver, receiving a first reference signal; and
a first transmitter, transmitting a first signal;
herein, a transmitting (Tx) power of the first signal is a first power value, a first reference power value is used for determining the first power value, and the first reference power value is linear with a first pathloss; a first spatial domain filter is used for transmitting the first signal; the first node uses the first spatial domain filter to measure the first reference signal to obtain the first pathloss; a transmitter of the first reference signal is different from a target receiver of the first signal.

The present disclosure provides a second node for wireless communication, comprising:
a first processor, transmitting a first reference signal;
herein, a transmitter of a first signal uses a first spatial domain filter to measure the first reference signal to obtain a first pathloss; a transmitting (Tx) power of the first signal is a first power value, a first reference power value is used for determining the first power value, and the first reference power value is linear with the first pathloss; the first spatial domain filter is used for transmitting the first signal; a target receiver of the first signal is different from the second node.

The present disclosure provides a third node for wireless communication, comprising:

a second processor, receiving a first signal;

herein, a Tx power of the first signal is a first power value, a first reference power value is used for determining the first power value, and the first reference power value is linear with a first pathloss; a first spatial domain filter is used for transmitting the first signal; a transmitter of the first signal uses the first spatial domain filter to measure a first reference signal to obtain the first pathloss; a transmitter of the first reference signal is different from the third node.

In one embodiment, the present disclosure has the following advantages compared with the prior art:

Providing a simple way of realizing beamforming-based transmission in the V2X system.

By switching between beam sweeping and a specific beam according to an actual received quality, not only gains from beamforming can be optimized, but the complicated signaling interaction and extra overhead brought about by it can be avoided.

In one embodiment, the present disclosure has the following advantages compared with the prior art: Providing a simple way of realizing beam management and beam-based CSI measurement/reporting in the V2X system.

Reducing the latency in beam management, thus enhancing the efficiency.

In one embodiment, the present disclosure has the following advantages compared with the prior art:

When adopting beam-based transmission in sidelink, a more accurate estimation about the interference of sidelink transmission with the cellular network can be made; thus avoiding a reduced sidelink performance resulting from overestimated interference of the sidelink to the cellular network.

BRIEF DESCRIPTION OF THE DRAWINGS

Other features, objects and advantages of the present disclosure will become more apparent from the detailed description of non-restrictive embodiments taken in conjunction with the following drawings:

FIG. 12 illustrates a schematic diagram of a spatial relation between a first condition set and a second signal according to one embodiment of the present disclosure.

FIG. 13 illustrates a schematic diagram of a first condition set according to one embodiment of the present disclosure.

FIG. 14 illustrates a schematic diagram of a first condition set according to one embodiment of the present disclosure.

FIG. 15 illustrates a structure block diagram of a processing device in a first node according to one embodiment of the present disclosure.

FIG. 16 illustrates a structure block diagram of a processing device in a second node according to one embodiment of the present disclosure.

FIG. 33 illustrates a schematic diagram of a first power value according to one embodiment of the present disclosure.

FIG. 34 illustrates a schematic diagram of a first reference power value according to one embodiment of the present disclosure.

FIG. 35 illustrates a schematic diagram of a second spatial domain filter according to one embodiment of the present disclosure.

FIG. 36 illustrates a schematic diagram of a second power value according to one embodiment of the present disclosure.

FIG. 37 illustrates a schematic diagram of a second reference power value according to one embodiment of the present disclosure.

FIG. 38 illustrates a schematic diagram of a relation between a first pathloss and K pathlosses according to one embodiment of the present disclosure.

FIG. 39 illustrates a schematic diagram of a relation between a first spatial domain filter and P spatial domain filters according to one embodiment of the present disclosure.

FIG. 40 illustrates a schematic diagram of a first power value according to one embodiment of the present disclosure.

FIG. 41 illustrates a schematic diagram of a first power value according to one embodiment of the present disclosure.

FIG. 42 illustrates a schematic diagram of a first power value according to one embodiment of the present disclosure.

FIG. 43 illustrates a schematic diagram of a third reference power value according to one embodiment of the present disclosure.

FIG. 44 illustrates a schematic diagram of a first information block according to one embodiment of the present disclosure.

FIG. 45 illustrates a structure block diagram of a processing device in a first node according to one embodiment of the present disclosure.

FIG. 46 illustrates a structure block diagram of a processing device in a second node according to one embodiment of the present disclosure.

FIG. 47 illustrates a structure block diagram of a processing device in a third node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
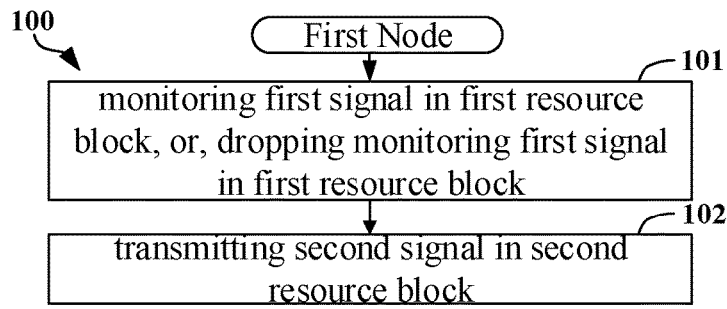
FIG. 1 illustrates a flowchart of a first signal and a second signal according to one embodiment of the present disclosure.

Embodiment 1 illustrates a flowchart of a first signal and a second signal according to one embodiment of the present disclosure, as shown in FIG. 1. In 100 illustrated by FIG. 1, each box represents a step. It should be particularly stressed that the sequence of steps arranged in the figure does not necessarily represent a chronological order of the steps respectively marked by these boxes.

In Embodiment 1, the first node in the present disclosure monitors a first signal in a first resource block, or, drops monitoring the first signal in the first resource block in step 101; and transmits a second signal in a second resource block in step 102. Herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first resource block comprises a time-domain resource and a frequency-domain resource.

In one embodiment, the first resource block comprises a time-domain resource, a frequency-domain resource and a code-domain resource.

In one embodiment, the code-domain resource comprises one or more than one kind of pseudo-random sequences, low-Peak-to-Average Power Ratio (low-PAPR) sequences, cyclic shift, Orthogonal Cover Code (OCC), orthogonal sequence, frequency-domain orthogonal sequence or time-domain orthogonal sequence.

In one embodiment, the code-domain resource comprises a cyclic shift pair.

In one embodiment, the first resource block is reserved for a Physical Sidelink Feedback Channel (PSFCH).

In one embodiment, the first resource block is reserved for the first signal.

In one embodiment, the second resource block comprises a time-domain resource and a frequency-domain resource.

In one embodiment, the second resource block comprises a time-domain resource, a frequency-domain resource and a code-domain resource.

In one embodiment, the second resource block is reserved for sidelink transmission.

In one embodiment, the third resource block comprises a time-domain resource and a frequency-domain resource.

In one embodiment, the third resource block comprises a time-domain resource, a frequency-domain resource and a code-domain resource.

In one embodiment, the third resource block is reserved for sidelink transmission.

In one embodiment, the first resource block and the second resource block are orthogonal in time domain.

In one embodiment, the first resource block is earlier than the second resource block in time domain.

In one embodiment, a time interval between the second resource block and the first resource block is no smaller than a second time interval.

In one embodiment, the second time interval is a non-negative integer.

In one embodiment, the second time interval is measured in slots.

In one embodiment, the second time interval is measured in multicarrier symbols.

In one embodiment, the second time interval is pre-configured.

In one embodiment, the second time interval is configured by an RRC signaling.

In one embodiment, the first resource block and the second resource block belong to a same serving cell in frequency domain.

In one embodiment, the first resource block and the second resource block belong to a same Bandwidth Part (BWP) in frequency domain.

In one embodiment, the second resource block and the third resource block are orthogonal in time domain.

In one embodiment, the first resource block and the third resource block are orthogonal in time domain.

In one embodiment, the third resource block is earlier than the first resource block in time domain.

In one embodiment, the first resource block and the third resource block belong to a same serving cell in frequency domain.

In one embodiment, the first resource block and the third resource block belong to a same BWP in frequency domain.

In one embodiment, the first signal comprises a radio signal.

In one embodiment, the first signal comprises a radio frequency (RF) signal.

In one embodiment, the first signal comprises a baseband signal.

In one embodiment, the first signal carries a Hybrid Automatic Repeat request-Acknowledgement (HARQ-ACK).

In one embodiment, the first signal carries CSI.

In one embodiment, the first signal is transmitted through Unicast.

In one embodiment, the first signal is transmitted through Groupcast.

In one embodiment, the first signal is transmitted through Broadcast.

In one embodiment, the first signal is transmitted in SideLink.

In one embodiment, the first signal is transmitted via a PC5 interface.

In one embodiment, the monitoring refers to blind decoding, namely, receiving a signal and operating decoding; if the decoding is determined to be correct according to a Cyclic Redundancy Check (CRC) bit, it is determined that the first signal is detected; or if the decoding is determined to be incorrect according to the CRC bit, it is determined that the first signal is not detected.

In one embodiment, the monitoring refers to reception based on coherent detection, namely, performing coherent reception and measuring energy of a signal obtained by the coherent reception; if the energy of the signal obtained is greater than a first given threshold, it is determined that the first signal is detected; or if the energy of the signal obtained is no greater than a first given threshold, it is determined that the first signal is not detected.

In one embodiment, the monitoring refers to reception based on energy detection, namely, sensing energy of radio signals and averaging to acquire a received energy; if the received energy is greater than a second given threshold, it is determined that the first signal is detected; or if the received energy is no greater than a second given threshold, it is determined that the first signal is not detected.

In one embodiment, the phrase of monitoring a first signal includes a meaning that the first node determines whether the first signal is to be transmitted according to CRC.

In one embodiment, the phrase of monitoring a first signal includes a meaning that the first node is uncertain about whether the first signal is to be transmitted before determining whether decoding is correct according to CRC.

In one embodiment, the phrase of monitoring a first signal includes a meaning that the first node determines whether the first signal is to be transmitted according to coherent detection.

In one embodiment, the phrase of monitoring a first signal includes a meaning that the first node is uncertain about whether the first signal is to be transmitted before coherent detection.

In one embodiment, the phrase of monitoring a first signal includes a meaning that the first node determines whether the first signal is to be transmitted according to energy detection.

In one embodiment, the phrase of monitoring a first signal includes a meaning that the first node is uncertain about whether the first signal is to be transmitted before energy detection.

In one embodiment, the second signal comprises a radio signal.

In one embodiment, the second signal comprises a radio frequency (RF) signal.

In one embodiment, the second signal comprises a baseband signal.

In one embodiment, the second signal carries a Transport Block (TB).

In one embodiment, the second signal carries a Code Block (CB).

In one embodiment, the second signal carries a Code Block Group (CBG).

In one embodiment, the second signal comprises Sidelink Control Information (SCI).

In one embodiment, the second signal does not comprise SCI.

In one embodiment, the second signal is transmitted through Unicast.

In one embodiment, the second signal is transmitted through Groupcast.

In one embodiment, the second signal is transmitted through Broadcast.

In one embodiment, the second signal is transmitted in SideLink.

In one embodiment, the second signal is transmitted via a PC5 interface.

In one embodiment, the second signal comprises a second sub-signal and a third sub-signal, the second sub-signal carrying scheduling information of the third sub-signal; the scheduling information comprises one or more than one of a time-domain resource, a frequency-domain resource, a Modulation and Coding Scheme (MCS), a DeModulation Reference Signals (DMRS) port, a HARQ process number, a Redundancy Version (RV) or a New Data Indicator (NDI).

In one subembodiment, the second sub-signal comprises one or more fields in SCI.

In one subembodiment, the second sub-signal comprises one or more fields in 1st stage SCI.

In one subembodiment, the second sub-signal comprises one or more fields in 2nd stage SCI.

In one subembodiment, the second sub-signal is transmitted on a PSCCH.

In one subembodiment, some part of the second sub-signal is transmitted on a PSCCH, while the other part of the second sub-signal is transmitted on a Physical Sidelink Shared Channel (PSSCH).

In one subembodiment, the third sub-signal is transmitted on a PSSCH.

In one embodiment, the HARQ-ACK comprises an ACK.

In one embodiment, the HARQ-ACK comprises a Negative ACK (NACK).

In one embodiment, the first signal indicates whether a bit block set transmitted in the third resource block is correctly received.

In one embodiment, the bit block set comprises one or more than one bit block, and any bit block comprised by the bit block set is one of a Transport Block (TB), a Code Block (CB) or a Code Block Group (CBG).

In one embodiment, the phrase that the second resource block corresponds to a first index means that when the first condition set is unfulfilled, the first index is used for determining a spatial domain relation of the second signal.

In one embodiment, the first index is used for identifying a reference signal resource.

In one embodiment, the first index is used for identifying a reference signal resource set.

In one embodiment, the first index is used for identifying a Transmission Configuration Indicator (TCI) state.

In one embodiment, the first index is used for identifying a TCI field codepoint corresponding to a reference signal.

In one embodiment, the first index is used for identifying a COntrol REsource SET (CORESET) Pool index.

In one embodiment, the first index is used for identifying a CORESET.

In one embodiment, the first index is used for identifying a search space set.

In one embodiment, the first index is used for identifying a time-frequency resource pool.

In one embodiment, the first index is used for identifying an antenna panel.

In one embodiment, the first index is used for identifying an antenna group, which comprises at least one antenna.

In one embodiment, the spatial relation comprises a TCI state.

In one embodiment, the spatial relation comprises a Quasi-Co-Located (QCL) assumption.

In one embodiment, the spatial relation comprises a QCL parameter.

In one embodiment, the spatial relation comprises a QCL relation.

In one embodiment, the spatial relation comprises spatial settings.

In one embodiment, the spatial relation comprises a Spatial Relation.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties comprise one or more than one of delay spread, Doppler spread, Doppler shift, average delay or Spatial Rx parameter.

In one embodiment, in instances where the first condition set is unfulfilled, a spatial relation of the second signal is unrelated to the first index; in instances where the first condition set is fulfilled, the first index is used for determining a spatial relation of the second signal.

Embodiment 2

Figure 2:
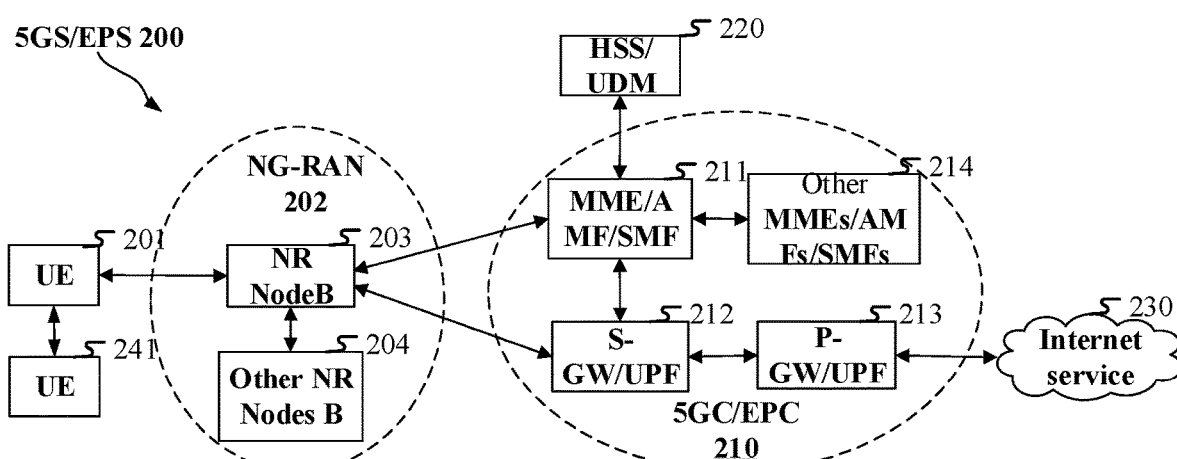
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), and Long-Term Evolution Advanced (LTE-A) and future 5G systems. The 5G NR or LTE network architecture 200 may be called a 5G System (5GS)/Evolved Packet System (EPS) 200. The 5GS/EPS 200 may comprise one or more UEs 201, a UE241 in sidelink communication with UE(s) 201, an NG-RAN 202, a 5G-CoreNetwork/Evolved Packet Core (5GC/EPC) 210, a Home Subscriber Server (HSS)/Unified Data Management (UDM) 220 and an Internet Service 230. The 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5GC/EPC 210 via an S1/NG interface. The 5GC/EPC 210 comprises a Mobility Management Entity (MME)/Authentication Management Field (AMF)/Session Management Function (SMF) 211, other MMEs//AMFs/S1V1Fs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212; the S-GW/UPF 212 is connected to the P-GW/

UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the UE 241.

In one embodiment, the first node in the present disclosure comprises the UE 241.

In one embodiment, the second node in the present disclosure comprises the UE 201.

In one embodiment, a radio link between the UE201 and the gNB203 is a cellular link.

In one embodiment, a radio link between the UE201 and the UE 241 is a sidelink.

In one embodiment, a transmitter of the first signal in the present disclosure includes the UE 241.

In one embodiment, a receiver of the first signal in the present disclosure includes the UE 201.

In one embodiment, a transmitter of the first signal in the present disclosure includes the UE 201.

In one embodiment, a receiver of the first signal in the present disclosure includes the UE 241.

In one embodiment, a transmitter of the second signal in the present disclosure includes the UE 201.

In one embodiment, a receiver of the second signal in the present disclosure includes the UE 241.

In one embodiment, a transmitter of the second signal in the present disclosure includes the UE 241.

In one embodiment, a receiver of the second signal in the present disclosure includes the UE 201.

In one embodiment, a transmitter of the first signal set in the present disclosure includes the UE 201.

In one embodiment, a receiver of the first signal set in the present disclosure includes the UE 241.

In one embodiment, a transmitter of the first signal set in the present disclosure includes the UE 241.

In one embodiment, a receiver of the first signal set in the present disclosure includes the UE 201.

In one embodiment, the second node in the present disclosure includes the gNB203.

In one embodiment, the third node in the present disclosure includes the UE241.

In one embodiment, a transmitter of the first reference signal in the present disclosure includes the gNB203.

In one embodiment, a receiver of the first reference signal in the present disclosure includes the UE201.

Embodiment 3

Figure 3:
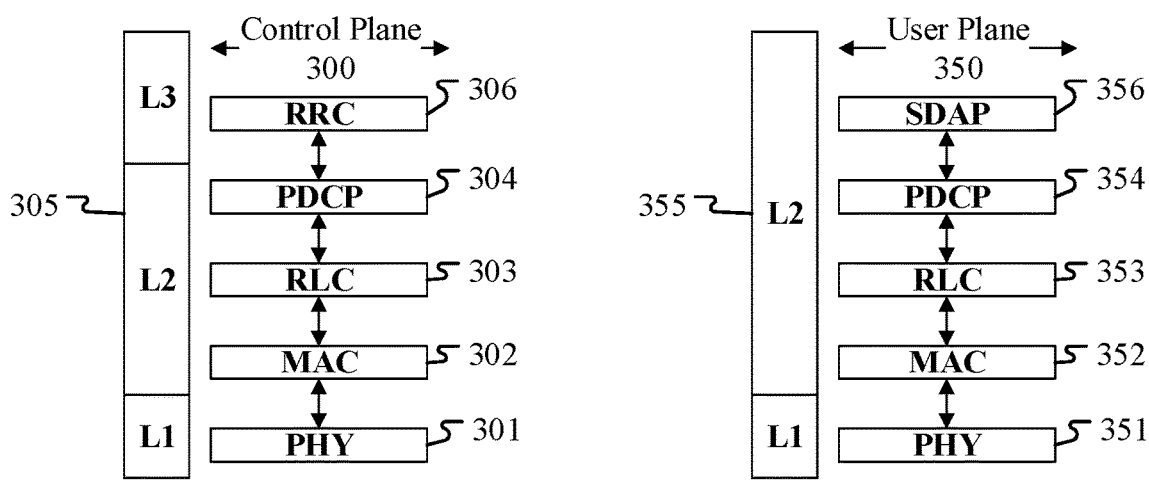
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PD CP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal is generated by the PHY301 or the PHY351.

In one embodiment, the second signal is generated by the PHY301 or the PHY351.

In one embodiment, the third signal is generated by the PHY301 or the PHY351.

In one embodiment, the first information block is generated by the PHY301 or the PHY351.

In one embodiment, the first information block is generated by the MAC sublayer 302 or the MAC sublayer 352.

In one embodiment, the first signal set is generated by the PHY301 or the PHY351.

In one embodiment, the first information block is generated by the PHY301 or the PHY351.

In one embodiment, the second information block is generated by the RRC sublayer 306.

In one embodiment, the radio protocol architecture in FIG. 3 is applicable to the third node in the present disclosure.

In one embodiment, the first reference signal is generated by the PHY301 or the PHY351.

In one embodiment, the first signal is generated by the PHY301 or the PHY351.

In one embodiment, the K first-type reference signals are generated by the PHY301 or the PHY351.

In one embodiment, the first information block is generated by the RRC sublayer 306.

Embodiment 4

Figure 4:
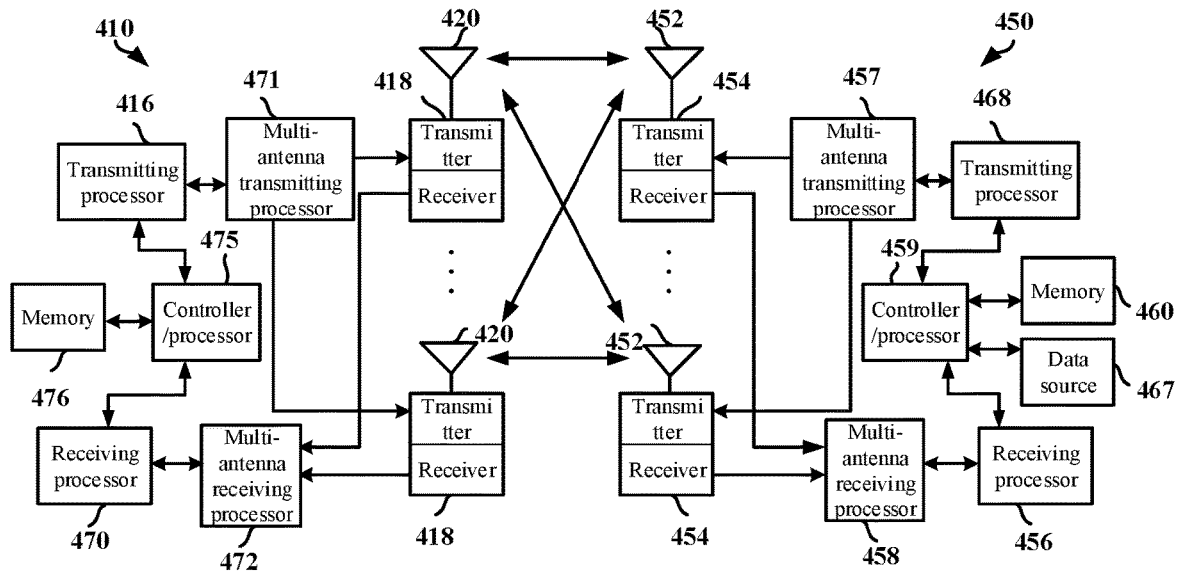
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also responsible for using ACK/NACK protocols in error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also responsible for using ACK/NACK protocols in error detection as a way to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least monitors the first signal in the first resource block, or, drops monitoring the first signal in the first resource block; and transmits the second signal in the second resource block. Herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the second communication device 450 comprises a memory that stores computer readable instruction program, the computer readable instruction program generates actions when executed by at least one processor, which include: monitoring the first signal in the first resource block, or, dropping monitoring the first signal in the first resource block; and transmitting the second signal in the second resource block. Herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signal in the first resource block, or, drops transmission of the first signal in the first resource block; and receives a second signal in a second resource block. Herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first communication device 410 comprises a memory that stores computer readable instruction program, the computer readable instruction program generates actions when executed by at least one processor, which include: transmitting the first signal in the first resource block, or, dropping transmission of any signal in the first resource block; and receiving a second signal in a second resource block. Herein, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first node in the present disclosure includes the second communication device 450.

In one embodiment, the second node in the present disclosure includes the first communication device 410.

In one embodiment, at least one of the antenna 452, the receiver 454, the receiving processor 456, the multi-antenna receiving processor 458 or the controller/processor 459 is used for monitoring the first signal in the first resource block; at least one of the antenna 420, the transmitter 418, the transmitting processor 416, the multi-antenna transmitting processor 471 or the controller/processor 475 is used for transmitting the first signal in the first resource block.

In one embodiment, at least one of the antenna 420, the receiver 418, the receiving processor 470, the multi-antenna receiving processor 472, the controller/processor 475 or the memory 476 is used for receiving the second signal in the second resource block; at least one of the antenna 452, the transmitter 454, the transmitting processor 468, the multi-antenna transmitting processor 457, the controller/processor 459 or the memory 460 is used for transmitting the second signal in the second resource block.

In one embodiment, at least one of the antenna 420, the receiver 418, the receiving processor 470, the multi-antenna receiving processor 472, the controller/processor 475 or the memory 476 is used for receiving the first information block; at least one of the antenna 452, the transmitter 454, the transmitting processor 468, the multi-antenna transmitting processor 457, the controller/processor 459 or the memory 460 is used for transmitting the first information block.

In one embodiment, at least one of the antenna 420, the receiver 418, the receiving processor 470, the multi-antenna receiving processor 472, the controller/processor 475 or the memory 476 is used for blind detecting the third signal in the third resource block; at least one of the antenna 452, the transmitter 454, the transmitting processor 468, the multi-antenna transmitting processor 457, the controller/processor 459 or the memory 460 is used for transmitting the third signal in the third resource block.

In one embodiment, the second communication device 450 comprises at least one processor and at least one memory, the at least one memory comprises computer program codes; the at least one memory and the computer program codes are configured to be used in collaboration with the at least one processor, the second communication device 450 at least transmits the first signal set. Time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the second communication device 450 is capable of triggering a second CSI report in the first time window; when the first condition set is fulfilled, the second communication device 450 is unable to trigger the second CSI report in the first time window; when the first condition set is not fulfilled, the second communication device 450 is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the second communication device 450 comprises a memory that stores computer readable instruction program, the computer readable instruction program generates actions when executed by at least one processor, which include: transmitting the first signal set. Time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the second communication device 450 is capable of triggering a second CSI report in the first time window; when the first condition set is fulfilled, the second communication device 450 is unable to trigger the second CSI report in the first time window; when the first condition set is not fulfilled, the second communication device 450 is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first signal set. Time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is capable of triggering a second CSI report in the first time window; when the first condition set is fulfilled, the transmitter of the first signal set is unable to trigger the second CSI report in the first time window; when the first condition set is not fulfilled, the transmitter of the first signal set is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first communication device 410 comprises a memory that stores computer readable instruction program, the computer readable instruction program generates actions when executed by at least one processor, which include: receiving the first signal set. Time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is capable of triggering a second CSI report in the first time window; when the first condition set is fulfilled, the transmitter of the first signal set is unable to trigger the second CSI report in the first time window; when the first condition set is not fulfilled, the transmitter of the first signal set is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, at least one of the antenna 420, the receiver 418, the receiving processor 470, the multi-antenna receiving processor 472, the controller/processor 475 or the memory 476 is used for receiving the first signal set; at least one of the antenna 452, the transmitter 454, the transmitting processor 468, the multi-antenna transmitting processor 457, the controller/processor 459 or the memory 460 is used for transmitting the first signal set.

In one embodiment, at least one of the antenna 452, the receiver 454, the receiving processor 456, the multi-antenna receiving processor 458 or the controller/processor 459 is used for receiving the first information block; at least one of the antenna 420, the transmitter 418, the transmitting processor 416, the multi-antenna transmitting processor 471 or the controller/processor 475 is used for transmitting the first information block.

In one embodiment, at least one of the antenna 420, the receiver 418, the receiving processor 470, the multi-antenna receiving processor 472, the controller/processor 475 or the memory 476 is used for receiving the third signal in the first time-frequency resource block; at least one of the antenna 452, the transmitter 454, the transmitting processor 468, the multi-antenna transmitting processor 457, the controller/processor 459 or the memory 460 is used for transmitting the third signal in the first time-frequency resource block.

In one embodiment, at least one of the antenna 420, the receiver 418, the receiving processor 470, the multi-antenna receiving processor 472, the controller/processor 475 or the memory 476 is used for receiving the second information block; at least one of the antenna 452, the transmitter 454, the transmitting processor 468, the multi-antenna transmitting processor 457, the controller/processor 459 or the memory 460 is used for transmitting the second information block.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first reference signal; and transmits the first signal. A transmitting (Tx) power of the first signal is a first power value, a first reference power value is used for determining the first power value, and the first reference power value is linear with a first pathloss; a first spatial domain filter is used for transmitting the first signal; the second communication device 450 uses the first spatial domain filter to measure the first reference signal to obtain the first pathloss; a transmitter of the first reference signal is different from a target receiver of the first signal.

In one embodiment, the second communication device 450 comprises a memory that stores computer readable instruction program, the computer readable instruction program generates actions when executed by at least one processor, which include: receiving the first reference signal; and transmitting the first signal. A transmitting (Tx) power of the first signal is a first power value, a first reference power value is used for determining the first power value, and the first reference power value is linear with a first pathloss; a first spatial domain filter is used for transmitting the first signal; the second communication device 450 uses the first spatial domain filter to measure the first reference signal to obtain the first pathloss; a transmitter of the first reference signal is different from a target receiver of the first signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first reference signal. A transmitter of a first signal uses a first spatial domain filter to measure the first reference signal to obtain a first pathloss; a transmitting (Tx) power of the first signal is a first power value, a first reference power value is used for determining the first power value, and the first reference power value is linear with the first pathloss; the first spatial domain filter is used for transmitting the first signal; a target receiver of the first signal is different from the first communication device 410.

In one embodiment, the first communication device 410 comprises a memory that stores computer readable instruction program, the computer readable instruction program generates an action when executed by at least one processor, which includes: transmitting the first reference signal. A transmitter of a first signal uses a first spatial domain filter to measure the first reference signal to obtain a first pathloss; a transmitting (Tx) power of the first signal is a first power value, a first reference power value is used for determining the first power value, and the first reference power value is linear with the first pathloss; the first spatial domain filter is used for transmitting the first signal; a target receiver of the first signal is different from the first communication device 410.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first signal. A Tx power of the first signal is a first power value, a first reference power value is used for determining the first power value, and the first reference power value is linear with a first pathloss; a first spatial domain filter is used for transmitting the first signal; a transmitter of the first signal uses the first spatial domain filter to measure a first reference signal to obtain the first pathloss; a transmitter of the first reference signal is different from the first communication device 410.

In one embodiment, the first communication device 410 comprises a memory that stores computer readable instruction program, the computer readable instruction program generates an action when executed by at least one processor, which includes: receiving the first signal. A Tx power of the first signal is a first power value, a first reference power value is used for determining the first power value, and the first reference power value is linear with a first pathloss; a first spatial domain filter is used for transmitting the first signal; a transmitter of the first signal uses the first spatial domain filter to measure a first reference signal to obtain the first pathloss; a transmitter of the first reference signal is different from the first communication device 410.

In one embodiment, the third node in the present disclosure includes the first communication device 410.

In one embodiment, at least one of the antenna 452, the receiver 454, the receiving processor 456, the multi-antenna receiving processor 458 or the controller/processor 459 is used for receiving the first reference signal; at least one of the antenna 420, the transmitter 418, the transmitting processor 416, the multi-antenna transmitting processor 471 or the controller/processor 475 is used for transmitting the first reference signal.

In one embodiment, at least one of the antenna 420, the receiver 418, the receiving processor 470, the multi-antenna receiving processor 472, the controller/processor 475 or the memory 476 is used for receiving the first signal; at least one of the antenna 452, the transmitter 454, the transmitting processor 468, the multi-antenna transmitting processor 457, the controller/processor 459 or the memory 460 is used for transmitting the first signal.

In one embodiment, at least one of the antenna 420, the receiver 418, the receiving processor 470, the multi-antenna receiving processor 472, the controller/processor 475 or the memory 476 is used for receiving the second signal; at least one of the antenna 452, the transmitter 454, the transmitting processor 468, the multi-antenna transmitting processor 457, the controller/processor 459 or the memory 460 is used for transmitting the second signal.

In one embodiment, at least one of the antenna 452, the receiver 454, the receiving processor 456, the multi-antenna receiving processor 458 or the controller/processor 459 is used for receiving the K first-type reference signals; at least one of the antenna 420, the transmitter 418, the transmitting processor 416, the multi-antenna transmitting processor 471 or the controller/processor 475 is used for transmitting the K first-type reference signals.

In one embodiment, at least one of the antenna 452, the receiver 454, the receiving processor 456, the multi-antenna receiving processor 458 or the controller/processor 459 is used for receiving the third signal; at least one of the antenna 420, the transmitter 418, the transmitting processor 416, the multi-antenna transmitting processor 471 or the controller/processor 475 is used for transmitting the third signal.

In one embodiment, at least one of the antenna 452, the receiver 454, the receiving processor 456, the multi-antenna receiving processor 458, the controller/processor 459 or the memory 460 is used for receiving the first information block; at least one of the antenna 420, the transmitter 418, the transmitting processor 416, the multi-antenna transmitting processor 471, the controller/processor 475 or the memory 476 is used for transmitting the first information block.

Embodiment 5

Figure 5:
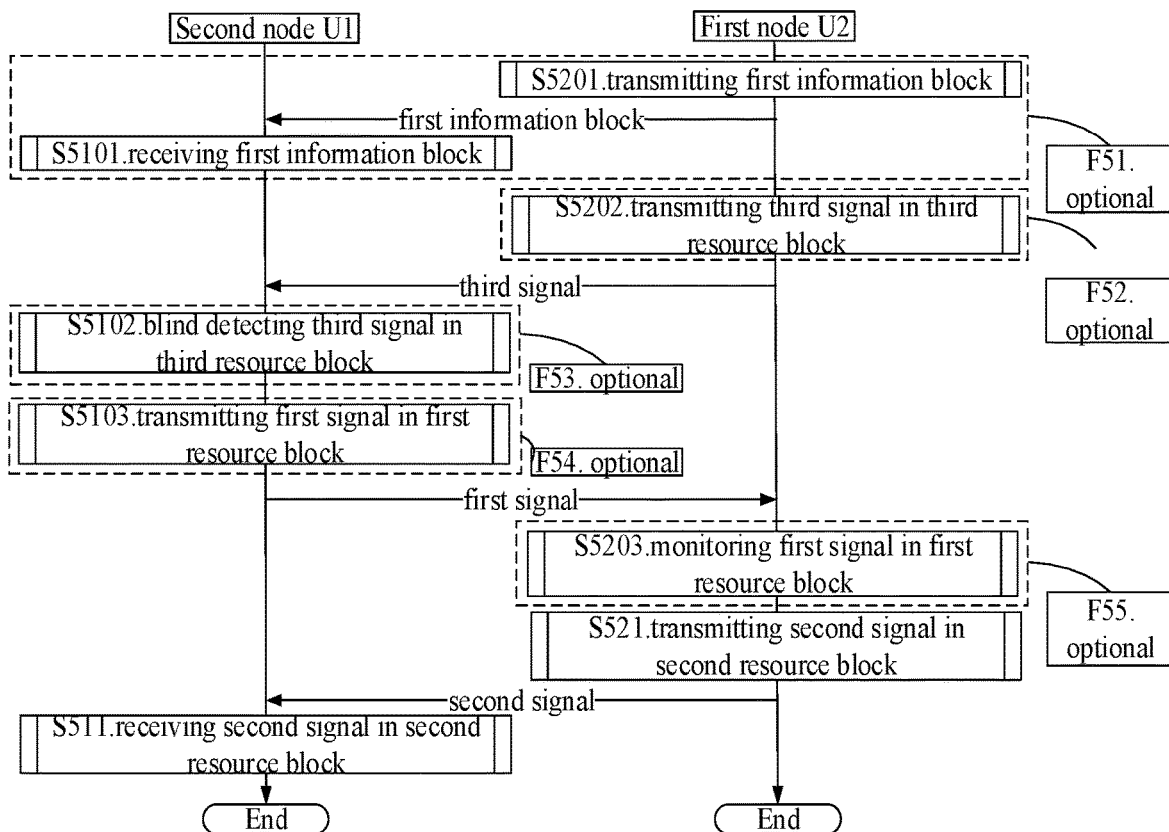
FIG. 5 illustrates a flowchart of a wireless transmission according to one embodiment of the present disclosure.

Embodiment 5 illustrates a flowchart of a wireless transmission according to one embodiment of the present disclosure, as shown in FIG. 5. In FIG. 5, a second node U1 and a first node U2 are communication nodes that transmit via an air interface. As illustrated in FIG. 5, steps marked by boxes F51-F55 are optional, respectively.

The second node U1 receives a first information block in step S5101; blind detects a third signal in a third resource block in step S5102; transmits a first signal in a first resource block in step S5103; and receives a second signal in a second resource block in step S511.

The first node U2 transmits a first information block in step S5201; transmits a third signal in a third resource block in step S5202; monitors a first signal in a first resource block in step S5203; and transmits a second signal in a second resource block in step S521.

In Embodiment 5, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first node U2 is the first node in the present disclosure.

In one embodiment, the second node U1 is the second node in the present disclosure.

In one embodiment, an air interface between the second node U1 and the first node U2 is a PC5 interface.

In one embodiment, an air interface between the second node U1 and the first node U2 includes sidelink.

In one embodiment, an air interface between the second node U1 and the first node U2 includes a wireless interface between a relay node and a UE.

In one embodiment, an air interface between the second node U1 and the first node U2 includes a wireless interface between UEs.

In one embodiment, the first node is a terminal.
In one embodiment, the first node is an automobile.
In one embodiment, the first node is a vehicle.
In one embodiment, the first node is a Road Side Unit (RSU).
In one embodiment, the first node is a terminal.
In one embodiment, the first node is an automobile.
In one embodiment, the first node is a vehicle.
In one embodiment, the first node is an RSU.

In one embodiment, whether a first condition set is fulfilled is used by the first node U2 to determine whether the first index is used for determining a spatial relation of the second signal.

In one embodiment, whether a first condition set is fulfilled is used by the second node U1 to determine whether the first index is used for determining a spatial relation of the second signal.

In one embodiment, if the first node considers that the first condition set is fulfilled, it is deemed that a spatial relation of the second signal is unrelated to the first index; if the first node considers that the first condition set is not fulfilled, it is deemed that the first index is used by the first node for determining the spatial relation of the second signal.

In one embodiment, if the second node considers that the first condition set is fulfilled, it is deemed that a spatial relation of the second signal is unrelated to the first index; if the second node considers that the first condition set is not fulfilled, it is deemed that the first index is used by the second node for determining the spatial relation of the second signal.

In one embodiment, if the first node monitors the first signal in the first resource block and detects the first signal in the first resource block, it is deemed that the first signal is conveyed in the first resource block; if the first node monitors the first signal in the first resource block and does not detect the first signal in the first resource block, it is deemed that the first signal is not conveyed in the first resource block.

In one embodiment, if the first node drops monitoring the first signal in the first resource block, it is deemed that the first signal is conveyed in the first resource block.

In one embodiment, if the first node drops monitoring the first signal in the first resource block, it is deemed that the first signal is not conveyed in the first resource block.

In one embodiment, if the second node transmits the first signal in a first resource block, it is deemed that the first signal is conveyed in the first resource block; if the second node drops transmitting the first signal in a first resource block, it is deemed that the first signal is not conveyed in the first resource block.

In one embodiment, the step marked by the box F55 in FIG. 5 exists; the first node monitors the first signal in the first resource block.

In one embodiment, the step marked by the box F55 in FIG. 5 does not exist; the first node drops transmitting the first signal in the first resource block.

In one embodiment, the first node autonomously determines whether to monitor the first signal in the first resource block.

In one embodiment, if the first node drops transmitting signals in the third resource block, it drops monitoring the first signal in the first resource block.

In one embodiment, if the first node transmits a signal in a first time window and the first time window overlaps with the first resource block in time domain, the first node drops monitoring the first signal in the first resource block.

In one embodiment, if the first node transmits the third signal in the third resource block and does not transmit signals in a first time window, the first node monitors the first signal in the first resource block; a time-domain resource occupied by the first resource block is the first time window.

In one embodiment, the step marked by the box F54 in FIG. 5 exists; the second node transmits the first signal in the first resource block.

In one embodiment, the step marked by the box F54 in FIG. 5 does not exist; the second node drops transmitting signals in the first resource block In one embodiment, the second node autonomously determines whether to transmit the first signal in the first resource block.

In one embodiment, if the fact that the second node does not receive a bit block set in the third resource block, of which a target receiver includes the second node, the second node drops transmitting signals in the first resource block.

In one embodiment, if the second node does not receive the third signal in the third resource block, it drops transmitting signals in the first resource block.

In one embodiment, if the second node receives a signal in a first time window, and the first time window overlaps with the first resource block in time domain, the second node drops transmitting signals in the first resource block.

In one embodiment, if the second node transmits a fourth signal set in a first time window, and the first time window overlaps with the first resource block in time domain, and a total transmitting power of the fourth signal set is no smaller than a first power threshold, the second node drops transmitting signals in the first resource block.

In one subembodiment, any signal in the fourth signal set is of a priority higher than the first signal.

In one embodiment, the phrase of dropping transmission of any signal in a first resource block means dropping transmitting any radio signal in the first resource block.

In one embodiment, the phrase of dropping transmission of any signal in a first resource block means dropping transmitting any radio frequency signal in the first resource block.

In one embodiment, the phrase of dropping transmission of any signal in a first resource block means dropping transmitting any baseband signal in the first resource block.

In one embodiment, the phrase of dropping transmission of any signal in a first resource block means dropping transmitting the first signal in the first resource block.

In one embodiment, the first signal is transmitted on a sidelink physical layer feedback channel (i.e., a sidelink channel only capable of carrying physical layer HARQ feedback).

In one embodiment, the first signal is transmitted on a PSFCH.

In one embodiment, the second signal is transmitted on a sidelink physical layer control channel (i.e., a sidelink channel only capable of carrying physical layer signaling).

In one embodiment, the second signal is transmitted on a Physical Sidelink Control Channel (PSCCH).

In one embodiment, the second signal is transmitted on a sidelink physical layer data channel (i e, a sidelink channel only capable of carrying physical layer data).

In one embodiment, the second signal is transmitted on a PSSCH.

In one embodiment, some part of the second signal is transmitted on a PSCCH, while the other part of the second signal is transmitted on a PSSCH.

In one embodiment, steps marked by the box F51 in FIG. 5 exist; the second resource block and the third resource block are respectively resource blocks of K resource blocks, K being a positive integer greater than 1; the first information block is used by the second node U1 to determine the K resource blocks and K indexes, the K indexes respectively corresponding to the K resource blocks; any index of the K indexes is a non-negative integer; and the first index is one of the K indexes that corresponds to the second resource block.

In one embodiment, the first information block is transmitted on a PSCCH.

In one embodiment, the first information block is transmitted on a PSSCH.

In one embodiment, the step marked by the box F52 in FIG. 5 exists; the first node transmits the third signal in the third resource block; the third signal carries a first bit block set, while the first signal carries a HARQ-ACK for the first bit block set.

In one embodiment, the step marked by the box F52 in FIG. 5 does not exist; the first node drops transmitting signals in the third resource block.

In one embodiment, the step marked by the box F53 in FIG. 5 exists; the second node blind detects the third signal in the third resource block.

In one embodiment, the step marked by the box F53 in FIG. 5 does not exist; the first node drops blind detecting the third signal in the third resource block.

In one embodiment, the first node autonomously determines whether to drop transmission of any signal in the third resource block.

In one embodiment, if a higher layer of the first node does not deliver a TB transmitted in the third resource block, the first node drops transmission of any signal in the third resource block.

In one embodiment, the third signal comprises a radio signal.

In one embodiment, the third signal comprises a radio frequency (RF) signal.

In one embodiment, the third signal comprises a baseband signal.

In one embodiment, the third signal occupies all Resource Elements (REs) in the third resource block.

In one embodiment, a target receiver of the third signal is the same as a target receiver of the second signal.

In one embodiment, a target receiver of the third signal includes the second node.

In one embodiment, the third signal comprises a fourth sub-signal, the fourth sub-signal carrying information of all or part of fields in a piece of SCI; the fourth sub-signal comprises a first field, the first field comprising information of a Destination ID field in the SCI; the first field of the fourth sub-signal indicates a first node set, the first node set comprising the second node.

In one embodiment, the third signal comprises SCI.

In one embodiment, the third signal comprises a reference signal.

In one embodiment, the third signal comprises DMRS.

In one embodiment, the third signal comprises a Channel State Information-Reference Signal (CSI-RS).

In one embodiment, the third signal comprises a Phase-Tracking Reference Signal (PTRS).

In one embodiment, the phrase of dropping transmission of any signal in the third resource block means dropping transmitting any radio signal in the third resource block.

In one embodiment, the phrase of dropping transmission of any signal in the third resource block means dropping transmitting any radio frequency signal in the third resource block.

In one embodiment, the phrase of dropping transmission of any signal in the third resource block means dropping transmitting any baseband signal in the third resource block.

In one embodiment, the phrase of dropping transmission of any signal in the third resource block means dropping transmitting a third signal in the third resource block.

In one embodiment, the blind detection refers to receiving a signal and operating decoding; if the decoding is determined to be correct according to a CRC bit, it is determined that the third signal is received; or if the decoding is determined to be incorrect according to a CRC bit, it is determined that the third signal is not received.

In one subembodiment, if the decoding is determined as correct according to a CRC bit of SCI, it is determined that the third signal is received; otherwise, it is determined that the third signal is not received.

In one subembodiment, if the decoding is determined as correct according to a CRC bit of 1st stage SCI, it is determined that the third signal is received; otherwise, it is determined that the third signal is not received.

In one embodiment, the blind detection refers to performing coherent reception and measuring energy of a signal obtained by the coherent reception; if the energy of the signal obtained by the coherent reception is greater than a third given threshold, it is determined that the third signal is received; otherwise, it is determined that the third signal is not received.

In one embodiment, the phrase of blind detecting a third signal means that the second node determines whether the third signal is to be transmitted according to CRC.

In one embodiment, the phrase of blind detecting a third signal means that the second node is uncertain about whether the third signal is to be transmitted before determining whether decoding is correct according to CRC.

In one embodiment, the phrase of blind detecting a third signal means that the second node determines whether the third signal is to be transmitted according to coherent detection.

In one embodiment, the phrase of blind detecting a third signal means that the second node is uncertain about whether the third signal is to be transmitted before coherent detection.

In one embodiment, the step marked by the box F53 in FIG. 5 exists; the second node receives the third signal in the third resource block.

In one embodiment, the step marked by the box F53 in FIG. 5 does not exist; the second node does not receive the third signal in the third resource block.

In one embodiment, if the second node transmits a signal in a second time window, the second node drops blind detecting signals in the third resource block; the second time window overlaps with the third resource block in time domain.

In one embodiment, the first bit block set comprises one or more than one bit block, and any bit block comprised by the first bit block set is one of a TB, a CB or a CBG.

In one embodiment, the first bit block set comprises only one bit block.

In one embodiment, the first bit block set comprises multiple bit blocks.

In one embodiment, any bit block comprised by the first bit block comprises more than one sequentially arranged bits.

In one embodiment, the phrase that the third signal carries a first bit block set means that the first signal comprises an output by bits in the first bit block set sequentially through some of or all procedures of CRC Attachment, Code Block Segmentation, Code Block CRC Attachment, Channel Coding, and Rate Matching, Data and control multiplexing, Scrambling, Modulation, Layer Mapping, transform precoding, Precoding, and Mapping to Virtual Resource Blocks, Mapping from Virtual to Physical Resource Blocks, and Multicarrier Symbol Generation, as well as Modulation and Upconversion.

In one embodiment, the phrase that the third signal carries a first bit block set means that the first bit block set is used for generating the third signal.

In one embodiment, the first signal carries a HARQ-ACK of each bit block comprised by the first bit block set.

In one embodiment, the first signal indicates whether each bit block in the first bit block set is correctly received.

In one embodiment, the first signal indicates that each bit block in the first bit block set is correctly received, or the first signal indicates that there is one bit block in the first bit block set not being correctly received.

In one embodiment, the first signal indicates that there is one bit block in the first bit block set not being correctly received.

In one embodiment, the third signal is transmitted on a PSCCH.

In one embodiment, the third signal is transmitted on a PSSCH.

In one embodiment, some part of the third signal is transmitted on a PSCCH, while the other part of the third signal is transmitted on a PSSCH.

Embodiment 6

Figure 6:
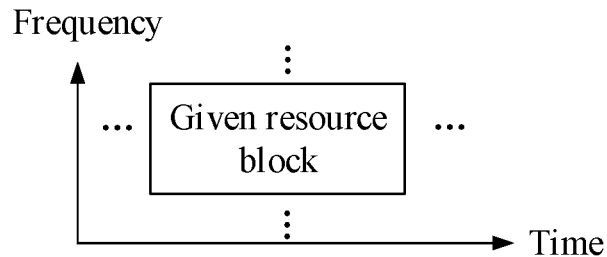
FIG. 6 illustrates a schematic diagram of a given resource block according to one embodiment of the present disclosure.

Embodiment 6 illustrates a schematic diagram of a given resource block according to one embodiment of the present disclosure; as shown in FIG. 6. In Embodiment 6, the given resource block is the first resource block or the second resource block, or the third resource block, or any of the K resource blocks.

In one embodiment, the given resource block is the first resource block.

In one embodiment, the given resource block is the second resource block.

In one embodiment, the given resource block is the third resource block.

In one embodiment, the given resource block is any of the K resource blocks.

In one embodiment, the given resource block comprises at least one RE in time-frequency domain.

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the given resource block comprises more than one Physical Resource block (PRB) in frequency domain.

In one embodiment, the given resource block comprises one PRB in frequency domain.

In one embodiment, the given resource block comprises a positive integer number of sub-channel(s) in frequency domain.

In one embodiment, the given resource block comprises a positive integer number of consecutive sub-channels in frequency domain.

In one embodiment, the given resource block comprises a positive integer number of multicarrier symbol(s) in time domain.

In one embodiment, the given resource block comprises a positive integer number of consecutive multicarrier symbols in time domain.

In one embodiment, the given resource block comprises a positive integer number of non-consecutive multicarrier symbols in time domain.

In one embodiment, the given resource block comprises a positive integer number of slot(s) in time domain.

In one embodiment, the given resource block comprises a positive integer number of sub-frame(s) in time domain.

Embodiment 7

Figure 7:
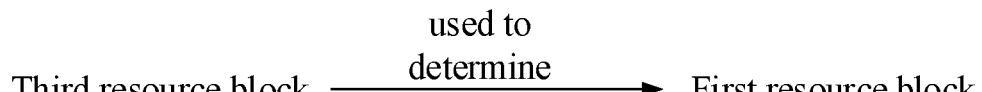
FIG. 7 illustrates a schematic diagram of relationship between a third resource block and a first resource block according to one embodiment of the present disclosure.

Embodiment 7 illustrates a schematic diagram of relationship between a third resource block and a first resource block according to one embodiment of the present disclosure, as shown in FIG. 7. In Embodiment 7, the third resource block is used for determining the first resource block.

In one embodiment, a time-frequency resource occupied by the third resource block is used for determining the first resource block.

In one embodiment, a time-domain resource occupied by the third resource block is used for determining a time-domain resource occupied by the first resource block.

In one embodiment, a time interval between a time unit to which the third resource block belongs and a time unit to which the first resource block belongs is no smaller than a first time interval.

In one embodiment, the first resource block belongs to a first time unit in time domain, and the third resource block belongs to a second time unit in time domain; the first time unit is an earliest time unit comprising a time-domain resource reserved for a PSFCH, which is later than the second time unit, and between which and the second time unit there is a time interval being no smaller than a first time interval.

In one embodiment, the first time interval is a non-negative integer.

In one embodiment, the first time interval is measured in slots.

In one embodiment, the first time interval is measured in multicarrier symbols.

In one embodiment, the first time interval is measured in the time unit.

In one embodiment, the first time interval is preconfigured.

In one embodiment, the first time interval is configured by an RRC signaling.

In one embodiment, the time unit is a slot.

In one embodiment, the time unit is a multicarrier symbol.

In one embodiment, the time unit comprises a positive integer number of consecutive multicarrier symbols.

In one embodiment, the number of multicarrier symbols comprised by the time unit is RRC-configured.

In one embodiment, a frequency-domain resource occupied by the third resource block is used for determining a frequency-domain resource occupied by the first resource block.

In one embodiment, a frequency-domain resource occupied by the third resource block is used for determining a frequency-domain resource and a code-domain resource occupied by the first resource block.

In one embodiment, a time-frequency resource occupied by the third resource block is used for determining a frequency-domain resource occupied by the first resource block.

In one embodiment, a time-frequency resource occupied by the third resource block is used for determining a frequency-domain resource and a code-domain resource occupied by the first resource block.

In one embodiment, the third signal comprises a fourth sub-signal, the fourth sub-signal carrying information of all or part of fields in a piece of SCI; the fourth sub-signal comprises a second field, the second field comprising information of a Source ID field in the SCI; the second field of the fourth sub-signal indicates a first IDentity (ID), the first ID being used to determine the first resource block.

In one embodiment, the first ID is used for determining a code-domain resource occupied by the first resource block.

In one embodiment, the first ID is used for determining a frequency-domain resource and a code-domain resource occupied by the first resource block.

In one embodiment, the first resource block is a candidate resource block of Q1 candidate resource blocks, Q1 being a positive integer greater than 1; a time-frequency resource occupied by the third resource block is used for determining the Q1 candidate resource blocks.

In one embodiment, the first ID is used for determining the first resource block out of the Q1 candidate resource blocks.

In one embodiment, a second time unit is a time unit to which the third resource block belongs, and a first sub-channel set comprises one or more than one sub-channel occupied by the third resource block; the second time unit and the first sub-channel set are used for determining the Q1 candidate resource blocks.

In one embodiment, the first sub-channel set only comprises a starting sub-channel occupied by the third resource block.

In one embodiment, the first sub-channel set only comprises a sub-channel occupied by the third resource block.

In one embodiment, the first sub-channel set comprises multiple sub-channels occupied by the third resource block.

In one embodiment, a given sub-channel is any sub-channel in the first sub-channel set, a pair of the second time unit the given sub-channel is one of P1 candidate pairs, P1 being a positive integer greater than 1; the P1 candidate pairs respectively correspond to P1 candidate resource block sets; the Q1 candidate resource blocks are composed of candidate resource block sets determined by all sub-channels comprised in the first sub-channel set.

In one subembodiment, the P1 candidate resource block sets are determined in a way specified by section 16.3 of 3GPP TS38.213.

In one subembodiment, the correspondence relationship between the P1 candidate pairs and the P1 candidate resource block sets is determined in a way specified by section 16.3 of 3GPP TS38.213.

In one embodiment, any one of the Q1 candidate resource blocks is reserved for HARQ-ACK.

In one embodiment, any one of the Q1 candidate resource blocks is reserved for a PSFCH.

In one embodiment, any one of the Q1 candidate resource blocks comprises a time-frequency resource and a code-domain resource.

In one embodiment, all of the Q1 candidate resource blocks belong to a same time unit in time domain.

In one embodiment, there are two candidate resource blocks among the Q1 candidate resource blocks that occupy a same PRB in frequency domain and correspond to different cyclic shifts.

In one embodiment, there are two candidate resource blocks among the Q1 candidate resource blocks that respectively occupy two mutually orthogonal PRBs.

Embodiment 8

Figure 8:
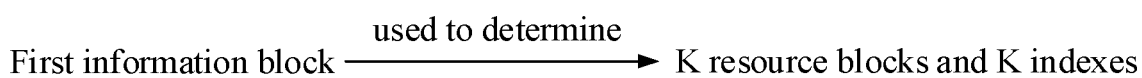
FIG. 8 illustrates a schematic diagram of a first information block according to one embodiment of the present disclosure.

Embodiment 8 illustrates a schematic diagram of a first information block according to one embodiment of the present disclosure; as shown in FIG. 8. In Embodiment 8, the first information block is used for determining the K resource blocks and the K indexes.

In one embodiment, the first information block is carried by a physical layer signaling.

In one embodiment, the first information block is carried by a dynamic signaling.

In one embodiment, the first information block is carried by an L1 signaling.

In one embodiment, the first information block comprises Downlink control information (DCI).

In one embodiment, the first information block comprises SCI.

In one embodiment, the first information block comprises information of one or more fields in a piece of SCI.

In one embodiment, the first information block comprises information of one or more fields in 1st stage SCI.

In one embodiment, the first information block comprises information of one or more fields in 2nd stage SCI.

In one embodiment, the first information block is carried by the third signal.

In one embodiment, the first information block is carried by an RRC signaling.

In one embodiment, the first information block is transmitted through Unicast.

In one embodiment, the first information block is transmitted through Groupcast.

In one embodiment, the first information block is transmitted through Broadcast.

In one embodiment, the first information block is transmitted in SideLink.

In one embodiment, the first information block is transmitted via a PC5 interface.

In one embodiment, the first information block indicates the K resource blocks and the K indexes.

In one embodiment, the first information block comprises a first bit field, the first bit field indicating the K resource blocks.

In one embodiment, the first information block comprises a second bit field, the second bit field indicating the K indexes.

In one embodiment, a time-domain resource occupied by the first information block is used for determining the K resource blocks.

In one embodiment, a time-frequency resource occupied by the first information block is used for determining the K indexes.

In one embodiment, the first information block indicates that the K resource blocks are reserved by the first node.

In one embodiment, the first information block indicates that the K resource blocks are reserved for the first node.

In one embodiment, the first information block comprises a third field, and the third field in the first information block is used for determining the K resource blocks; the third field comprises information of one or more fields in a piece of SCI.

In one embodiment, the third field comprises information of a Frequency resource assignment field.

In one embodiment, the third field comprises information of a Time resource assignment field.

In one embodiment, the third field comprises information of a Resource reservation period field.

In one embodiment, the third field in the first information block indicates a time interval between a time unit to which an earliest one of the K resource blocks belongs and a time unit to which the first information block belongs.

In one embodiment, the third field in the first information block indicates a time interval between any two of the K resource blocks that are adjacent in time domain.

In one embodiment, the third field in the first information block indicates a frequency-domain resource occupied by any one of the K resource blocks.

Embodiment 9

Figure 9:
FIG. 9 illustrates a schematic diagram of K resource blocks and K indexes according to one embodiment of the present disclosure.

Embodiment 9 illustrates a schematic diagram of K resource blocks and K indexes according to one embodiment of the present disclosure; as shown in FIG. 9. In Embodiment 9, the K indexes respectively correspond to the K resource blocks. In FIG. 9, the K indexes and indexes of the K resource blocks are #0, . . . and #(K-1), respectively.

In one embodiment, any of the K resource blocks comprises a time-domain resource and a frequency-domain resource.

In one embodiment, any of the K resource blocks comprises a time-domain resource, a frequency-domain resource and a code-domain resource.

In one embodiment, any of the K resource blocks is reserved for sidelink transmission.

In one embodiment, any two of the K resource blocks are mutually orthogonal in time domain.

In one embodiment, of the K resource blocks there are two resource blocks occupying a same frequency-domain resource.

In one embodiment, of the K resource blocks there are two resource blocks occupying different frequency-domain resources.

In one embodiment, frequency-domain resources occupied by any two of the K resource blocks are of an equal size.

In one embodiment, time-domain resources occupied by any two of the K resource blocks are of an equal size.

In one embodiment, of the K resource blocks there are two resource blocks occupying different sizes of time-domain resources.

In one embodiment, the K resource blocks belong to a same serving cell in frequency domain.

In one embodiment, the K resource blocks belong to a same BWP in frequency domain.

In one embodiment, of the K resource blocks there isn't any resource block located between the second resource block and the third resource block in time domain.

In one embodiment, of the K resource blocks there isn't any resource block located between the second resource block and the first resource block in time domain.

In one embodiment, the second resource block is an earliest resource block later than the first resource block among the K resource blocks, between which and the first resource block there is a time interval being no smaller than a second time interval.

In one embodiment, the second resource block is one of K1 resource blocks, and the K1 resource blocks are composed of part of the K resource blocks, K1 being a positive integer greater than 1; for any given resource block of the K1 resource blocks, there is a resource block of the K resource blocks of which a corresponding PSFCH slot is earlier than the given resource block in time domain.

In one subembodiment, there is a resource block of the K resource blocks of which a corresponding PSFCH slot is earlier than the given resource block in time domain and between which and the given resource block there is a time interval being no smaller than a second time interval.

In one embodiment, the third resource block is one of S resource blocks, S being a positive integer greater than 1; any resource block of the S resource blocks is one of the K resource blocks, and indexes for the S resource blocks are all equal to a value of the second index; S signals respectively carry HARQ-ACKs for bit block sets respectively transmitted in the S resource blocks; the first condition set comprises: the S signals are conveyed and each indicates that a bit block set transmitted in a corresponding resource block is correctly received.

In one subembodiment, the value of S is configured by an RRC signaling.

In one subembodiment, the value of S is pre-defined.

In one subembodiment, of the K resource blocks there isn't a resource block being located between any two of the S resource blocks in time domain, with a corresponding index equal to a value of the second index.

In one embodiment, K is equal to 2, and the K resource blocks consist of the second resource block and the third resource block.

In one embodiment, K is greater than 2.

In one embodiment, of the K indexes there are two indexes with unequal values.

In one embodiment, of the K indexes there are two indexes with equal values.

In one embodiment, any of the K indexes is used for identifying a reference signal resource.

In one embodiment, any of the K indexes is used for identifying a reference signal resource set.

In one embodiment, any of the K indexes is used for identifying a TCI state.

In one embodiment, any of the K indexes is used for identifying a TCI field codepoint corresponding to a reference signal.

In one embodiment, any of the K indexes is used for identifying a CORESET pool index.

In one embodiment, the second index is one of the K indexes that corresponds to the third resource block.

Embodiment 10

Figure 10:
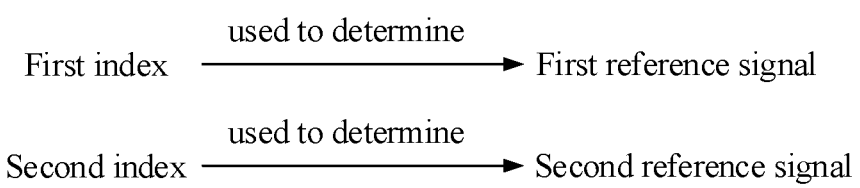
FIG. 10 illustrates a schematic diagram of a first index, a second index, a first reference signal and a second reference signal according to one embodiment of the present disclosure.

Embodiment 10 illustrates a schematic diagram of a first index being used to determine a first reference signal and a second index being used to determine a second reference signal according to one embodiment of the present disclosure; as shown in FIG. 10.

In one embodiment, the first index is unequal to the second index.

In one embodiment, the first index is equal to the second index.

In one embodiment, the first reference signal and the second reference signal respectively comprise SL reference signals.

In one embodiment, the first reference signal comprises a CSI-RS.

In one embodiment, the first reference signal comprises a DMRS.

In one embodiment, the first reference signal comprises a Sounding Reference Signal (SRS).

In one embodiment, the first reference signal comprises an SL Synchronization Signal (SS)/Physical Sidelink Broadcast CHannel (PSBCH) block.

In one embodiment, the second reference signal comprises a CSI-RS.

In one embodiment, the second reference signal comprises a DMRS.

In one embodiment, the second reference signal comprises a Sounding Reference Signal (SRS).

In one embodiment, the second reference signal comprises an SL SS block.

In one embodiment, the first reference signal and the second reference signal cannot be assumed to be Quasi Co-Located (QCL).

In one embodiment, the first reference signal and the second reference signal cannot be assumed to be QCL, corresponding to QCL-T eD.

In one embodiment, the first reference signal is the second reference signal.

In one embodiment, the first index indicates the first reference signal.

In one embodiment, the second index indicates the second reference signal.

In one embodiment, the first index is used for identifying the first reference signal.

In one embodiment, the second index is used for identifying the second reference signal.

In one embodiment, the first index comprises an identifier of the first reference signal.

In one embodiment, the second index comprises an identifier of the second reference signal.

In one embodiment, the first index is a TCI field codepoint corresponding to the first reference signal.

In one embodiment, the second index is a TCI field codepoint corresponding to the second reference signal.

In one embodiment, the first index comprises an identifier of a reference signal resource corresponding to the first reference signal.

In one embodiment, the second index comprises an identifier of a reference signal resource corresponding to the second reference signal.

In one embodiment, the first index comprises an identifier of a reference signal resource set to which the first reference signal belongs.

In one embodiment, the second index comprises an identifier of a reference signal resource set to which the second reference signal belongs.

In one embodiment, the second index is a non-negative integer.

In one embodiment, the phrase that the first index is used to determine the spatial relation of the second signal includes a meaning that the first index is used for determining the first reference signal, and the first reference signal is used for determining the spatial relation of the second signal.

In one embodiment, the phrase that the spatial relation of the second signal is unrelated to the first index includes a meaning that the second reference signal is used for determining the spatial relation of the second signal.

In one embodiment, the phrase that a given reference signal is used for determining the spatial relation of the second signal includes a meaning that the second signal is QCL with the given reference signal.

In one embodiment, the phrase that a given reference signal is used for determining the spatial relation of the second signal includes a meaning that the second signal is QCL with the given reference signal, corresponding to QCL-TypeD.

In one embodiment, the phrase that a given reference signal is used for determining the spatial relation of the second signal includes a meaning that the first node transmits the second signal and the given reference signal using a same spatial domain filter.

In one embodiment, the phrase that a given reference signal is used for determining the spatial relation of the second signal includes a meaning that the first node transmits the second signal and receives the given reference signal using a same spatial domain filter.

In one embodiment, the phrase that a given reference signal is used for determining the spatial relation of the second signal includes a meaning that a target receiver of the second signal receives the second signal and the given reference signal using a same spatial domain filter.

In one embodiment, the phrase that a given reference signal is used for determining the spatial relation of the second signal includes a meaning that a target receiver of the second signal receives the second signal and transmits the given reference signal using a same spatial domain filter.

In one embodiment, the phrase that a given reference signal is used for determining the spatial relation of the second signal includes a meaning that large-scale properties of a channel that the second signal goes through can be inferred from large-scale properties of a channel that the given reference signal goes through.

In one embodiment, the phrase that a given reference signal is used for determining the spatial relation of the second signal includes a meaning that the second node receives the second signal and the given reference signal using a same spatial domain filter.

In one embodiment, the phrase that a given reference signal is used for determining the spatial relation of the second signal includes a meaning that the second node receives the second signal and transmits the given reference signal using a same spatial domain filter.

In one embodiment, the given reference signal is either the first reference signal or the second reference signal.

In one embodiment, the given reference signal is the first reference signal.

In one embodiment, the given reference signal is the second reference signal.

Embodiment 11

Figure 11:
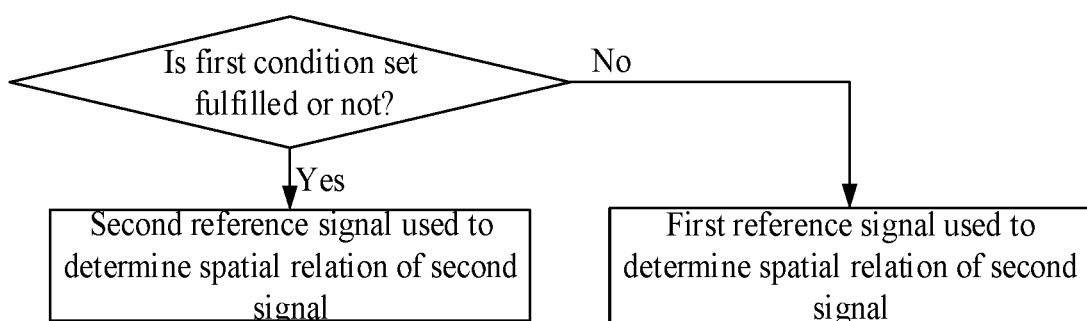
FIG. 11 illustrates a schematic diagram of a spatial relation between a first condition set and a second signal according to one embodiment of the present disclosure.

Embodiment 11 illustrates a schematic diagram of a spatial relation between a first condition set and a second signal according to one embodiment of the present disclosure; as shown in FIG. 11. In Embodiment 11, when the first condition set is not fulfilled, the first reference signal is used for determining a spatial relation of the second signal; when the first condition set is fulfilled, the second reference signal is used for determining the spatial relation of the second signal.

In one embodiment, if the first node considers that the first condition set is not fulfilled, the first reference signal is used by the first node for determining a spatial relation of the second signal; if the first node considers that the first condition set is fulfilled, the second reference signal is used by the first node for determining a spatial relation of the second signal.

In one embodiment, if the second node considers that the first condition set is not fulfilled, the first reference signal is used by the second node for determining a spatial relation of the second signal; if the second node considers that the first condition set is fulfilled, the second reference signal is used by the second node for determining a spatial relation of the second signal.

In one embodiment, the second reference signal is used for determining a spatial relation of the third signal.

Embodiment 12

Embodiment 12 illustrates a schematic diagram of a spatial relation between a first condition set and a second signal according to one embodiment of the present disclosure; as shown in FIG. 12. In Embodiment 12, if the first condition set is fulfilled and the third signal is conveyed in the third resource block, the second signal and the third signal are QCL; if the first condition set is not fulfilled and the third signal is conveyed in the third resource block, whether the first index is equal to the second index is used to determine whether the second signal and the third signal are QCL.

In one embodiment, if the first condition set is fulfilled and the third signal is conveyed in the third resource block, the second signal and the third signal are QCL, corresponding to QCL-TypeD.

In one embodiment, when the first condition set is not fulfilled and the third signal is conveyed in the third resource block, if the first index is equal to the second index, the second signal and the third signal are QCL; if the first index is unequal to the second index, the second signal and the third signal are not QCL.

In one embodiment, in a case where the first condition set is not fulfilled and the third signal is conveyed in the third resource block, if the first index is equal to the second index, the second signal and the third signal are QCL, corresponding to QCL-TypeD; if the first index is unequal to the second index, the second signal and the third signal are not QCL, let alone corresponding to QCL-TypeD.

In one embodiment, if the third signal is not conveyed in the third resource block, the first condition set is not fulfilled.

In one embodiment, if the first node considers that the first condition set is fulfilled and the third signal is conveyed in the third resource block, it is deemed that the second signal and the third signal are QCL; if the first node considers that the first condition set is not fulfilled and the third signal is conveyed in the third resource block, whether the first index is equal to the second index is used by the first node for determining whether the second signal and the third signal are QCL.

In one embodiment, if the second node considers that the first condition set is fulfilled and the third signal is conveyed in the third resource block, it is assumed that the second signal and the third signal are QCL; if the second node considers that the first condition set is not fulfilled and the third signal is conveyed in the third resource block, whether the first index is equal to the second index is used by the second node for determining whether the second signal and the third signal are QCL.

In one embodiment, in an instance when the second node considers that the first condition set is not fulfilled and the third signal is not conveyed in the third resource block, if the first index is equal to the second index, the second node receives the second signal and blind detects the third signal using a same spatial domain filter; if the first index is unequal to the second index, the second node receives the second signal and blind detects the third signal using different spatial domain filters.

In one embodiment, if the first node transmits the third signal in the third resource block, the first node deems that the third signal is conveyed in the third resource block; if the first node drops transmission of any signal in the third resource block, the first node deems that the third signal is not conveyed in the third resource block.

In one embodiment, if the second node receives the third signal in the third resource block, the second node deems that the third signal is conveyed in the third resource block; if the second node does not receive the third signal in the third resource block, the second node deems that the third signal is not conveyed in the third resource block.

In one embodiment, if the first condition set is not fulfilled and the third signal is not conveyed in the third resource block, the first index is used for determining a spatial relation of the second signal.

In one embodiment, a first spatial domain filter is used by the first node for transmitting a radio signal in the third resource block; in an instance when the first condition set is not fulfilled and the third signal is not conveyed in the third resource block, if the first index is equal to the second index, the first spatial domain filter is used by the first node for transmitting the second signal; if the first index is unequal to the second index, the first node uses a spatial domain filter different from the first spatial domain filter to transmit the second signal.

In one embodiment, the first index is equal to 0 or 1.

In one embodiment, the second index is equal to 0 or 1.

In one embodiment, any one of the K indexes is equal to 0 or 1.

In one embodiment, the phrase that the first index is used to determine the spatial relation of the second signal includes a meaning that whether the first index is equal to the second index is used to determine whether the second signal and the third signal are QCL.

In one embodiment, the phrase that the first index is used to determine the spatial relation of the second signal includes a meaning that whether the first index is equal to the second index is used to determine whether the second signal and the third signal are QCL, corresponding to QCL-T eD.

In one embodiment, the phrase that the spatial relation of the second signal is unrelated to the first index includes a meaning that the second signal and the third signal are QCL.

In one embodiment, the phrase that the spatial relation of the second signal is unrelated to the first index includes a meaning that the second signal and the third signal are QCL, corresponding to QCL-T eD.

Embodiment 13

Embodiment 13 illustrates a schematic diagram of a first condition set according to one embodiment of the present disclosure; as shown in FIG. 13. In Embodiment 13, the first condition set comprises the first signal being conveyed in the first resource block and the first signal indicating that a bit block set transmitted in the third resource block is correctly received.

In one embodiment, the first condition set comprises that the first signal indicates that each bit block in a bit block set transmitted in the third resource block is correctly received.

In one embodiment, the first condition set comprises that the first signal indicates that each bit block in the first bit block set is correctly received.

In one embodiment, the first condition set comprises that the first signal is not conveyed in the first resource block.

In one embodiment, the first condition set comprises that the first signal is not conveyed in the first resource block, and a SCI format of the fourth sub-signal is SCI format 2-B.

Embodiment 14

Embodiment 14 illustrates a schematic diagram of a first condition set according to one embodiment of the present disclosure; as shown in FIG. 14. In Embodiment 14, the first resource block is one of N resource blocks, and the first signal is one of N signals, the N resource blocks are respectively reserved for the N signals, N being a positive integer; any of the N resource blocks is reserved for a HARQ-ACK for a bit block set transmitted in the third resource block; a first signal group is composed of signals being conveyed in corresponding resource blocks among the N signals; a first signal sub-group is composed of signals comprised in the first signal group indicating that a bit block set transmitted in the third resource block is correctly received, and the first condition set comprises that a number of signals comprised by the first signal sub-group is greater than a first threshold; the first threshold is a positive integer.

In one embodiment, the above method in a first node for wireless communications comprises: monitoring a given signal in a given resource block, or, dropping monitoring of the given signal in the given resource block; herein, the given signal is any of the N signals other than the first signal, and the given resource block is one of the N resource blocks being reserved for the given signal.

In one embodiment, for any given signal of the N signals, if the first node monitors the given signal in a corresponding resource block and detects the given signal, the first node deems that the first signal group comprises the given signal; if the first node monitors the given signal in the corresponding resource block and does not detect the given signal, the first node deems that the first signal group does not comprise the given signal.

In one embodiment, for any given signal of the N signals, if the first node drops monitoring the given signal in a corresponding resource block, the first node deems that the first signal group does not comprise the given signal.

In one embodiment, for any given signal of the N signals, if the first node drops monitoring the given signal in a corresponding resource block, the first node deems that the first signal group comprises the given signal.

In one embodiment, the first signal sub-group is composed of signals comprised by the first signal group indicating that each bit block in a bit block set transmitted in the third resource block is correctly received.

In one embodiment, the first signal group is empty.

In one embodiment, the first signal group only comprises one of the N signals.

In one embodiment, the first signal group comprises multiple signals of the N signals.

In one embodiment, the first signal sub-group is empty.

In one embodiment, the first signal sub-group only comprises one signal in the first signal group.

In one embodiment, the first signal sub-group comprises multiple signals in the first signal group.

In one embodiment, the first threshold is a positive integer greater than 1.

In one embodiment, the first threshold is equal to N.

In one embodiment, the first threshold is equal to a number of signals comprised by the first signal group.

In one embodiment, the first threshold is equal to a product of N and a first coefficient, the first coefficient being a positive real number less than 1.

In one embodiment, the first coefficient is configured by RRC.

In one embodiment, the first coefficient is pre-defined.

In one embodiment, any two of the N signals correspond to different transmitters.

In one embodiment, of the N signals there are two signals corresponding to a same transmitter.

In one embodiment, the third resource block is used for determining the N resource blocks.

In one embodiment, any of the N resource blocks comprises a time-frequency resource and a code-domain resource.

In one embodiment, the N resource blocks belong to a same time unit in time domain. In one embodiment, the first node set comprises N nodes, and the N nodes respectively correspond to the N resource blocks.

In one embodiment, identities of the N nodes are respectively used for determining the N resource blocks.

In one embodiment, indexes of the N nodes in the first node set are respectively used for determining the N resource blocks.

In one embodiment, any of the N resource blocks is a candidate resource block of the Q1 candidate resource blocks.

In one embodiment, for any given node of the N nodes, the first ID and an identity of the given node are jointly used for determining a resource block corresponding to the given node out of the Q1 candidate resource blocks.

Embodiment 15

Embodiment 15 illustrates a structure block diagram of a processing device in a first node according to one embodiment of the present disclosure; as shown in FIG. 15. In FIG. 15, a processing device 1500 in a first node comprises a first receiver 1501 and a first transmitter 1502.

In Embodiment 15, the first receiver 1501 monitors a first signal in a first resource block, or, drops monitoring the first signal in the first resource block; the first transmitter 1502 transmits a second signal in a second resource block.

In Embodiment 15, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the first transmitter 1502 transmits a first information block; herein, the second resource block and the third resource block are respectively resource blocks of K resource blocks, K being a positive integer greater than 1; the first information block is used to determine the K resource blocks and K indexes, the K indexes respectively corresponding to the K resource blocks; any index of the K indexes is a non-negative integer; and the first index is one of the K indexes that corresponds to the second resource block.

In one embodiment, the first transmitter 1502 transmits a third signal in the third resource block, or, the first transmitter 1502 drops transmission of any signal in the third resource block; herein, the third signal carries a first bit block set, while the first signal carries a HARQ-ACK for the first bit block set.

In one embodiment, the third resource block corresponds to a second index; the first index and the second index are respectively used to determine a first reference signal and a second reference signal; when the first condition set is not fulfilled, the first reference signal is used to determine the spatial relation of the second signal; when the first condition set is fulfilled, the second reference signal is used to determine the spatial relation of the second signal.

In one embodiment, the third resource block corresponds to a second index; when the first condition set is fulfilled and the third signal is conveyed in the third resource block, the second signal and the third signal are QCL; when the first condition set is not fulfilled and the third signal is conveyed in the third resource block, whether the first index is equal to the second index is used to determine whether the second signal and the third signal are QCL.

In one embodiment, the first condition set comprises the first signal being conveyed in the first resource block and the first signal indicating that a bit block set transmitted in the third resource block is correctly received.

In one embodiment, the first node is a UE.

In one embodiment, the first node is a relay node.

In one embodiment, the first receiver 1501 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1502 comprises at least one of the antenna 452, the transmitter 454, the transmitting processor 468, the multi-antenna transmitting processor 457, the controller/processor 459, the memory 460 or the data source 467 in Embodiment 4.

Embodiment 16

Embodiment 16 illustrates a structure block diagram of a processing device in a second node according to one embodiment of the present disclosure; as shown in FIG. 16. In FIG. 16, a processing device 1600 in a second node comprises a second transmitter 1601 and a second receiver 1602.

In Embodiment 16, the second transmitter 1601 transmits a first signal in a first resource block, or drops transmission of any signal in the first resource block; the second receiver 1602 receives a second signal in a second resource block.

In Embodiment 16, the second resource block corresponds to a first index, the first index being a non-negative integer; the first resource block is reserved for a HARQ-ACK of a bit block set transmitted in a third resource block; whether a first condition set is fulfilled is used to determine whether the first index is used for determining a spatial relation of the second signal, and the first condition set is related to whether the first signal is conveyed in the first resource block; when the first condition set is fulfilled, the spatial relation of the second signal is unrelated to the first index; when the first condition set is not fulfilled, the first index is used to determine the spatial relation of the second signal.

In one embodiment, the second receiver 1602 receives a first information block; herein, the second resource block and the third resource block are respectively resource blocks of K resource blocks, K being a positive integer greater than 1; the first information block is used to determine the K resource blocks and K indexes, the K indexes respectively corresponding to the K resource blocks; any index of the K indexes is a non-negative integer; and the first index is one of the K indexes that corresponds to the second resource block.

In one embodiment, the second receiver 1602 blind detects a third signal in the third resource block; herein, the third signal carries a first bit block set, while the first signal carries a HARQ-ACK for the first bit block set.

In one embodiment, the third resource block corresponds to a second index; the first index and the second index are respectively used to determine a first reference signal and a second reference signal; when the first condition set is not fulfilled, the first reference signal is used to determine the spatial relation of the second signal; when the first condition set is fulfilled, the second reference signal is used to determine the spatial relation of the second signal.

In one embodiment, the third resource block corresponds to a second index; when the first condition set is fulfilled and the third signal is conveyed in the third resource block, the second signal and the third signal are QCL; when the first condition set is not fulfilled and the third signal is conveyed in the third resource block, whether the first index is equal to the second index is used to determine whether the second signal and the third signal are QCL.

In one embodiment, the first condition set comprises the first signal being conveyed in the first resource block and the first signal indicating that a bit block set transmitted in the third resource block is correctly received.

In one embodiment, the second node is a UE.

In one embodiment, the second node is a relay node.

In one embodiment, the second transmitter 1601 comprises at least one of the antenna 420, the transmitter 418, the transmitting processor 416, the multi-antenna transmitting processor 471, the controller/processor 475 or the memory 476 in Embodiment 4.

In one embodiment, the second receiver 1602 comprises at least one of the antenna 420, the receiver 418, the receiving processor 470, the multi-antenna receiving processor 472, the controller/processor 475 or the memory 476 in Embodiment 4.

Embodiment 17

Figure 17:
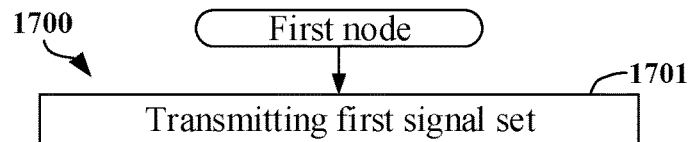
FIG. 17 illustrates a flowchart of a first signal set according to one embodiment of the present disclosure.

Embodiment 17 illustrates a flowchart of a first signal set according to one embodiment of the present disclosure; as shown in FIG. 17. In 1700 illustrated by FIG. 17, each box represents a step.

In Embodiment 17, the first node in the present disclosure transmits a first signal set in step 1701. Herein, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is capable of triggering a second CSI report in the first time window; when the first condition set is fulfilled, the first node is unable to trigger the second CSI report in the first time window; when the first condition set is not fulfilled, the first node is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first signal set comprises a positive integer number of signal(s).

In one embodiment, the first signal set comprises only one signal.

In one embodiment, the first signal set comprises more than one signal.

In one embodiment, the first signal set only comprises the first signal.

In one embodiment, the first signal set comprises at least one signal other than the first signal.

In one embodiment, any signal in the first signal set comprises a baseband signal.

In one embodiment, any signal in the first signal set comprises a radio signal.

In one embodiment, any signal in the first signal set comprises a radio frequency (RF) signal.

In one embodiment, the first signal set comprises multiple signals, and any two signals in the first signal set correspond to a target receiver.

In one embodiment, the first signal set comprises multiple signals, and the first signal is any signal in the first signal set.

In one embodiment, any signal in the first signal set is transmitted through Unicast.

In one embodiment, there is a signal in the first signal set being transmitted through Unicast.

In one embodiment, there is a signal in the first signal set being transmitted through Groupcast.

In one embodiment, any signal in the first signal set is transmitted in SideLink.

In one embodiment, any signal in the first signal set is transmitted via a PC5 interface.

In one embodiment, all signals in the first signal set are transmitted on a same carrier.

In one embodiment, all signals in the first signal set are transmitted on a same BWP.

In one embodiment, there are two signals in the first signal set being transmitted on different carriers.

In one embodiment, there are two signals in the first signal set being transmitted on different BWPs.

In one embodiment, the first signal comprises a baseband signal.

In one embodiment, the first signal comprises a radio signal.

In one embodiment, the first signal comprises a radio frequency (RF) signal.

In one embodiment, the first time window is a contiguous duration.

In one embodiment, the first time window comprises a positive integer number of multicarrier symbol(s).

In one embodiment, the first time window comprises one multicarrier symbols or multiple consecutive multicarrier symbols.

In one embodiment, the first time window comprises a positive integer number of slot(s).

In one embodiment, the first time window comprises one slot or a positive integer number of consecutive slots.

In one embodiment, the first time window comprises one time unit or a positive integer number of consecutive time units.

In one embodiment, a length of the first time window is configured by a higher layer parameter.

In one embodiment, a length of the first time window is configured by a higher layer parameter sl-LatencyBound-CSI-Report.

In one embodiment, a time-domain resource occupied by each signal in the first signal set is used for determining the first time window.

In one embodiment, the first signal set only comprises the first signal, and a time-domain resource occupied by the first signal is used for determining the first time window.

In one embodiment, a start of the first time window is an end time of a time-domain resource occupied by the first signal.

In one embodiment, a start of the first time window is a start time of a time-domain resource occupied by the first signal.

In one embodiment, a start of the first time window is an end time of a slot occupied by the first signal.

In one embodiment, a start of the first time window is a start time of a slot occupied by the first signal.

In one embodiment, a start of the first time window is an end time of a time unit occupied by the first signal.

In one embodiment, a start of the first time window is a start time of a time unit occupied by the first signal.

In one embodiment, an end of the first time window is an end time of a last slot expected to receive or accomplish the first CSI report.

In one embodiment, the time unit is a slot.

In one embodiment, the time unit is a SideLink (SL) slot.

In one embodiment, the time unit is a multicarrier symbol.

In one embodiment, the time unit comprises a positive integer number of consecutive multicarrier symbols.

In one embodiment, a number of multicarrier symbols comprised by the time unit is configured by RRC.

In one embodiment, the first sub-signal comprises a radio signal.

In one embodiment, the first sub-signal comprises a baseband signal.

In one embodiment, the first sub-signal comprises an RF signal.

In one embodiment, the first sub-signal comprises SCI.

In one embodiment, the first sub-signal comprises 1st stage SCI.

In one embodiment, the first sub-signal comprises 2nd stage SCI.

In one embodiment, the first sub-signal comprises one or more fields in 1st stage SCI.

In one embodiment, the first sub-signal comprises one or more fields in 2nd stage SCI.

In one embodiment, the first reference signal comprises an SL reference signal.

In one embodiment, the first reference signal comprises a CSI-RS.

In one embodiment, the first reference signal comprises an SL CSI-RS.

In one embodiment, the first reference signal comprises a Sounding Reference Signal (SRS).

In one embodiment, the first reference signal comprises a DMRS.

In one embodiment, the first reference signal comprises an SL DMRS.

In one embodiment, the first reference signal comprises an aperiodic CSI-RS.

In one embodiment, the first sub-signal is used for determining a time-frequency resource occupied by the first reference signal.

In one embodiment, a time-frequency resource occupied by the first sub-signal is used for determining a time-frequency resource occupied by the first reference signal.

In one embodiment, the first reference signal occupies a first multicarrier symbol group within a first time unit in time domain, the first time unit is a time unit occupied by the first sub-signal, and the first multicarrier symbol group comprises at least one multicarrier symbol.

In one embodiment, a frequency-domain resource occupied by the first signal belongs to the first time unit.

In one embodiment, the first multicarrier symbol group only comprises one multicarrier symbol.

In one embodiment, the first multicarrier symbol group comprises 2 multicarrier symbols.

In one embodiment, a position of the first multicarrier symbol group in the first time unit is configured by an RRC parameter.

In one embodiment, an RRC parameter used for configuring the first multicarrier symbol group comprises information of all or part of fields in SL-CSI-RS-Config.

In one embodiment, the first reference signal occupies a first subcarrier group within a first frequency-domain resource block in frequency domain, the first subcarrier group comprising more than one subcarrier; the first sub-signal indicates the first frequency-domain resource block.

In one embodiment, the first frequency-domain resource block comprises one sub-channel or a positive integer number of consecutive sub-channels, and the first sub-signal indicates a number of sub-channels comprised by the first frequency-domain resource block.

In one embodiment, the first frequency-domain resource block comprises a frequency-domain resource occupied by the first sub-signal.

In one embodiment, a lowest PRB occupied by the first sub-signal belongs to a first sub-channel, the first sub-channel being a lowest sub-channel comprised by the first frequency-domain resource block.

In one embodiment, a position of the first subcarrier group in the first frequency-domain resource block is configured by an RRC parameter.

In one embodiment, an RRC parameter used for configuring the first subcarrier group comprises information of all or part of fields in SL-CSI-RS-Config.

In one embodiment, a frequency-domain resource occupied by the first signal is the first frequency-domain resource.

In one embodiment, the first signal comprises a second sub-signal, and the first sub-signal indicates scheduling information of the second sub-signal.

In one embodiment, a time-frequency resource occupied by the first reference signal is within a time-frequency resource occupied by the second sub-signal.

In one embodiment, the second sub-signal occupies the first frequency-domain resource block in frequency domain, and the first time unit in time domain.

In one embodiment, the second sub-signal is transmitted on a Physical Sidelink Shared Channel (PSSCH).

In one embodiment, the second sub-signal carries at least one of a TB, a CB or a CBG.

In one embodiment, the scheduling information comprises one or more than one of a time-domain resource, a frequency-domain resource, a Modulation and Coding Scheme (MCS), a DeModulation Reference Signals (DMRS) port, a HARQ process number, a Redundancy Version (RV) or a New Data Indicator (NDI).

In one embodiment, the first field comprises a CSI request field in SCI format 2-A.

In one embodiment, the first field comprises at least one bit.

In one embodiment, the first field comprises 1 bit.

In one embodiment, the first field comprises 2 bits.

In one embodiment, the first field comprises 3 bits.

In one embodiment, the first field in the first sub-signal is of a value equal to 1.

In one embodiment, the first field in the first sub-signal is of a value greater than 0.

In one embodiment, the first field indicates whether a time-frequency resource scheduled by SCI to which the first field belongs comprises a CSI-RS.

In one embodiment, the first field indicates whether a radio signal scheduled by SCI to which the first field belongs comprises a CSI-RS.

In one embodiment, the first field in the first sub-signal indicates that the first signal comprises the first reference signal.

In one embodiment, the first field in the first sub-signal indicates that the first reference signal is transmitted in a time-frequency resource scheduled by the first sub-signal.

In one embodiment, the CSI refers to Channel State Information.

In one embodiment, the first CSI report comprises a Channel Quality Indicator (CQI).

In one embodiment, the first CSI report comprises a Rank Indicator (RI).

In one embodiment, a reference signal corresponding to the first CSI report includes the first reference signal.

In one embodiment, the first CSI report is obtained by a measurement on the first reference signal.

In one embodiment, the first CSI report is obtained by a channel measurement on the first reference signal.

In one embodiment, the first CSI report is obtained by an interference measurement on the first reference signal.

In one embodiment, a transmitter of the first CSI report calculates contents contained in the first CSI report only according to a channel measurement on the first reference signal.

In one embodiment, the first CSI report is an aperiodic CSI report.

In one embodiment, the second CSI report comprises a CQI.

In one embodiment, the second CSI report comprises a RI.

In one embodiment, a reference signal corresponding to the second CSI report includes the second reference signal.

In one embodiment, the second CSI report is obtained by a measurement on the second reference signal.

In one embodiment, the second CSI report is obtained by a channel measurement on the second reference signal.

In one embodiment, the second CSI report is obtained by an interference measurement on the second reference signal.

In one embodiment, a transmitter of the second CSI report calculates contents contained in the second CSI report only according to a channel measurement on the second reference signal.

In one embodiment, the second CSI report is an aperiodic CSI report.

In one embodiment, the second reference signal comprises an SL reference signal.

In one embodiment, the second reference signal comprises a CSI-RS.

In one embodiment, the second reference signal comprises an SL CSI-RS.

In one embodiment, the second reference signal comprises an SRS.

In one embodiment, the second reference signal comprises a DMRS.

In one embodiment, the second reference signal comprises an SL DMRS.

In one embodiment, the second reference signal comprises an aperiodic CSI-RS.

In one embodiment, the first reference signal and the second reference signal are respectively two transmissions of a same CSI-RS.

In one embodiment, the first reference signal and the second reference signal are respectively single-transmissions of two different CSI-RSs.

In one embodiment, the first reference signal and the second reference signal are Quasi-Co-Located (QCL).

In one embodiment, the first reference signal and the second reference signal are QCL, corresponding to QCL-TypeD.

In one embodiment, the first reference signal and the second reference signal are not QCL.

In one embodiment, the first reference signal and the second reference signal are not QCL, let alone corresponding to QCL-T eD.

In one embodiment, the second CSI report and the first CSI report are for a same PC5-RRC connection.

In one embodiment, the second CSI report and the first CSI report share a same transmitter.

In one embodiment, the first reference signal and the second reference signal share a same target receiver.

In one embodiment, the first reference signal and the second reference signal correspond to a same PC5-RRC connection.

In one embodiment, the first reference signal and the second reference signal share a same Tx power.

In one embodiment, the first reference signal and the second reference signal share a same Tx power per PRB.

In one embodiment, the first reference signal and the second reference signal share a same Tx power per RE.

In one embodiment, the first reference signal and the second reference signal have different Tx powers.

In one embodiment, the first reference signal and the second reference signal have different Tx powers per PRB.

In one embodiment, the first reference signal and the second reference signal have different Tx powers per RE.

In one embodiment, a channel that the second reference signal goes through can be inferred from a channel that the first reference signal goes through.

In one embodiment, a channel that the second reference signal goes through cannot be inferred from a channel that the first reference signal goes through.

In one embodiment, the first threshold is a positive integer.

In one embodiment, the first threshold is equal to 1.

In one embodiment, the first threshold is greater than 1.

In one embodiment, the first threshold is fixed.

In one embodiment, the first threshold is configured by an RRC parameter.

In one embodiment, the first threshold is configured by a PC5-RRC parameter.

In one embodiment, the phrase of capable of triggering a second CSI report means being capable of transmitting the second reference signal.

In one embodiment, if the first node is capable of triggering the second CSI report in the first time window, the first node autonomously determines whether to trigger the second CSI report in the first time window.

In one embodiment, the first node is capable of triggering the second CSI report in the first time window, and the first node will trigger the second CSI report in the first time window.

In one embodiment, the first node is capable of triggering the second CSI report in the first time window, but the first node won't trigger the second CSI report in the first time window.

In one embodiment, the first node is incapable of triggering the second CSI report in the first time window, and the first node won't trigger the second CSI report in the first time window.

Embodiment 18

Figure 18:
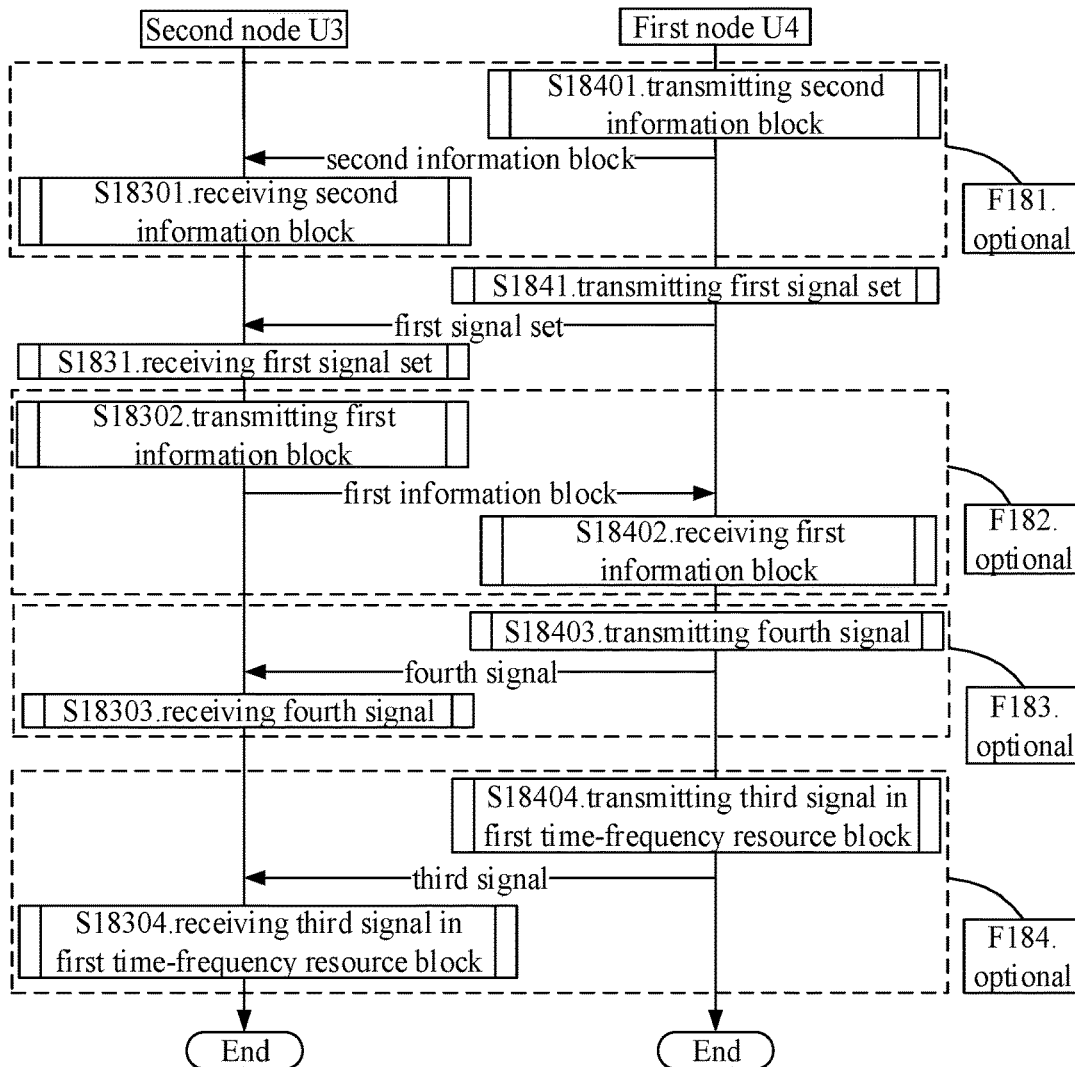
FIG. 18 illustrates a flowchart of a wireless transmission according to one embodiment of the present disclosure.

Embodiment 18 illustrates a flowchart of a wireless transmission according to one embodiment of the present disclosure, as shown in FIG. 18. In FIG. 18, a second node U3 and a first node U4 are communication nodes in transmission via an air interface. As shown in FIG. 18, steps marked by boxes F181-184 are optional, respectively.

The second node U3 receives a second information block in step S18301; and receives a first signal set in step S1831; transmits a first information block in step S18302; receives a fourth signal in step S18303; and receives a third signal in a first time-frequency resource block in step S18304.

The first node U4 transmits a second information block in step S18401; and transmits a first signal set in step S1841; receives a first information block in step S18402; transmits a fourth signal in step S18403; and transmits a third signal in a first time-frequency resource block in step S18404.

In Embodiment 18, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used by the first node U4 for triggering a first CSI report; a first condition set is used by the first node U4 for determining whether the first node is capable of triggering a second CSI report in the first time window; when the first condition set is fulfilled, the first node U4 is unable to trigger the second CSI report in the first time window; when the first condition set is not fulfilled, the first node U4 is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first node U4 is the first node in the present disclosure.

In one embodiment, the second node U3 is the first node in the present disclosure.

In one embodiment, an air interface between the second node U3 and the first node U4 includes a PC5 interface.

In one embodiment, an air interface between the second node U3 and the first node U4 includes a sidelink.

In one embodiment, an air interface between the second node U3 and the first node U4 includes a radio interface between a relay node and a UE.

In one embodiment, an air interface between the second node U3 and the first node U4 includes a radio interface between UEs.

In one embodiment, the first node is a terminal.

In one embodiment, the first node is an automobile.

In one embodiment, the first node is a vehicle.

In one embodiment, the first node is a Road Side Unit (RSU).

In one embodiment, the second node is a terminal.

In one embodiment, the second node is an automobile.

In one embodiment, the second node is a vehicle.

In one embodiment, the second node is an RSU.

In one embodiment, time-domain resource(s) occupied by one or more signals in the first signal set is(are) used by the first node for determining the first time window.

In one embodiment, time-domain resource(s) occupied by one or more signals in the first signal set is(are) used by the second node for determining the first time window.

In one embodiment, the first condition set is used by the first node for determining whether the first node is capable of triggering the second CSI report in the first time window.

In one embodiment, the first condition set is used by the second node for determining whether the first node is capable of triggering the second CSI report in the first time window.

In one embodiment, the first sub-signal comprises two parts, which are respectively transmitted on a PSCCH and a PSSCH.

In one embodiment, the first sub-signal is transmitted on a PSCCH.

In one embodiment, the first sub-signal is transmitted on a PSSCH.

In one embodiment, any signal in the first signal set comprises two parts, which are respectively transmitted on a PSCCH and a PSSCH.

In one embodiment, the above method in a first node for wireless communications comprises:
  transmitting a third sub-signal in the first time window;
  herein, the first node can trigger the second CSI report in the first time window; the third sub-signal comprises one or more fields in SCI, and the third sub-signal comprises the first field, the first field in the third sub-signal being used to trigger the second CSI report.

In one embodiment, the third sub-signal comprises two parts, which are respectively transmitted on a PSCCH and a PSSCH.

In one embodiment, the third sub-signal is transmitted on a PSSCH.

In one embodiment, the above method in a first node for wireless communications comprises:
  dropping triggering the second CSI report in the first time window;
  herein, the first node can trigger the second CSI report in the first time window.

In one embodiment, steps in the box F181 of FIG. 18 exist; the second information block comprises configuration information of the first reference signal and a first parameter, the first parameter being used to determine the first time window.

In one embodiment, the first parameter is used by the first node for determining the first time window.

In one embodiment, the first parameter is used by the second node for determining the first time window.

In one embodiment, the second information block is transmitted on a PSSCH.

In one embodiment, steps marked by the box F182 in FIG. 18 exist; the first information block comprises a first channel quality and a second channel quality; a measurement on the first reference signal is used by the second node U3 for determining the first channel quality and the second channel quality, the first channel quality and the second quality are for a same frequency-domain resource, and respectively correspond to a first received quality and a second received quality, the first channel quality and the second quality being real numbers respectively, the first received quality being unequal to the second received quality.

In one embodiment, the first information block is transmitted on a PSSCH.

In one embodiment, steps marked by both the box F182 and the box F184 in FIG. 18 exist; a target receiver of the third signal is a target receiver of the first signal set; a target channel quality is used by the first node U4 for determining a Modulation and Coding Scheme (MCS) employed by the third signal, and the target channel quality is either the first channel quality or the second channel quality; whether the first time-frequency resource block is reserved is used the first node U4 for determining the target channel quality between the first channel quality and the second channel quality.

In one embodiment, the third signal is transmitted on a PSSCH.

In one embodiment, steps marked by the box F182, the box F183 and the box F184 in FIG. 18 exist; the fourth signal comprises scheduling information of the third signal, and the fourth signal comprises SCI.

In one embodiment, the fourth signal is transmitted on a PSCCH.

In one embodiment, the fourth signal is transmitted on a PSSCH.

In one embodiment, the fourth signal comprises two parts, which are respectively transmitted on a PSCCH and a PSSCH.

In one embodiment, both the first sub-signal and the fourth signal comprise a second field, the second field of the first sub-signal indicates a first Destination ID, while the second field of the fourth signal indicates a second Destination ID; the first Destination ID and the second Destination ID are non-negative integers; the first Destination ID is equal to the second Destination ID.

In one embodiment, the fourth signal is transmitted in the first time-frequency resource block.

Embodiment 19

Figure 19:
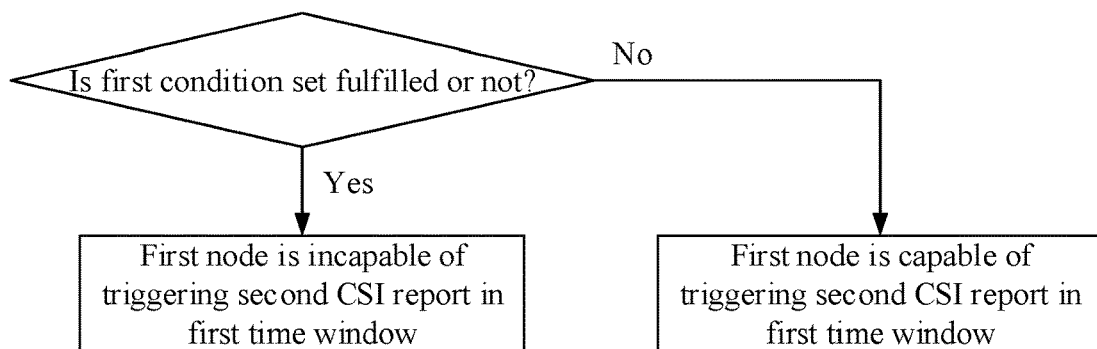
FIG. 19 illustrates a schematic diagram of a first condition set being used to determine whether a first node is capable of triggering a second CSI report in a first time window according to one embodiment of the present disclosure.

Embodiment 19 illustrates a schematic diagram of a first condition set being used to determine whether a first node is capable of triggering a second CSI report in a first time window according to one embodiment of the present disclosure; as shown in FIG. 19. In Embodiment 19, in instances when the first condition set is fulfilled, the first node is incapable of triggering the second CSI report in the first time window; in instances when the first condition set is unfulfilled, the first node is capable of triggering the second CSI report in the first time window.

In one embodiment, the first condition set comprises only the first condition of the first condition and the second condition.

In one embodiment, the first condition set comprises only the second condition of the first condition and the second condition.

In one embodiment, the first condition set comprises the first condition and the second condition.

In one embodiment, the first condition set is composed of the first condition and the second condition.

In one embodiment, the first condition set is composed of K conditions, K being a positive integer greater than 1; when each of the K conditions is fulfilled, the first condition set is fulfilled; when any one of the K conditions is unfulfilled, the first condition set is unfulfilled.

In one embodiment, the first condition set only comprises one condition; if the condition is fulfilled, the first condition set is fulfilled; if the condition is not fulfilled, the first condition set is not fulfilled.

In one embodiment, the first condition comprises: the S CSI reports are respectively associated with S first-type indexes, the first index is one of the S first-type indexes being associated with the first CSI report, and each of the S first-type indexes is of a value equal to the first index.

In one embodiment, the first condition set is composed of the first condition and the second condition; when and only when the first condition and the second condition are fulfilled will the first condition set be fulfilled.

Embodiment 20

Figure 20:
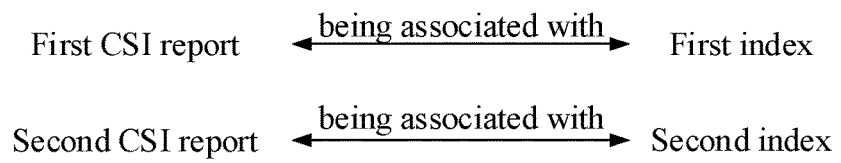
FIG. 20 illustrates a schematic diagram of a first CSI report being associated with a first index and a second CSI report being associated with a second index according to one embodiment of the present disclosure.

Embodiment 20 illustrates a schematic diagram of a first CSI report being associated with a first index and a second CSI report being associated with a second index according to one embodiment of the present disclosure; as shown in FIG. 20.

In one embodiment, the first index and the second index are non-negative integers, respectively.

In one embodiment, the first index is equal to the second index.

In one embodiment, the first index is unequal to the second index.

In one embodiment, the first CSI report is a report corresponding to a first report configuration.

In one embodiment, the phrase that the first CSI report is associated with the first index means that the first report configuration is associated with the first index.

In one embodiment, the first index is used for identifying the first report configuration.

In one embodiment, the first report configuration indicates contents contained in the first CSI report.

In one embodiment, the first report configuration comprises information of one or more than one field in an Information Element (IE).

In one embodiment, the first report configuration comprises all or part of information in a PC5-RRC message.

In one embodiment, the first report configuration comprises part of information in an RRCReconfigurationSidelink message.

In one embodiment, the first report configuration comprises part of information in RRCReconfigurationSidelink-IEs in an RRCReconfigurationSidelink message.

In one embodiment, the second CSI report is a report corresponding to a second report configuration.

In one embodiment, the phrase that the second CSI report is associated with the second index means that the second report configuration is associated with the second index.

In one embodiment, the second index is used for identifying the second report configuration.

In one embodiment, the second report configuration indicates contents contained in the second CSI report.

In one embodiment, the second report configuration comprises information of one or more than one field in an Information Element (IE).

In one embodiment, the second report configuration comprises all or part of information in a PC5-RRC message.

In one embodiment, the second report configuration comprises part of information in an RRCReconfigurationSidelink message.

In one embodiment, the second report configuration comprises part of information in RRCReconfigurationSidelink-IEs-r16 in an RRCReconfigurationSidelink message.

In one embodiment, the first report configuration is the second report configuration.

In one embodiment, the first report configuration and the second report configuration are two different report configurations.

In one embodiment, what the first CSI report contains comprises a CQI and an RI.

In one embodiment, what the second CSI report contains comprises a CQI and an RI.

In one embodiment, the first index is equal to a codepoint of a CSI request field corresponding to the first CSI report.

In one embodiment, the second index is equal to a codepoint of a CSI request field corresponding to the second CSI report.

In one embodiment, the first index is equal to a codepoint of a CSI request field corresponding to the first report configuration.

In one embodiment, the second index is equal to a codepoint of a CSI request field corresponding to the second report configuration.

In one embodiment, the phrase that the first CSI report is associated with the first index means that the first reference signal is used for determining the first index.

In one embodiment, the first index is used for identifying the first reference signal.

In one embodiment, the first index is an identifier of a reference signal resource corresponding to the first reference signal.

In one embodiment, the first index is an identifier of a reference signal resource set to which a reference signal resource corresponding to the first reference signal belongs.

In one embodiment, a reference signal resource corresponding to the first reference signal comprises a CSI-RS resource.

In one embodiment, a reference signal resource set to which a reference signal resource corresponding to the first reference signal belongs comprises a CSI-RS resource set.

In one embodiment, the phrase that the second CSI report is associated with the second index means that the second reference signal is used for determining the second index.

In one embodiment, the second index is used for identifying the second reference signal.

In one embodiment, the second index is an identifier of a reference signal resource corresponding to the second reference signal.

In one embodiment, the second index is an identifier of a reference signal resource set to which a reference signal resource corresponding to the second reference signal belongs.

In one embodiment, a reference signal resource corresponding to the second reference signal comprises a CSI-RS resource.

In one embodiment, a reference signal resource set to which a reference signal resource corresponding to the second reference signal belongs comprises a CSI-RS resource set.

In one embodiment, a spatial relation of the first reference signal is used for determining the first index.

In one embodiment, a spatial relation of the second reference signal is used for determining the second index.

In one embodiment, the spatial relation comprises a TCI state.

In one embodiment, the spatial relation comprises a QCL assumption.

In one embodiment, the spatial relation comprises a spatial setting.

In one embodiment, the spatial relation comprises a spatial domain filter.

In one embodiment, the spatial relation comprises a Spatial Tx parameter.

In one embodiment, the spatial relation comprises a Spatial Rx parameter.

In one embodiment, if the first reference signal and the second reference signal are two different transmissions of a same CSI-RS, the first index is equal to the second index; if the first reference signal and the second reference signal are respectively single-transmissions of two different CSI-RSs, the first index is unequal to the second index.

In one embodiment, if the first reference signal and the second reference signal are QCL, the first index is equal to the second index; if the first reference signal and the second reference signal are non-QCL, the first index is unequal to the second index.

In one embodiment, if the first reference signal and the second reference signal are QCL, corresponding to QCL-TypeD, the first index is equal to the second index; if the first reference signal and the second reference signal are non-QCL, corresponding to QCL-TypeD, the first index is unequal to the second index.

In one embodiment, if a reference signal resource corresponding to the first reference signal and a reference signal resource corresponding to the second reference signal belong to a same reference signal resource set, the first index is equal to the second index; if a reference signal resource corresponding to the first reference signal and a reference signal resource corresponding to the second reference signal respectively belong to different reference signal resource sets, the first index is unequal to the second index.

Embodiment 21

Figure 21:
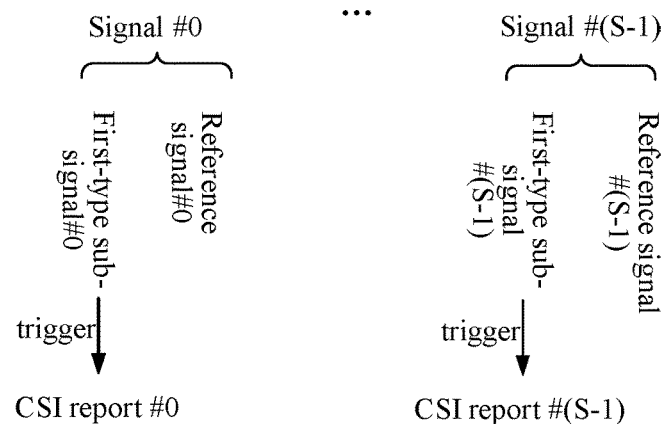
FIG. 21 illustrates a schematic diagram of S signals, S first-type sub-signals and S reference signals according to one embodiment of the present disclosure.

Embodiment 21 illustrates a schematic diagram of S signals, S first-type sub-signals and S reference signals according to one embodiment of the present disclosure; as shown in FIG. 21. In Embodiment 21, the S signals respectively comprise the S first-type sub-signals, and the S signals respectively comprise the S reference signals; the first fields respectively comprised by the S first-type sub-signals are used for triggering the S CSI reports respectively; the S signals share a same target receiver. In FIG. 21, indexes of the S signals, the S first-type sub-signals, the S reference signals and the S CSI reports are #0 . . . , and #(S-1), respectively.

In one embodiment, the first fields in the S first-type sub-signals are respectively used by the first node for triggering the S CSI reports.

In one embodiment, the first signal is any one of the S signals.

In one embodiment, the S signals are mutually orthogonal in time domain.

In one embodiment, there are two signals of the S signals being overlapping in time domain resources.

In one embodiment, of the S signals there is one signal earlier than the first signal in time domain.

In one embodiment, of the S signals there is one signal later than the first signal in time domain.

In one embodiment, of the S signals there is one signal overlapping with the first signal in time domain.

In one embodiment, the S signals respectively comprise S second-type sub-signals, and the S first-type sub-signals respectively indicate scheduling information of the S second-type sub-signals.

In one subembodiment, the S second-type sub-signals are respectively transmitted on S PSSCHs.

In one subembodiment, any of the S second-type sub-signals carries at least one of a TB, a CB or a CBG.

In one embodiment, the first sub-signal is one of the S first-type sub-signals.

In one embodiment, the first sub-signal is a first-type sub-signal comprised by the first signal.

In one embodiment, any of the S first-type sub-signals comprises SCI.

In one embodiment, any of the S first-type sub-signals comprises 1st stage SCI.

In one embodiment, any of the S first-type sub-signals comprises 2nd stage SCI.

In one embodiment, any of the S first-type sub-signals comprises two parts, which are respectively transmitted on a PSCCH and a PSSCH.

In one embodiment, any of the S first-type sub-signals is transmitted on a PSSCH.

In one embodiment, any of the S first-type sub-signals is transmitted on a PSCCH.

In one embodiment, a value of the first field in each of the S first-type sub-signals is equal to 1.

In one embodiment, a value of the first field in each of the S first-type sub-signals is greater than 0.

In one embodiment, values of the first fields in the S first-type sub-signals are equal.

In one embodiment, the first reference signal is one of the S reference signals.

In one embodiment, reference signal corresponding to the S CSI reports respectively comprise the S reference signals.

In one embodiment, the S CSI reports are respectively obtained by measurements on the S reference signals.

In one embodiment, the S CSI reports are respectively obtained by channel measurements on the S reference signals.

In one embodiment, the S CSI reports are respectively obtained by interference measurements on the S reference signals.

In one embodiment, for any given signal of the S signals, the given signal comprises a given first-type sub-signal of the S first-type sub-signals and a given reference signal of the S reference signals, and the first field comprised in the given first-type sub-signal is used for triggering a given CSI report of the S CSI reports; a transmitter of the given CSI report calculates contents contained by the given CSI report only according to a channel measurement on the given reference signal.

In one embodiment, the S reference signals respectively comprise SL reference signals.

In one embodiment, the S reference signals respectively comprise SL CSI-RSs.

In one embodiment, the S reference signals respectively comprise SRSs.

In one embodiment, the S reference signals respectively comprise SL DMRSs.

In one embodiment, the S reference signals are respectively S transmissions of a same CSI-RS.

In one embodiment, the S reference signals are respectively S transmissions of a same SL CSI-RS.

In one embodiment, any two of the S reference signals are QCL.

In one embodiment, any two of the S reference signals are QCL, corresponding to QCL-T eD.

In one embodiment, the S reference signals have a same Tx power.

In one embodiment, the S reference signals have a same Tx power per PRB.

In one embodiment, the S reference signals have a same Tx power per RE.

In one embodiment, the first fields in the S first-type sub-signals respectively indicate that the S reference signals are transmitted.

In one embodiment, the S first-type sub-signals respectively schedule S time-frequency resource blocks, the S signals are respectively transmitted in the S time-frequency resource blocks, and the first fields in the S first-type sub-signals respectively indicate that the S reference signals are transmitted respectively in the S time-frequency resource blocks.

In one embodiment, the first CSI report is one of the S CSI reports.

In one embodiment, the first CSI report is one of the S CSI reports that is triggered by the first field in the first sub-signal.

In one embodiment, the S CSI reports are respectively S reports corresponding to the first report configuration.

In one embodiment, the S CSI reports correspond to a same PC5-RRC connection.

In one embodiment, the S CSI reports correspond to a same transmitter.

In one embodiment, the S CSI reports are respectively associated with S first-type indexes, the first index is a first-type index associated with the first CSI report, and all of the S first-type indexes are of a value equal to the first index.

In one embodiment, the phrase that a given CSI report is associated with a given first-type index has a similar meaning to the phrase that the first CSI report is associated with the first index, except that the first CSI report and the first index are respectively replaced with the given CSI report and the given first-type index; the given CSI report is any CSI report of the S CSI reports, and the given first-type index is one of the S first-type indexes being associated with the given CSI report.

In one embodiment, the S first-type indexes are non-negative integers, respectively.

In one embodiment, any of the S first-type indexes is used for identifying the first report configuration.

In one embodiment, the S first-type indexes are respectively used for identifying report configurations for the S CSI reports.

In one embodiment, the S first-type indexes are CSI request field codepoints corresponding to report configurations for the S CSI reports.

In one embodiment, the S reference signals are respectively used for determining the S first-type indexes.

In one embodiment, the S first-type indexes are respectively used for identifying the S reference signals.

In one embodiment, the S first-type indexes are respectively used for identifying reference signal resources corresponding to the S reference signals.

In one embodiment, the S first-type indexes are respectively used for identifying reference signal resource sets to which reference signal resources corresponding to the S reference signals respectively belong.

In one embodiment, the S reference signals are respectively S transmissions of a first CSI-RS.

In one embodiment, any of the S first-type indexes is an identifier of the first CSI-RS.

In one embodiment, any of the S first-type indexes is an identifier of a reference signal resource corresponding to the first CSI-RS.

In one embodiment, any of the S first-type indexes is an identifier of a reference signal resource set to which a reference signal resource corresponding to the first CSI-RS belongs.

In one embodiment, spatial relations of the S reference signals are respectively used for determining the S first-type indexes.

In one embodiment, any of the S CSI reports comprises a CQI.

In one embodiment, any of the S CSI reports comprises an RI.

In one embodiment, any of the S CSI reports is an aperiodic CSI report.

In one embodiment, the phrase that the S signals share a same target receiver includes a meaning that any of the S first-type sub-signals comprises a second field, the second fields in the S first-type sub-signals respectively indicate S Destination IDs, and any two of the S Destination IDs are the same.

In one embodiment, the second field comprises information of Destination ID fields in SCI format 2-A and SCI format 2-B.

In one embodiment, any of the S Destination IDs is a non-negative integer.

In one embodiment, the first Destination ID is one of the S Destination IDs.

In one embodiment, the phrase that the S signals share a same target receiver includes a meaning that the S CSI reports share a same transmitter.

Embodiment 22

Figure 22:
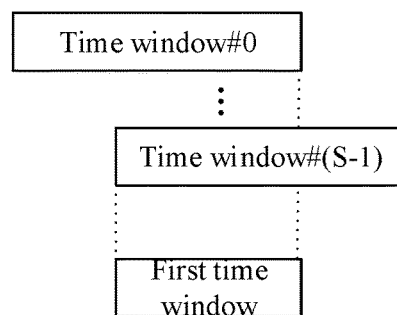
FIG. 22 illustrates a schematic diagram of S time windows and a first time window according to one embodiment of the present disclosure.

Embodiment 22 illustrates a schematic diagram of S time windows and a first time window according to one embodiment of the present disclosure, as shown in FIG. 22. In Embodiment 22, time-domain resources occupied by the S signals are respectively used for determining the S time windows, and the S time windows are used for determining the first time window. In FIG. 22, indexes of the S time windows are #0 . . . , and #(S-1), respectively.

In one embodiment, time-domain resources occupied by the S signals are respectively used by the first node for determining the S time windows, and the S time windows are used by the first node for determining the first time window.

In one embodiment, time-domain resources occupied by the S signals are respectively used by the second node for determining the S time windows, and the S time windows are used by the second node for determining the first time window.

In one embodiment, any of the S time windows is a contiguous time duration.

In one embodiment, any of the S time windows comprises one multicarrier symbol or multiple consecutive multicarrier symbols.

In one embodiment, any of the S time windows comprises one slot or multiple consecutive slots.

In one embodiment, any of the S time windows comprises one time unit or multiple consecutive time units.

In one embodiment, any two of the S time windows are overlapping in time domain.

In one embodiment, any two of the S time windows are not completely overlapping in time domain.

In one embodiment, there are two of the S time windows being completely overlapping in time domain.

In one embodiment, any two of the S time windows are of an equal length.

In one embodiment, any of the S time windows is of a length equal to the first parameter.

In one embodiment, a number of slots comprised by any of the S time windows is equal to the first parameter.

In one embodiment, a start of a time window corresponding to any given signal out of the S signals is an end time of a time-domain resource occupied by the given signal.

In one embodiment, a start of a time window corresponding to any given signal out of the S signals is a start time of a time-domain resource occupied by the given signal.

In one embodiment, a start of a time window corresponding to any given signal out of the S signals is an end time of a slot occupied by the given signal.

In one embodiment, a start of a time window corresponding to any given signal out of the S signals is a start time of a slot occupied by the given signal.

In one embodiment, a start of a time window corresponding to any given signal out of the S signals is an end time of a time unit occupied by the given signal.

In one embodiment, a start of a time window corresponding to any given signal out of the S signals is a start time of a time unit occupied by the given signal.

In one embodiment, an end of any given time window of the S time windows is end time of a last slot expected to receive or accomplish a CSI report corresponding to the given time window.

In one embodiment, the first time window comprises common parts of the S time windows.

In one embodiment, the first time window is composed of common parts of the S time windows.

In one embodiment, the first time window is an intersection of the S time windows.

Embodiment 23

Figure 23:
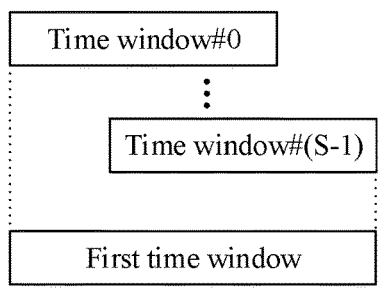
FIG. 23 illustrates a schematic diagram of S time windows and a first time window according to one embodiment of the present disclosure.

Embodiment 23 illustrates a schematic diagram of S time windows and a first time window according to one embodiment of the present disclosure; as shown in FIG. 23. In FIG. 23, indexes of the S time windows are #0 . . . , and #(S-1), respectively. In Embodiment 23, the first time window is a union set of S time windows.

In one embodiment, the first time window is a set of the S time windows.

In one embodiment, the first time window comprises a set of the S time windows.

Embodiment 24

Figure 24:
FIG. 24 illustrates a schematic diagram of a first information block according to one embodiment of the present disclosure.

Embodiment 24 illustrates a schematic diagram of a first information block according to one embodiment of the present disclosure; as shown in FIG. 24. In Embodiment 24, the first information block comprises the first channel quality and the second channel quality.

In one embodiment, the first information block is carried by a physical layer signaling.

In one embodiment, the first information block is carried by a L1 signaling.

In one embodiment, the first information block is carried by a Medium Access Control layer Control Element (MAC CE).

In one embodiment, the first information block is transmitted in the first time window.

In one embodiment, the first information block is transmitted outside the first time window.

In one embodiment, the first information block is transmitted in one of the S time windows.

In one embodiment, the first information block comprises the first CSI report.

In one embodiment, measurements on the S reference signals are used for determining the first information block.

In one embodiment, a measurement on each of the S reference signals is used for determining the first information block.

In one embodiment, measurements on some of the S reference signals are used for determining the first information block.

In one embodiment, the first information block comprises each CSI report of the S CSI reports.

In one embodiment, the first node triggers the second CSI report in the first time window, and a measurement on the second reference signal is used for determining the first information block.

In one embodiment, the first node triggers the second CSI report in the first time window, the first information block comprising the second CSI report.

In one embodiment, the first CSI report comprises a first CQI, the first channel quality being the first CQI.

In one embodiment, the S CSI reports respectively comprise S CQIs.

In one subembodiment, the first channel quality is a largest one of the S CQIs.

In one subembodiment, the second channel quality is a smallest one of the S CQIs.

In one subembodiment, the second channel quality is not any one of the S CQIs.

In one embodiment, the first information block comprises a first information sub-block, the first information sub-block indicating that a measurement on the first reference signal is used for determining the first information block.

In one embodiment, the first information block comprises a first information sub-block, the first information sub-block indicating on which reference signals of the S reference signals measurements are used for determining the first information block.

In one embodiment, the first channel quality and the second channel quality respectively comprise one CQI.

In one embodiment, the first channel quality and the second channel quality are respectively CQIs.

In one embodiment, the first channel quality and the second channel quality respectively comprise a Reference Signal Received Power (RSRP).

In one embodiment, the first channel quality and the second channel quality respectively comprise a Signal-to-noise and interference ratio (SINR).

In one embodiment, the first channel quality and the second channel quality correspond to a same PRB set.

In one embodiment, the first information block comprises a first RI and a second RI, and the first channel quality and the second channel quality are respectively calculated when given the first RI and the second RI; the first RI and the second RI are positive integers, respectively.

In one embodiment, the first RI is unequal to the second RI.

In one embodiment, the first RI is equal to the second RI.

In one embodiment, the first channel quality and the second channel quality are respectively CQIs, and the first information block indicates a CQI index corresponding to the first channel quality and a CQI index corresponding to the second channel quality respectively.

Embodiment 25

Figure 25:
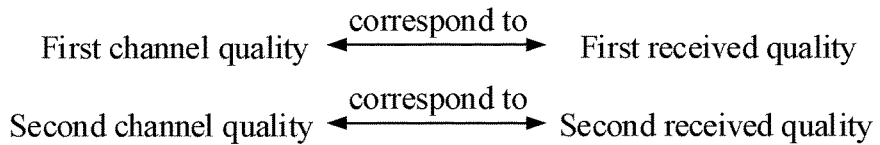
FIG. 25 illustrates a schematic diagram of a first channel quality and a second channel quality respectively corresponding to a first received quality and a second received quality according to one embodiment of the present disclosure.

Embodiment 25 illustrates a schematic diagram of a first channel quality and a second channel quality respectively corresponding to a first received quality and a second received quality according to one embodiment of the present disclosure; as shown in FIG. 25. In Embodiment 25, the first channel quality indicates: when a first bit block occupies a first reference resource block, and the first bit block adopts a modulation mode-code rate-TB size combination corresponding to the first channel quality and a received quality of the first bit block is the first received quality, the first bit block can be received with a TB BLER (i.e., Block Error Rate) not exceeding a second threshold; the second channel quality indicates: when the first bit block occupies the first reference resource block, and the first bit block adopts a modulation mode-code rate-TB size combination corresponding to the second channel quality and a received quality of the first bit block is the second received quality, the first bit block can be received with a TB BLER not exceeding the second threshold.

In one embodiment, the first information block comprises a second information sub-block, and the second information sub-block indicates the first reference resource block.

In one embodiment, the second information sub-block indicates a frequency-domain resource occupied by the first reference resource block.

In one embodiment, the second information sub-block indicates a time-domain resource occupied by the first reference resource block.

In one embodiment, a time-frequency resource occupied by the first reference resource block is associated with a time-frequency resource occupied by the first reference signal.

In one embodiment, a time-frequency resource occupied by the first reference resource block is associated with time-frequency resources occupied by the S reference signals.

In one embodiment, the first reference resource block comprises more than one RE in time-frequency domain.

In one embodiment, the first reference resource block comprises at least one PRB in frequency domain.

In one embodiment, the first reference resource block comprises 1 slot in time domain.

In one embodiment, the first reference resource block comprises multiple slots in time domain.

In one embodiment, the first reference resource block comprises 1 SL slot.

In one embodiment, the first reference resource block comprises multiple SL slots.

In one embodiment, the first reference resource block is defined as a PRB group occupied by the first reference signal in frequency domain.

In one embodiment, the first reference resource block is defined as a sub-channel group occupied by the first reference signal in frequency domain.

In one embodiment, the first reference resource block is defined as a sub-channel group occupied by the first signal in frequency domain.

In one embodiment, the first reference resource block is defined as a union of PRB groups occupied by the S reference signals in frequency domain.

In one embodiment, the first reference resource block is defined as a union of sub-channel groups occupied by the S reference signals in frequency domain.

In one embodiment, the first reference resource block is defined as a union of sub-channel groups occupied by the S signals in frequency domain.

In one embodiment, the first reference resource block is defined as a slot occupied by the first signal in time domain.

In one embodiment, the first reference resource block is defined as an SL slot occupied by the first signal in time domain.

In one embodiment, the first reference resource block is defined as an SL slot occupied by a CSI request corresponding to the first CSI report in time domain.

In one embodiment, the first reference resource block is defined as a union of SL slots occupied by the S signals in time domain.

In one embodiment, the first reference resource block is defined as a union of SL slots occupied by CSI requests corresponding to S CSI reports in time domain.

In one embodiment, a time-domain resource occupied by the first reference resource block is associated with a time-domain resource occupied by the first information block.

In one embodiment, a second time unit is a time unit to which the first information block belongs, and the second time unit is used for determining a time-domain resource occupied by the first reference resource block.

In one embodiment, the first reference resource block is located before the second time unit in time domain.

In one embodiment, the first reference resource block is defined as the second time unit in time domain.

In one embodiment, the first reference resource block is defined as a target time unit in time domain, and the target time unit is a latest time unit available for V2X transmission no later than the second time unit, with a start time between which and a start time of the second time unit there is a time interval no smaller than a second parameter; the second parameter is a non-negative integer.

In one subembodiment, a delay requirement is used for determining the second parameter.

In one subembodiment, the second parameter is configured by PC5-RRC.

In one embodiment, both a frequency-domain resource corresponding to the first channel quality and a frequency-domain resource corresponding to the second channel quality are frequency-domain resource occupied by the first reference resource block.

In one embodiment, the first bit block comprises a TB.

In one embodiment, the first bit block comprises a TB transmitted on a PSSCH.

In one embodiment, the TB BLER refers to Transport Block Error Probability.

In one embodiment, the second threshold is a positive real number less than 1.

In one embodiment, the second threshold is 0.1.

In one embodiment, the second threshold is 0.00001.

In one embodiment, the second threshold is 0.000001.

In one embodiment, the second threshold is a positive real number no greater than 0.1 and no less than 0.000001.

In one embodiment, the first received quality and the second received quality are real numbers respectively.

In one embodiment, the first received quality and the second received quality are non-negative real numbers respectively.

In one embodiment, the first received quality and the second received quality are respectively measured in dB.

In one embodiment, the first received quality and the second received quality are respectively measured in dBm.

In one embodiment, the first received quality and the second received quality are respectively measured in Watts.

In one embodiment, the received quality comprises a SINR.

In one embodiment, the received quality is a SINR.

In one embodiment, the received quality comprises a RSRP.

In one embodiment, the received quality comprises a signal power.

In one embodiment, the received quality comprises an interference and noise power.

In one embodiment, the received quality of the first bit block refers to a received quality of a radio signal carrying the first bit block.

In one embodiment, the received quality of the first bit block is equal to a linear average value of power contribution of an RE carrying the first bit block being divided by a linear average value of interference and noise power contribution of an RE carrying the first bit block.

In one embodiment, the received quality of the first bit block is equal to a dB value of a ratio of a linear average value of power contribution of an RE carrying the first bit block to a linear average value of interference and noise power contribution of an RE carrying the first bit block.

In one embodiment, the received quality of the first bit block is a RSRP of an RE carrying the first bit block.

In one embodiment, the received quality of the first bit block is a linear average value of interference and noise power contribution of an RE carrying the first bit block.

In one embodiment, the received quality of the first bit block is a real number.

In one embodiment, the received quality of the first bit block is a non-negative real number.

In one embodiment, the received quality of the first bit block is measured in dB.

In one embodiment, the received quality of the first bit block is measured in dBm.

In one embodiment, the received quality of the first bit block is measured in Watts.

In one embodiment, a first spatial domain filter is used for determining the first received quality, and a second spatial domain filter is used for determining the second received quality; the second spatial domain filter is different from the first spatial domain filter.

In one embodiment, a transmitter of the first information block uses the first spatial domain filter to measure the first reference signal to obtain the first received quality.

In one embodiment, a transmitter of the first information block uses the second spatial domain filter to measure the first reference signal to obtain the second received quality.

In one embodiment, S is equal to 2; a transmitter of the first information block uses the second spatial domain filter to measure each of the S reference signals different from the first reference signal to obtain the second received quality.

In one embodiment, P spatial domain filters are used for determining the first received quality and the second received quality, P being a positive integer greater than 1; any two of the P spatial domain filters are different.

In one embodiment, a transmitter of the first information block uses the P spatial domain filters to measure the first reference signal to respectively obtain P received qualities; the first received quality is a maximum received quality of the P received qualities.

In one embodiment, P is equal to S, a transmitter of the first information block uses the P spatial domain filters to respectively measure the S reference signals to respectively obtain P received qualities; the first received quality is a maximum received quality of the P received qualities.

In one embodiment, the second received quality is an average value of the P received qualities.

In one embodiment, the second received quality is an average value of linear values of the P received qualities.

In one embodiment, the second received quality is an average value of dB values of the P received qualities.

In one embodiment, the second received quality is an average value of dBm values of the P received qualities.

In one embodiment, the second received quality is a minimum received quality of the P received qualities.

In one embodiment, P is equal to S, a transmitter of the first information block uses the P spatial domain filters to respectively measure the S reference signals to respectively obtain P power contribution values and P interference and noise power contribution values; the second received quality is a ratio of a linear average value of the P power contribution values to a linear average value of the P interference and noise power contribution values.

In one embodiment, the spatial domain filter includes spatial domain receive filter.

Embodiment 26

Figure 26:
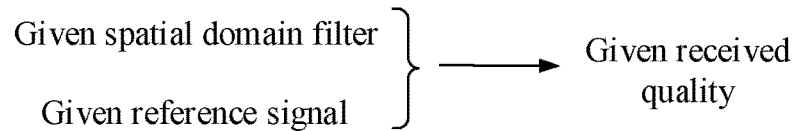
FIG. 26 illustrates a schematic diagram of using a given spatial domain filter to measure a given reference signal to obtain a given received quality according to one embodiment of the present disclosure.

Embodiment 26 illustrates a schematic diagram of using a given spatial domain filter to measure a given reference signal to obtain a given received quality according to one embodiment of the present disclosure; as shown in FIG. 26. In Embodiment 26, a transmitter of the first information block uses the given spatial domain filter to measure the given reference signal to obtain the given received quality; the given received quality is the first received quality or the second received quality, or any one of the P received qualities; the given spatial domain filter is the first spatial domain filter, or the second spatial domain filter, or any of the P spatial domain filters corresponding to the given received quality; the given reference signal is the first reference signal or one of the S reference signals corresponding to the given received quality.

In one embodiment, the given received quality is the first received quality, the given spatial domain filter is the first spatial domain filter, and the given reference signal is the first reference signal.

In one embodiment, the given received quality is the second received quality, the given spatial domain filter is the second spatial domain filter, and the given reference signal is the first reference signal.

In one embodiment, S is equal to 2; the given received quality is the second received quality, the given spatial domain filter is the second spatial domain filter, and the given reference signal is one of the S reference signals other than the first reference signal.

In one embodiment, the given received quality is any of the P received qualities, the given spatial domain filter is one of the P spatial domain filters corresponding to the given received quality; the given reference signal is the first reference signal.

In one embodiment, P is equal to S, a transmitter of the first information block uses the P spatial domain filters to measure the S reference signals respectively to obtain P received qualities; the given received quality is any one of the P received qualities, and the given spatial domain filter and the given reference signal are respectively a spatial domain filter and a reference signal corresponding to the given received quality.

In one embodiment, the given received quality is equal to a linear average value of power contribution of an RE carrying the given reference signal being divided by a linear average value of interference and noise power contribution of an RE carrying the given reference signal.

In one embodiment, the given received quality is equal to a ratio of a linear average value of power contribution of an RE carrying the given reference signal to a linear average value of interference and noise power contribution of an RE carrying the given reference signal obtained by a transmitter of the first information block receiving the given reference signal with the given spatial domain filter.

In one embodiment, the given received quality is equal to a dB value of a ratio of a linear average value of power contribution of an RE carrying the given reference signal to a linear average value of interference and noise power contribution of an RE carrying the given reference signal obtained by a transmitter of the first information block receiving the given reference signal with the given spatial domain filter.

In one embodiment, the given received quality is equal to an RSRP of an RE carrying the given reference signal obtained by a transmitter of the first information block receiving the given reference signal with the given spatial domain filter.

In one embodiment, the given received quality is equal to a linear average value of interference and noise power contribution of an RE carrying the given reference signal obtained by a transmitter of the first information block receiving the given reference signal with the given spatial domain filter.

Embodiment 27

Figure 27:
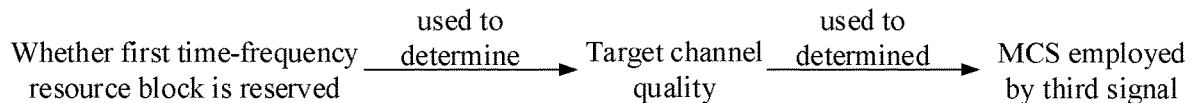
FIG. 27 illustrates a schematic diagram of a first time-frequency resource block, a target channel quality and an MCS employed by a third signal according to one embodiment of the present disclosure.

Embodiment 27 illustrates a schematic diagram of a first time-frequency resource block, a target channel quality and an MCS employed by a third signal according to one embodiment of the present disclosure; as shown in FIG. 27.

In Embodiment 27, the third signal is transmitted in the first time-frequency resource block; the target channel quality is used for determining an MCS of the third signal; whether the first time-frequency resource block is reserved is used for determining the target channel quality from the first channel quality and the second channel quality.

In one embodiment, the third signal comprises a radio signal.

In one embodiment, the third signal comprises a baseband signal.

In one embodiment, the third signal comprises an RF signal.

In one embodiment, the third signal is transmitted through Unicast.

In one embodiment, the third signal is transmitted through Groupcast.

In one embodiment, the third signal is transmitted through Broadcast.

In one embodiment, the third signal is transmitted in SideLink.

In one embodiment, the third signal is transmitted via a PC5 interface.

In one embodiment, the third signal carries at least one of a TB, a CB or a CBG.

In one embodiment, the first time-frequency resource block comprises a positive integer number of RE(s) in time-frequency domain.

In one embodiment, the first time-frequency resource block comprises a positive integer number of multicarrier symbol(s) in time domain.

In one embodiment, the first time-frequency resource block comprises one slot in time domain.

In one embodiment, the first time-frequency resource block comprises one SL slot in time domain.

In one embodiment, the first time-frequency resource block comprises one sub-channel or a positive integer number of consecutive sub-channels in frequency domain.

In one embodiment, the target channel quality is a CQI, and the target channel quality comprises a modulation mode, a code rate and a transmission efficiency.

In one embodiment, a modulation mode and a code rate of the third signal are respectively equal to the modulation mode and code rate comprised by the target channel quality.

In one embodiment, an absolute value of a difference between a transmission efficiency of the third signal and a transmission efficiency comprised by the target channel quality is no greater than a first given threshold, the first given threshold being a non-negative real number.

In one embodiment, a target received quality is one of the first received quality and the second received quality that corresponds to the target channel quality, and the target received quality is used for determining a third received quality, the third received quality is used for determining a third CQI, and a modulation mode and code rate of the third signal are respectively the modulation mode and code rate comprised by the third CQI.

In one embodiment, the target received quality is obtained by the first node through looking up tables according to the target channel quality.

In one embodiment, the target received quality is equal to an abscissa value of a point in a given curve whose corresponding Y-coordinate value is equal to the target channel quality.

In one embodiment, the third received quality is an estimated value of a SINR of the third signal.

In one embodiment, the third received quality is a sum of a dB value of the target received quality and a first power difference value; the first power different value is equal to a difference between a Tx power per RE measured in dBm of the third signal and a dBm value of a first Tx power value.

In one embodiment, the first Tx power value is equal to a Tx power per RE of the first reference signal.

In one embodiment, the first Tx power value is equal to a linear average value of Tx powers per RE of the S reference signals.

In one embodiment, the third CQI is obtained through looking up tables according to the third received quality.

In one embodiment, the third CQI is equal to a Y-coordinate value of a point in a given curve whose corresponding abscissa value is equal to the third received quality.

In one embodiment, the first node autonomously determines an MCS of the third signal according to the target channel quality.

In one embodiment, an MCS of the third signal is unrelated to any of the first channel quality and the second channel quality that is different from the target channel quality.

In one embodiment, the phrase of whether the first time-frequency resource block is reserved includes whether the first time-frequency resource block is reserved by the first node.

In one embodiment, the phrase of whether the first time-frequency resource block is reserved includes that the first node transmits a first signaling, the first signaling comprising one or more than one field in 1st stage SCI and indicating that the first time-frequency resource block is reserved.

In one embodiment, a third field in the first signaling indicates that the first time-frequency resource block is reserved, and the third field comprises all or part of information in a Time resource assignment field in SCI format 1-A.

In one embodiment, a third field in the second signaling indicates that the first time-frequency resource block is reserved, and the third field comprises all or part of information in a Frequency resource assignment field in SCI format 1-A.

In one embodiment, if the first time-frequency resource block is reserved, the target channel quality is the first channel quality; if the first time-frequency resource block is not reserved, the target channel quality is the second channel quality.

In one embodiment, if the first time-frequency resource block is reserved, the target channel quality is the second channel quality; if the first time-frequency resource block is not reserved, the target channel quality is the first channel quality.

Embodiment 28

Figure 28:
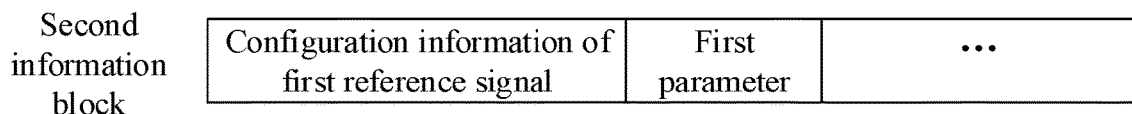
FIG. 28 illustrates a schematic diagram of a second information block according to one embodiment of the present disclosure.

Embodiment 28 illustrates a schematic diagram of a second information block according to one embodiment of the present disclosure; as shown in FIG. 28. In Embodiment 28, the second information block comprises configuration information of the first reference signal and the first parameter.

In one embodiment, the second information block is carried by a higher layer signaling.

In one embodiment, the second information block is carried by an RRC signaling.

In one embodiment, the second information block is carried by a PC5-RRC message.

In one embodiment, the second information block is carried by a MAC CE.

In one embodiment, the second information block comprises information of all or part of fields in an IE.

In one embodiment, a name of a PC5-RRC message carrying the second information block includes Reconfiguration.

In one embodiment, a name of a PC5-RRC message carrying the second information block includes Sidelink.

In one embodiment, the second information block comprises all or part of information in sl-CSI-RS-Config.

In one embodiment, the second information block is transmitted through Unicast.

In one embodiment, the second information block is transmitted through Groupcast.

In one embodiment, the second information block is transmitted in SideLink.

In one embodiment, the second information block is transmitted via a PC5 interface.

In one embodiment, the second information block indicates a subcarrier and an OFDM symbol occupied by the first reference signal in a time-frequency unit.

In one embodiment, a time-frequency resource occupied by the first signal is used for determining a time-frequency unit occupied by the first reference signal.

In one embodiment, the first reference signal and the first signal occupy a same group of time-frequency units.

In one embodiment, the time-frequency unit occupies 12 consecutive subcarriers in frequency domain.

In one embodiment, the time-frequency unit occupies one PRB in frequency domain.

In one embodiment, the time-frequency unit occupies one slot in frequency domain.

In one embodiment, the time-frequency unit occupies one SL slot in frequency domain.

In one embodiment, the second information block indicates a number of antenna ports occupied by the first reference signal.

In one embodiment, the second information block indicates the first index.

In one embodiment, the second information block indicates that the first index is associated with the first report configuration.

In one embodiment, the second information block comprises configuration information of the second reference signal.

In one embodiment, configuration information of a given reference signal comprises one or more than one of occupied subcarriers, occupied multicarrier symbol(s), occupied code-domain resource, the number of antenna ports and an RS sequence within a time-frequency unit.

In one embodiment, configuration information of a given reference signal comprises one or more than one of occupied time-domain resource, occupied frequency-domain resource, occupied code-domain resource, the number of antenna ports and an RS sequence.

In one embodiment, the given reference signal is the first reference signal.

In one embodiment, the given reference signal is the second reference signal.

In one embodiment, the second information block indicates the second index.

In one embodiment, the second information block indicates that the second index is associated with the second report configuration.

In one embodiment, the second information block indicates the first parameter.

In one embodiment, the second information block comprises a third information sub-block, the third information sub-block comprising a positive integer number of bit(s) and indicating the first parameter.

In one subembodiment, the first parameter is equal to a value of the third information sub-block.

In one embodiment, the first parameter is a higher layer parameter.

In one embodiment, the first parameter is an RRC parameter.

In one embodiment, the first parameter is a PC5-RRC parameter.

In one embodiment, the first parameter is a sl-Latency-BoundCSI-Report parameter.

In one embodiment, a name of the first parameter includes LatencyBoundCSI-Report.

In one embodiment, a name of the first parameter includes sl.

In one embodiment, the first parameter is a positive integer.

In one embodiment, the first parameter is a positive integer no less than 3 and no greater than 160.

In one embodiment, the first parameter is measured in slots.

In one embodiment, the first parameter is measured in time units.

In one embodiment, the phrase that the first parameter is used to determine the first time window means that a length of the first time window is equal to the first parameter.

In one embodiment, the phrase that the first parameter is used to determine the first time window means that a number of slots comprised by the first time window is equal to the first parameter.

In one embodiment, the phrase that the first parameter is used to determine the first time window means that the first parameter is used for determining the S time windows, and the S time windows are used to determine the first time window.

Embodiment 29

Figure 29:
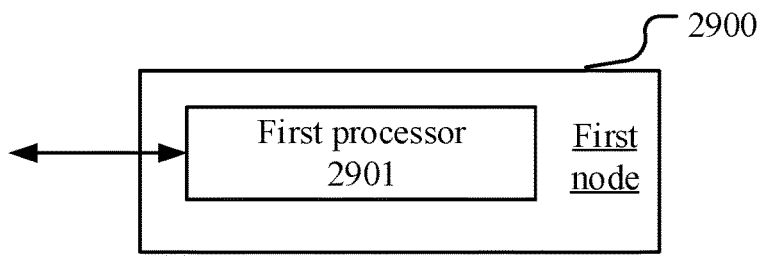
FIG. 29 illustrates a structure block diagram of a processing device in a first node according to one embodiment of the present disclosure.

Embodiment 29 illustrates a structure block diagram of a processing device in a first node according to one embodiment of the present disclosure; as shown in FIG. 29. In FIG. 29, a processing device 2900 in a first node comprises a first processor 2901.

In Embodiment 29, the first processor 2901 transmits a first signal set.

In Embodiment 29, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is capable of triggering a second CSI report in the first time window; when the first condition set is fulfilled, the first node is unable to trigger the second CSI report in the first time window; when the first condition set is not fulfilled, the first node is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

In one embodiment, time-domain resources occupied by the S signals are respectively used for determining S time windows, and the S time windows are used for determining the first time window.

In one embodiment, characterized in that the first processor 2901 receives a first information block; herein, the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first channel quality and the second quality being real numbers respectively, the first received quality being unequal to the second received quality.

In one embodiment, the first processor 2901 transmits a third signal in a first time-frequency resource block; herein, a target receiver of the third signal is a target receiver of the first signal set; a target channel quality is used for determining a Modulation and Coding Scheme (MCS) employed by the third signal, and the target channel quality is either the first channel quality or the second channel quality; whether the first time-frequency resource block is reserved is used for determining the target channel quality between the first channel quality and the second channel quality.

In one embodiment, the first processor 2901 transmits a second information block; herein, the second information block comprises configuration information of the first reference signal and a first parameter, the first parameter being used to determine the first time window.

In one embodiment, the first node is a UE.

In one embodiment, the first node is a relay node.

In one embodiment, the first processor 2901 comprises at least one of an antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 30

Figure 30:
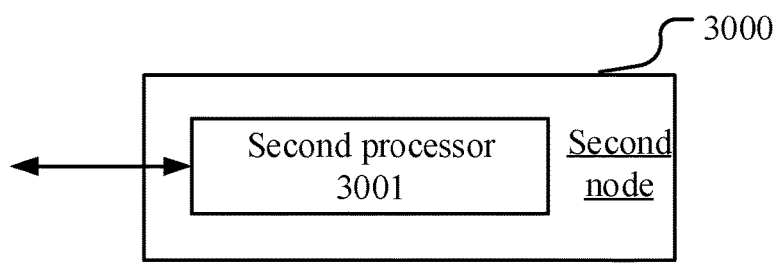
FIG. 30 illustrates a structure block diagram of a processing device in a second node according to one embodiment of the present disclosure.

Embodiment 30 illustrates a structure block diagram of a processing device in a second node according to one embodiment of the present disclosure; as shown in FIG. 30. In FIG. 30, a processing device 3000 in a second node comprises a second processor 3001.

In Embodiment 30, the second processor 3001 receives a first signal set.

In Embodiment 30, time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is capable of triggering a second CSI report in the first time window; when the first condition set is fulfilled, the transmitter of the first signal set is unable to trigger the second CSI report in the first time window; when the first condition set is not fulfilled, the transmitter of the first signal set is able to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

In one embodiment, the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

In one embodiment, time-domain resources occupied by the S signals are respectively used for determining S time windows, and the S time windows are used for determining the first time window.

In one embodiment, the second processor 3001 transmits a first information block; the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first channel quality and the second quality being real numbers respectively, the first received quality being unequal to the second received quality.

In one embodiment, the second processor 3001 receives a third signal in a first time-frequency resource block; herein, a transmitter of the third signal is a transmitter of the first signal set; a target channel quality is used for determining an MCS of the third signal, and the target channel quality is either the first channel quality or the second channel quality; whether the first time-frequency resource block is reserved is used for determining the target channel quality between the first channel quality and the second channel quality.

In one embodiment, the second processor 3001 receives a second information block; herein, the second information block comprises configuration information of the first reference signal and a first parameter, the first parameter being used to determine the first time window.

In one embodiment, the second node is a base station.

In one embodiment, the second node is a relay node.

In one embodiment, the second processor 3001 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

Embodiment 31

Figure 31:
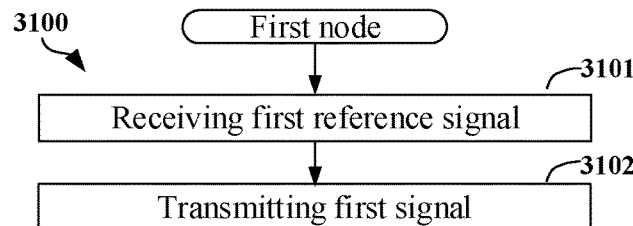
FIG. 31 illustrates a flowchart of a first reference signaling and a first signal according to one embodiment of the present disclosure.

Embodiment 31 illustrates a flowchart of a first reference signaling and a first signal according to one embodiment of the present disclosure, as shown in FIG. 31. In 3100 illustrated by FIG. 31, each box represents a step. Particularly, the sequence of steps arranged does not necessarily imply specific chronological orders of these steps.

In Embodiment 31, the first node in the present disclosure receives a first reference signal in step 3101; and transmits a first signal in step 3102. Herein, a transmitting (Tx) power of the first signal is a first power value, a first reference power value is used for determining the first power value, and the first reference power value is linear with a first pathloss; a first spatial domain filter is used for transmitting the first signal; the first node uses the first spatial domain filter to measure the first reference signal to obtain the first pathloss; a transmitter of the first reference signal is different from a target receiver of the first signal.

In one embodiment, the first reference signal comprises a downlink reference signal.

In one embodiment, the first reference signal comprises a Synchronisation Signal/physical broadcast channel Block (SSB).

In one embodiment, the first reference signal comprises a Channel State Information-Reference Signal (CSI-RS).

In one embodiment, the first reference signal comprises a periodic CSI-RS.

In one embodiment, the first reference signal comprises a semi-persistent CSI-RS.

In one embodiment, the first reference signal comprises a DeModulation Reference Signal (DMRS).

In one embodiment, the first reference signal comprises a Sounding Reference Signal (SRS).

In one embodiment, the first reference signal is transmitted via a Uu interface.

In one embodiment, the first reference signal is transmitted in Downlink.

In one embodiment, when the first node is configured with a Physical Downlink Control Channel (PDCCH) monitoring a corresponding DCI format 0_0, the first reference signal is used by the first node for determining a power value of a Physical Uplink Shared CHannel (PUSCH) transmission scheduled by the DCI format 0_0.

In one subembodiment, the first reference signal is used by the first node for determining a pathloss used in calculation of a power value of the PUSCH transmission scheduled by the DCI format 0_0.

In one embodiment, when the first node is not configured with a PDCCH monitoring a corresponding DCI format 0_0, the first reference signal comprises an SSB, and the first node acquires a Master Information Block (MIB) from the first reference signal.

In one embodiment, the first signal comprises a baseband signal.

In one embodiment, the first signal comprises a radio signal.

In one embodiment, the first signal comprises an RF signal.

In one embodiment, the first signal carries a TB.

In one embodiment, the first signal carries a CB.

In one embodiment, the first signal carries a CBG.

In one embodiment, the first signal comprises SCI.

In one embodiment, the first signal does not comprise SCI.

In one embodiment, the first signal comprises a Hybrid Automatic Repeat request-Acknowledgement (HARQ-ACK).

In one embodiment, the HARQ-ACK includes ACK and Negative ACK (HACK).

In one embodiment, the first signal comprises a reference signal.

In one embodiment, the first signal does not comprise a reference signal.

In one embodiment, the first signal is transmitted through Unicast.

In one embodiment, the first signal is transmitted through Groupcast.

In one embodiment, the first signal is transmitted through Broadcast.

In one embodiment, the first signal is transmitted in SideLink.

In one embodiment, the first signal is transmitted via a PC5 interface.

In one embodiment, the first signal and the first reference signal are transmitted on a same carrier.

In one embodiment, the first signal and the first reference signal are transmitted on a same BWP.

In one embodiment, the first spatial domain filter includes a Spatial domain receive filter.

In one embodiment, the first spatial domain filter includes a Spatial domain transmission filter.

In one embodiment, the QCL assumption of the first signal is used for determining the first spatial domain filter.

In one embodiment, a TCI state of the first signal is used for determining the first spatial domain filter.

In one embodiment, a DMRS port of the first signal is QCL with a second reference signal, and the first node uses the first spatial domain filter to transmit the first signal and the second reference signal.

In one subembodiment, the DMRS port of the first signal is QCL with the second reference signal, corresponding to QCL-T eD.

In one embodiment, a TCI state or a QCL assumption of the first signal indicates a second reference signal, and the first node uses the first spatial domain filter to transmit the first signal and the second reference signal.

In one embodiment, a TCI state or a QCL assumption of the first signal indicates a second reference signal, and the first node uses the first spatial domain filter to transmit the first signal and receive the second reference signal.

In one embodiment, the second reference signal comprises a SideLink (SL) reference signal.

In one embodiment, the second reference signal comprises an SL CSI-RS.

In one embodiment, the second reference signal comprises an SL Synchronization Signal (SS)/Physical Sidelink Broadcast CHannel (PSBCH) block.

In one embodiment, the second reference signal comprises an SRS.

In one embodiment, the second reference signal comprises an SL DMRS.

In one embodiment, a transmitter of the first reference signal is a first reference node, while a target receiver of the first signal includes a second reference node, the first reference node and the second reference node cannot be assumed to be QCL.

In one embodiment, for the specific definition of the QCL, refer to 3GPP TS38.211, section 4.4.

In one embodiment, a transmitter of the first reference signal is a base station, while a target receiver of the first signal includes a UE.

In one embodiment, a transmitter of the first reference signal is a relay device, while a target receiver of the first signal includes a UE.

In one embodiment, when and only when a target receiver of the first signal is different from a transmitter of the first reference signal will the first pathloss be used for determining a Tx power of the first signal.

In one embodiment, whether a target receiver of the first signal is the same as a transmitter of the first reference signal is used for determining whether a Tx power of the first signal is related to the first pathloss.

In one embodiment, whether a target receiver of the first signal is the same as a transmitter of the first reference signal is used for determining whether a Tx power of the first signal is related to the first pathloss or the second pathloss.

In one embodiment, when a target receiver of the first signal and a transmitter of the first reference signal are the same, the second pathloss is used for determining a Tx power of the first signal.

Embodiment 32

Figure 32:
FIG. 32 illustrates a flowchart of a wireless transmission according to one embodiment of the present disclosure.

Embodiment 32 illustrates a flowchart of a wireless transmission according to one embodiment of the present disclosure, as shown in FIG. 32. In FIG. 32, a second node U5, a first node U6 and a third node U7 are communication nodes that mutually communicate through air interfaces. As shown in FIG. 32, steps marked by boxes F321-F328 are optional, respectively. Steps respectively marked by the box F322 and the box F323 cannot coexist.

The second node U5 transmits a first information block in step S32501; transmits a first reference signal in step S3251; and transmits reference signals of K first-type reference signals other than the first reference signal in step S32502; transmits a first signaling in step S32503; and receives a second signal in step S32504.

The first node U6 receives a first information block in step S32601; transmits a second information block in step S32602; and receives a second information block in step S32603; receives a first reference signal in step S3261; and receives reference signals of K first-type reference signals other than the first reference signal in step S32604; receives a third reference signal in step S32605; transmits a first signal in step S3262; receives a first signaling in step S32606; and transmits a second signal in step S32607.

The third node U7 receives a second information block in step S32701; transmits a second information block in step S32702; transmits a third signal in step S32703; and receives a first signal in step S3271.

In Embodiment 32, a transmitting (Tx) power of the first signal is a first power value, a first reference power value is used by the first node U6 for determining the first power value, and the first reference power value is linear with a first pathloss; a first spatial domain filter is used by the first node U6 for transmitting the first signal; the first node U6 uses the first spatial domain filter to measure the first reference signal to obtain the first pathloss; a transmitter of the first reference signal is different from a target receiver of the first signal.

In one embodiment, the first node U6 is the first node in the present disclosure.

In one embodiment, the second node U5 is the second node in the present disclosure.

In one embodiment, the third node U7 is the third node in the present disclosure.

In one embodiment, an air interface between the second node U5 and the first node U6 is a Uu interface.

In one embodiment, an air interface between the second node U5 and the first node U6 includes a cellular link.

In one embodiment, an air interface between the second node U5 and the first node U6 includes a radio interface between a base station and a UE.

In one embodiment, an air interface between the second node U5 and the first node U6 includes a radio interface between a relay node and a UE.

In one embodiment, an air interface between the third node U7 and the first node U6 is a PC5 interface.

In one embodiment, an air interface between the third node U7 and the first node U6 includes a sidelink.

In one embodiment, an air interface between the third node U7 and the first node U6 includes a radio interface between a relay node and a UE.

In one embodiment, an air interface between the third node U7 and the first node U6 includes a radio interface between UEs.

In one embodiment, the first node is a terminal.
In one embodiment, the first node is an automobile.
In one embodiment, the first node is a vehicle.
In one embodiment, the first node is a Road Side Unit (RSU).
In one embodiment, the second node is a maintenance base station for a serving cell of the first node.
In one embodiment, the third node is a terminal.
In one embodiment, the third node is an automobile.
In one embodiment, the third node is a vehicle.

In one embodiment, the third node is a Road Side Unit (RSU).

In one embodiment, the first signal is transmitted on a sidelink physical layer data channel (i.e., a sidelink channel capable of carrying physical layer data).

In one embodiment, the first signal is transmitted on a Physical Sidelink Shared Channel (PSSCH).

In one embodiment, the first signal is transmitted on a sidelink physical layer control channel (i.e., a sidelink channel only capable of carrying physical layer signaling).

In one embodiment, the first signal is transmitted on a Physical Sidelink Control Channel (PSCCH).

In one embodiment, the first signal is transmitted on a sidelink physical layer feedback channel (i e, a sidelink channel only capable of carrying physical layer HARQ feedback).

In one embodiment, the first signal is transmitted on a Physical Sidelink Feedback Channel (PSFCH).

In one embodiment, steps in the box F321 in FIG. 32 exist; the first information block is used by the first node U6 for determining configuration information of the first reference signal.

In one embodiment, the first information block is transmitted on a Physical Broadcast Channel (PBCH).

In one embodiment, the first information block is transmitted on a Physical Downlink Shared CHannel (PDSCH).

In one embodiment, steps marked by the box F321 in FIG. 32 do not exist.

In one embodiment, the step marked by the box F326 in FIG. 32 exists; the third signal is used by the first node U6 for determining a third pathloss; the first reference power value and a third reference power value are jointly used by the first node U6 for determining the first power value, the third reference power value being linearly correlated with the third pathloss; a transmitter of the third signal is different from a transmitter of the first reference signal.

In one embodiment, the third signal comprises a radio signal.

In one embodiment, the third signal comprises a baseband signal.

In one embodiment, the third signal comprises an RF signal.

In one embodiment, the third signal is transmitted in SideLink.

In one embodiment, the third signal is transmitted via a PC5 interface.

In one embodiment, the third signal comprises a sidelink reference signal.

In one embodiment, the third signal comprises an SL CSI-RS.

In one embodiment, the third signal comprises an SL DMRS.

In one embodiment, the third signal comprises an SRS.

In one embodiment, the third signal comprises an SL SS/PSBCH block.

In one embodiment, the third signal comprises one of a TB, a CBG or a CB.

In one embodiment, the third signal comprises a MAC CE.

In one embodiment, a target receiver of the first signal is the same as a transmitter of the third signal.

In one embodiment, a target receiver of the first signal is different from a transmitter of the third signal.

In one embodiment, steps respectively marked by the box F325 and the box F326 in FIG. 32 both exist; the transmitter of the third signal is the third node.

In one embodiment, the step marked by the box F325 in FIG. 32 does not exist, while the step marked by the box F326 in FIG. 32 exists; the transmitter of the third signal is different from the third node.

In one embodiment, the third signal is earlier than the first reference signal in time domain.

In one embodiment, the third signal is later than the first reference signal in time domain.

In one embodiment, the first reference signal and the third signal are transmitted on a same carrier.

In one embodiment, the first reference signal and the third signal are transmitted on a same BWP.

In one embodiment, the first signal and the third signal are transmitted on a same carrier.

In one embodiment, the first signal and the third signal are transmitted on a same BWP.

In one embodiment, the third signal is transmitted on a PSSCH.

In one embodiment, steps respectively marked by the box F322 and the box F326 in FIG. 32 both exist, while the steps marked by the box F323 in FIG. 32 do not exist; the third signal comprises a Reference Signal Received Power (RSRP) of a third reference signal, and the second information block comprises configuration information of the third reference signal.

In one embodiment, steps respectively marked by the box F323 and the box F326 in FIG. 32 both exist, while the steps marked by the box F322 in FIG. 32 do not exist; the third signal comprises a third reference signal, and the second information block comprises configuration information of the third reference signal.

In one embodiment, the configuration information of the third reference signal comprises one or more than one of a time-domain resource, a frequency-domain resource, a code-domain resource, an RS sequence, a mapping mode, a cyclic shift, an Orthogonal Cover Code (OCC), scrambling, a frequency-domain spreading sequence, a time-domain spreading sequence or a spatial relation.

In one embodiment, the second information block is carried by a higher layer signaling.

In one embodiment, the second information block is carried by an RRC signaling.

In one embodiment, the second information block is carried by a PC5 RRC signaling.

In one embodiment, the second information block comprises information of all or part of fields in an Information Element (IE).

In one embodiment, the second information block is transmitted in SideLink.

In one embodiment, the second information block is transmitted via a PC5 interface.

In one embodiment, the second information block is transmitted via a Uu interface.

In one embodiment, the second information block is transmitted in Downlink.

In one embodiment, steps marked by the box F324 in FIG. 32 exist; the first reference signal is one of the K first-type reference signals, and the first node U6 uses the first spatial domain filter to measure the K first-type reference signals respectively to obtain K pathlosses; the first pathloss is a minimum one of the K pathlosses; a transmitter of any of the K first-type reference signals is the transmitter of the first reference signal.

In one embodiment, steps marked by the box F324 in FIG. 32 do not exist.

In one embodiment, steps marked by the box F328 in FIG. 32 exist; a Tx power of the second signal is a second power value, and a second reference power value is used by the first node U6 for determining the second power value, the second reference power value being linearly correlated with a second pathloss; the first node U6 uses a second spatial domain filter to measure the first reference signal to obtain the second pathloss; a transmitter of the first reference signal is the same as a target receiver of the second signal.

In one embodiment, the second signal comprises a baseband signal.

In one embodiment, the second signal comprises a radio signal.

In one embodiment, the second signal comprises an RF signal.

In one embodiment, the second signal carries a TB.

In one embodiment, the second signal carries a CB.

In one embodiment, the second signal carries a CBG.

In one embodiment, the second signal comprises Uplink control information (UCI).

In one embodiment, the second signal comprises an SRS.

In one embodiment, the second signal is transmitted in uplink.

In one embodiment, the second signal is transmitted via a Uu interface.

In one embodiment, the second signal is earlier than the first signal in time domain.

In one embodiment, the second signal is later than the first signal in time domain.

In one embodiment, the first reference signal is a Pathloss Reference RS corresponding to the second signal.

In one embodiment, the second signal is transmitted on a PUSCH; a field of Sounding reference signal Resource Indicator (SRI) of a scheduling signaling of the second signal indicates a first SRI, and the first SRI is used for determining the first reference signal.

In one embodiment, a second signaling indicates that a Pathloss Reference RS corresponding to the first SRI is the first reference signal, the second signaling comprises a higher layer signaling, and a name for the second signaling includes SRI-PUSCH-PowerControl.

In one embodiment, configuration information of the second signal indicates that the first reference signal is a Pathloss Reference RS corresponding to the second signal.

In one embodiment, the configuration information of the second signal comprises one or more than one of a time-domain resource, a frequency-domain resource, a code-domain resource, an RS sequence, a mapping mode, a cyclic shift, an Orthogonal Cover Code (OCC), a frequency-domain spreading sequence, a time-domain spreading sequence, power control information or a spatial relation.

In one embodiment, the configuration information of the second signal comprises one or more than one of a time-domain resource, a frequency-domain resource, a code-domain resource, a low Peak-to-Average Power Ratio (PAPR) sequence, a pseudo-random sequence, a mapping mode, a cyclic shift, an Orthogonal Cover Code (OCC), an orthogonal sequence, a PUCCH format, power control information or a spatial relation.

In one embodiment, configuration information of the second signal is indicated by a higher layer signaling.

In one embodiment, a name of a higher layer signaling indicating configuration information of the second signal includes PUCCH-PowerControl.

In one embodiment, a name of a higher layer signaling indicating configuration information of the second signal includes SRS-Config.

In one embodiment, a transmitter of the first reference signal and a target receiver of the second signal are QCL.

In one embodiment, a transmitter of the first reference signal and a target receiver of the second signal are a same base station.

In one embodiment, the second signal is transmitted on an uplink physical layer control channel (i.e., an uplink channel only capable of carrying physical layer signaling).

In one embodiment, the second signal is transmitted on a PUCCH.

In one embodiment, the second signal is transmitted on an uplink physical layer data channel (i.e., an uplink channel capable of carrying physical layer data).

In one embodiment, the second signal is transmitted on a PUSCH.

In one embodiment, both steps marked by the box F327 and steps marked by the box F328 in FIG. 32 exist; the first signaling comprises scheduling information of the second signal; the scheduling information of the second signal comprises one or more than one of a time-domain resource, a frequency-domain resource, a Modulation and Coding Scheme (MCS), a DMRS port, a HARQ process number, a Redundancy Version (RV) or a New Data Indicator (NDI).

In one embodiment, the first signaling comprises a physical layer signaling.

In one embodiment, the first signaling comprises a L1 signaling.

In one embodiment, the first signaling comprises one or more than one field in a piece of DCI.

In one embodiment, the first signaling comprises DCI used for UpLink Grant.

In one embodiment, the first signaling comprises DCI used for activation of Configured Uplink Grant Type 2.

In one embodiment, the first signaling comprises an RRC signaling.

In one embodiment, the first signaling comprises a MAC CE.

In one embodiment, steps marked by the box F328 in FIG. 32 exist, while steps marked by the box F327 do not.

Embodiment 33

Embodiment 33 illustrates a schematic diagram of a first power value according to one embodiment of the present disclosure; as shown in FIG. 33. In Embodiment 33, the first power value is a smaller value between the first reference power value and a first power threshold.

In one embodiment, the first power value is measured in Watts.

In one embodiment, the first power value is measured in dBm.

In one embodiment, the first power value is no greater than the first reference power value.

In one embodiment, the first power value is equal to the first reference power value.

In one embodiment, the first power value is less than the first reference power value.

In one embodiment, the first power threshold is measured in Watts.

In one embodiment, the first power threshold is measured in dBm.

In one embodiment, the first power threshold is a maximum Tx power of the first node in uplink.

In one embodiment, the first power threshold is a maximum power available for transmitting a PUSCH used by the first node.

In one embodiment, the first power threshold is a maximum Tx power of the first node in sidelink.

In one embodiment, the first power threshold is a maximum power available for transmitting a PSSCH used by the first node.

In one embodiment, the first power value is unrelated to the second pathloss.

Embodiment 34

Embodiment 34 illustrates a schematic diagram of a first reference power value according to one embodiment of the present disclosure; as shown in FIG. 34. In Embodiment 34, the first reference power value is linearly correlated to the first pathloss, and a linear coefficient between the first reference power value and the first pathloss is a first coefficient. The symbol " " illustrated in FIG. 34 denotes a linear correlation.

In one embodiment, the first reference power value is measured in Watts.

In one embodiment, the first reference power value is measured in dBm.

In one embodiment, the first pathloss is measured in dB.

In one embodiment, the first pathloss is equal to a Tx power of the first reference signal being subtracted by an RSRP obtained by the first node receiving the first reference signal with the first spatial domain filter.

In one embodiment, the first pathloss is equal to a Tx power of the first reference signal, which is measured in dBm, being subtracted by an RSRP obtained by the first node receiving the first reference signal with the first spatial domain filter, also measured in dBm.

In one embodiment, the first coefficient is a non-negative real number no greater than 1.

In one embodiment, the first coefficient is configured by a higher layer parameter.

In one embodiment, the first coefficient is pre-configured.

In one embodiment, the first coefficient is equal to 1.

In one embodiment, the first coefficient is less than 1.

In one embodiment, the first coefficient is $\alpha\_D$ used for sidelink power control.

In one embodiment, the first coefficient is $\alpha\_D$ based on measurement of DL pathloss and used for sidelink power control.

In one embodiment, the first reference power value is linearly correlated to a first component; and a linear coefficient between the first reference power value and the first component is 1; the first component is a Target power.

In one subembodiment, the first component is $P\_(o,D)$ used for sidelink power control.

In one subembodiment, the first component is $P\_(o,D)$ based on measurement of DL pathloss and used for sidelink power control.

In one subembodiment, the first component is configured by a higher layer parameter.

In one subembodiment, the first component is pre-configured.

In one embodiment, the first reference power value is linearly correlated to a second component, and a linear coefficient between the first reference power value and the second component is 1; the second component is related to a bandwidth assigned to the first signal.

In one embodiment, the second component is related to a bandwidth assigned to the first signal which is measured in RB s.

In one embodiment, the second component is related to a subcarrier spacing corresponding to the first signal.

In one embodiment, the first reference power value is linearly correlated with the first pathloss, the first component and the second component respectively; a linear coefficient between the first reference power value and the first pathloss is the first coefficient; a linear coefficient between the first reference power value and the first component and a linear coefficient between the first reference power value and the second component are both equal to 1.

In one embodiment, the first reference power value is unrelated to the second pathloss.

Embodiment 35

Embodiment 35 illustrates a schematic diagram of a second spatial domain filter according to one embodiment of the present disclosure; as shown in FIG. 35. In Embodiment 35, a measurement on the first reference signal is used by the first node for determining the second spatial domain filter, the first spatial domain filter being different from the second spatial domain filter.

In one embodiment, the second spatial domain filter includes spatial domain receive filter.

In one embodiment, the second spatial domain filter includes spatial domain transmission filter.

In one embodiment, the phrase that a measurement on the first reference signal is used for determining a second spatial domain filter includes a meaning that the measurement on the first reference signal is used by the first node for determining that the second spatial domain filter is an optimal spatial domain filter for receiving the first reference signal.

In one embodiment, the phrase that a measurement on the first reference signal is used for determining a second spatial domain filter includes a meaning that the first node uses S candidate spatial domain filters to measure the first reference signal to respectively obtain S received qualities, and the S received qualities are used by the first node for determining the second spatial domain filter; S is a positive integer greater than 1, and the second spatial domain filter is one of the S candidate spatial domain filters.

In one subembodiment, a received quality corresponding to the second spatial domain filter is no poorer than a received quality corresponding to any one of the S candidate spatial domain filters other than the second spatial domain filter.

In one subembodiment, the first node randomly selects the second spatial domain filter from S1 candidate spatial domain filters, and the S1 candidate spatial domain filters are candidate spatial domain filters corresponding to S1 best received qualities out of the S candidate spatial domain filters.

In one embodiment, the phrase that a measurement on the first reference signal is used for determining a second spatial domain filter includes a meaning that the measurement on the first reference signal is used for determining that when the first node uses the second spatial domain filter to receive the first reference signal, a received quality obtained therefrom is no poorer than any received quality obtained by the first node receiving the first reference signal using any spatial domain filter different from the second spatial filter.

In one embodiment, the received quality comprises an RSRP.

In one embodiment, the received quality comprises a Signal-to-noise and interference ratio (SINR).

In one embodiment, the received quality comprises a Reference Signal Received Quality (RSRQ).

In one embodiment, the received quality comprises a Channel Quality Indicator (CQI).

In one embodiment, when the first node is configured with a PDCCH monitoring a corresponding DCI format 0_0, the first node uses the second spatial domain filter to measure the first reference signal for determining a power value of a PUSCH transmission scheduled by the DCI format 0_0.

In one subembodiment, the first node uses the second spatial domain filter to measure the first reference signal for determining a pathloss used in calculation of a power value of the PUSCH transmission scheduled by the DCI format 0_0.

In one embodiment, when the first node is not configured with a PDCCH monitoring a corresponding DCI format 0_0, the first node uses the second spatial domain filter to receive the first reference signal to acquire a MIB.

In one embodiment, the first node uses the second spatial domain filter to measure the first reference signal to acquire a second pathloss, and the second pathloss is used by the first node for calculating a Tx power of an uplink transmission for the transmitter of the first reference signal and with a corresponding pathloss reference signal being the first reference signal.

In one embodiment, the first spatial domain filter is unrelated to the measurement on the first reference signal.

In one embodiment, the first spatial domain filter is unrelated to the S received qualities.

In one embodiment, the first spatial domain filter is unrelated to the second spatial domain filter.

In one embodiment, the first pathloss is unrelated to the second spatial domain filter.

In one embodiment, a TCI state of the first reference signal is used for determining a second spatial domain filter, the first spatial domain filter being different from the second spatial domain filter.

In one embodiment, the first reference signal and a target reference signal are QCL, and the target reference signal is used for determining a second spatial domain filter; the first spatial domain filter is different from the second spatial domain filter.

In one embodiment, the first node uses the second spatial domain filter to receive the target reference signal.

In one embodiment, a TCI state of the first reference signal indicates the target reference signal.

In one embodiment, a TCI state of the first reference signal indicates that the first reference signal and the target reference signal are QCL, corresponding to QCL-TypeD.

In one embodiment, the target reference signal comprises an SSB.

In one embodiment, the target reference signal comprises a CSI-RS.

In one embodiment, when and only when a correlation between the first spatial domain filter and the second spatial domain filter is less than a first threshold will the first pathloss be used for determining a Tx power of the first signal.

In one embodiment, when a correlation between the first spatial domain filter and the second spatial domain filter is no less than the first threshold, the second pathloss is used for determining a Tx power of the first signal.

Embodiment 36

Embodiment 36 illustrates a schematic diagram of a second power value according to one embodiment of the present disclosure; as shown in FIG. 36. In Embodiment 36, the second power value is a smaller value between the second reference power value and a second power threshold.

In one embodiment, the second power value is measured in Watts.

In one embodiment, the second power value is measured in dBm.

In one embodiment, the second power threshold is measured in Watts.

In one embodiment, the second power threshold is measured in dBm.

In one embodiment, the second power threshold is a maximum Tx power of the first node in uplink.

In one embodiment, the second power threshold is a maximum power available for transmitting a PUSCH used by the first node.

In one embodiment, the second power value is unrelated to the first pathloss.

Embodiment 37

Embodiment 37 illustrates a schematic diagram of a second reference power value according to one embodiment of the present disclosure; as shown in FIG. 37. In Embodiment 37, the second reference power value is linearly correlated to the second pathloss; and a linear coefficient between the second reference power value and the second pathloss is a second coefficient. The symbol "I" illustrated in FIG. 34 denotes a linear correlation.

In one embodiment, the second pathloss is equal to a Tx power of the first reference signal being subtracted by an RSRP obtained by the first node receiving the first reference signal with the second spatial domain filter.

In one embodiment, the second pathloss is equal to a Tx power of the first reference signal, which is measured in dBm, being subtracted by an RSRP obtained by the first node receiving the first reference signal with the second spatial domain filter, also measured in dBm.

In one embodiment, the second pathloss is unrelated to the first spatial domain filter.

In one embodiment, the first pathloss is no less than the second pathloss.

In one embodiment, the first pathloss is greater than the second pathloss.

In one embodiment, the first pathloss is unequal to the second pathloss.

In one embodiment, the second coefficient is a non-negative real number.

In one embodiment, the second coefficient is equal to 1.

In one embodiment, the second coefficient is configured by a higher layer parameter.

In one embodiment, the second coefficient is pre-configured.

In one embodiment, the second coefficient is $\alpha\_(b,f,c)(j)$ used for PUSCH power control.

In one embodiment, the second coefficient is $\alpha\_(SRS,b,f,c)(q\_s)$ used for SRS power control on a Uu interface.

In one embodiment, the second reference power value is linear with a fifth component, and a linear coefficient between the second reference power value and the fifth component is 1; the fifth component is a Target power.

In one subembodiment, the fifth component is P_o used for uplink power control.

In one embodiment, the second reference power value is linear with a sixth component, and a linear coefficient between the second reference power value and the sixth component is 1; the sixth component is related to a bandwidth measured in RBs assigned to the second signal.

In one embodiment, the second reference power value is linear with a seventh component, and a linear coefficient between the second reference power value and the seventh component is 1; the seventh component is related to an MCS of the second signal.

In one embodiment, the second reference power value is linear with an eighth component, and a linear coefficient between the second reference power value and the eighth component is 1; the eighth component is a power control adjustment status.

In one embodiment, the second reference power value is linear with a ninth component, and a linear coefficient between the second reference power value and the ninth component is 1; the ninth component is related to a number of multicarrier symbols occupied by the second signal.

In one embodiment, the second reference power value is linear with a tenth component, and a linear coefficient between the second reference power value and the tenth component is 1; the tenth component is related to a PUCCH format corresponding to the second signal.

In one embodiment, the second reference power value is linearly correlated with the second pathloss, the fifth component, the sixth component, the seventh component and the eighth component respectively; the linear coefficient between the second reference power value and the second pathloss is the second coefficient; the linear coefficients between the second reference power value and the fifth component, the second reference power value and the sixth component, the second reference power value and the seventh component, and the second reference power value and the eighth component, are equal to 1, respectively.

In one embodiment, the second reference power value is linearly correlated with the second pathloss, the fifth component, the sixth component, the eighth component, the ninth component and the tenth component respectively; the linear coefficients between the second reference power value and the second pathloss, the second reference power value and the fifth component, the second reference power value and the sixth component, the second reference power value and the eighth component, the second reference power value and the ninth component, and the second reference power value and the tenth component, are equal to 1, respectively.

In one embodiment, the second reference power value is linearly correlated with the second pathloss, the fifth component, the sixth component and the eighth component respectively; the linear coefficient between the second reference power value and the second pathloss is the second coefficient; the linear coefficients between the second reference power value and the fifth component, the second reference power value and the sixth component, and the second reference power value and the eighth component, are equal to 1, respectively.

In one embodiment, the second reference power value is unrelated to the first pathloss.

Embodiment 38

Embodiment 38 illustrates a schematic diagram of a relation between a first pathloss and K pathlosses according to one embodiment of the present disclosure; as shown in FIG. 38. In Embodiment 38, the first node uses the first spatial domain filter to measure the K first-type reference signals to respectively obtain the K pathlosses; the first pathloss is a minimum one of the K pathlosses. In FIG. 38, indexes for the K first-type reference signals and the K pathlosses are #0 . . . , and #(K-1) respectively.

In one embodiment, any of the K first-type reference signals comprises a downlink reference signal.

In one embodiment, the K first-type reference signals comprise an SSB.

In one embodiment, the K first-type reference signals comprise a CSI-RS.

In one embodiment, the K first-type reference signals comprise an SRS.

In one embodiment, the K first-type reference signals comprise a DMRS.

In one embodiment, the K first-type reference signals are respectively transmitted via Uu interfaces.

In one embodiment, the K first-type reference signals are respectively transmitted in sidelink.

In one embodiment, of the K first-type reference signals there are two first-type reference signals that cannot be assumed as QCL.

In one embodiment, of the K first-type reference signals there are two first-type reference signals that cannot be assumed as QCL, corresponding to QCL-TypeD.

In one embodiment, any two of the K first-type reference signals cannot be assumed as QCL.

In one embodiment, any two of the K first-type reference signals cannot be assumed as QCL, corresponding to QCL-TypeD.

In one embodiment, the K first-type reference signals are transmitted on a same carrier.

In one embodiment, the K first-type reference signals are transmitted on a same BWP.

In one embodiment, the K first-type reference signals are respectively configured by an RRC signaling.

In one embodiment, the K first-type reference signals respectively correspond to K CORESETPool indexes; the K CORESETPool indexes are mutually unequal, and are respectively used for identifying K CORESET Pools.

In one embodiment, the K first-type reference signals are respectively used by the first node for determining power values of PUSCH transmissions scheduled by the DCI format 0_0 respectively received in the K CORESET Pools.

In one embodiment, the K first-type reference signals are respectively used by the first node for determining pathlosses respectively used in calculation of power values of PUSCH transmissions scheduled by the DCI format respectively received in the K CORESET Pools.

In one embodiment, K is equal to 2.

In one embodiment, K is greater than 2.

In one embodiment, of the K first-type reference signals there is a first-type reference signal earlier than the first reference signal in time domain.

In one embodiment, of the K first-type reference signals there is a first-type reference signal later than the first reference signal in time domain.

In one embodiment, the K pathlosses are respectively measured in dB.

In one embodiment, any of the K pathlosses is equal to a Tx power of a corresponding first-type reference signal being subtracted by an RSRP obtained by the first node receiving the corresponding first-type reference signal with the first spatial domain filter.

In one embodiment, any of the K pathlosses is equal to a Tx power of a corresponding first-type reference signal, which is measured in dBm, being subtracted by an RSRP obtained by the first node receiving the corresponding first-type reference signal with the first spatial domain filter, also measured in dBm.

In one embodiment, the first reference signal is one of the K first-type reference signals corresponding to the first pathloss.

Embodiment 39

Embodiment 39 illustrates a schematic diagram of a relation between a first spatial domain filter and P spatial domain filters according to one embodiment of the present disclosure; as shown in FIG. 39. In Embodiment 39, the first node uses the P spatial domain filters to measure the first reference signal respectively to obtain the P pathlosses, and the P pathlosses are used for determining the first spatial domain filter out of the P spatial domain filters. In FIG. 39, indexes for the P spatial domain filters and the P pathlosses are #0, . . . and #(P-1), respectively.

In one embodiment, the P spatial domain filters respectively comprise spatial domain receive filters.

In one embodiment, the P spatial domain filters respectively comprise spatial domain transmission filters.

In one embodiment, the P spatial domain filters correspond to P second-type reference signals respectively; for any given spatial domain filter of the P spatial domain filters, the first node uses the given spatial domain filter to receive or transmit a corresponding second-type reference signal; any second-type reference signal of the P second-type reference signals comprises an SL reference signal.

In one embodiment, the P second-type reference signals comprise an SL CSI-RS.

In one embodiment, the P second-type reference signals comprise an SL SS/PSBCH block.

In one embodiment, the P second-type reference signals comprise an SRS.

In one embodiment, the P second-type reference signals comprise an SL DMRS.

In one embodiment, any two of the P second-type reference signals are not QCL.

In one embodiment, any two of the P second-type reference signals are not QCL, corresponding to QCL-TypeD.

In one embodiment, the P second-type reference signals share a same transmitter.

In one embodiment, of the P second-type reference signals there are two second-type reference signals corresponding to different transmitters.

In one embodiment, of the P second-type reference signals there is one second-type reference signal of which the transmitter is the first node.

In one embodiment, a transmitter of any of the P second-type reference signals is the first node.

In one embodiment, of the P second-type reference signals there is one second-type reference signal of which the transmitter is a target receiver of the first signal.

In one embodiment, a transmitter of any of the P second-type reference signals is a target receiver of the first signal.

In one embodiment, the P pathlosses are measured in dB.

In one embodiment, any given pathloss of the P pathlosses is equal to a Tx power of the first reference signal being subtracted by an RSRP obtained by the first node receiving the first reference signal with one of the P spatial domain filters that corresponds to the given pathloss.

In one embodiment, any given pathloss of the P pathlosses is equal to a Tx power of the first reference signal, which is measured in dBm, being subtracted by an RSRP obtained by the first node receiving the first reference signal with one of the P spatial domain filters that corresponds to the given pathloss, which is measured in dBm.

In one embodiment, the first pathloss is one of the P pathlosses that corresponds to the first spatial domain filter.

In one embodiment, the spatial domain filter is one of the P spatial domain filters that corresponds to a maximum pathloss of the P pathlosses.

In one embodiment, the spatial domain filter is one of the P spatial domain filters that corresponds to a minimum pathloss of the P pathlosses.

In one embodiment, the spatial domain filter is a spatial domain filter in a first filter subset; a received quality obtained by the first node receiving a fourth signal with the first spatial domain filter is no worse than a received quality obtained by the first node receiving the fourth signal with any spatial domain filter other than the first spatial domain filter in the first filter subset; a transmitter of the fourth signal is a target receiver of the first signal.

In one embodiment, the first filter subset consists of all spatial domain filters corresponding to pathlosses no less than a second threshold among the P spatial domain filters.

In one embodiment, P power values are linearly correlated with the P pathlosses respectively, and a linear coefficient between any one of the P power values and a corresponding pathloss is the first coefficient; the first filter subset consists of all spatial domain filters corresponding to power values no less than the third reference power value among the P spatial domain filters.

In one subembodiment, any of the P power values is linearly correlated with the first component and the second component respectively, both corresponding to a linear coefficient being 1.

In one embodiment, the first node uses the P spatial domain filters to receive a fourth signal to respectively obtain P received qualities; the first spatial domain filter is a spatial domain filter in a second filter subset, the second filter subset consists of all spatial domain filters corresponding to received qualities no worse than a third threshold among the P spatial domain filters; a pathloss of the P pathlosses corresponding to the first spatial domain filter is no smaller than another pathloss among the P pathlosses corresponding to any spatial domain filter in the second filter subset other than the first spatial domain filter; a transmitter of the fourth signal is a target receiver of the first signal.

In one embodiment, the third threshold is related to a best received quality among the P received qualities.

In one embodiment, the fourth signal comprises a radio signal.

In one embodiment, the fourth signal comprises an RF signal.

In one embodiment, the fourth signal is transmitted in SideLink.

In one embodiment, the fourth signal is transmitted via a PC5 interface.

In one embodiment, the fourth signal comprises a CSI-RS.

In one embodiment, the fourth signal comprises a DMRS.

In one embodiment, the fourth signal is transmitted on a PS SCH.

Embodiment 40

Embodiment 40 illustrates a schematic diagram of a first power value according to one embodiment of the present disclosure; as shown in FIG. 40. In Embodiment 40, the first power value is a minimum value of the first reference power value and the third reference power value.

In one embodiment, the first reference power value and the third reference power value are jointly used for determining the first power value.

In one embodiment, the first power value is no greater than the third reference power value.

In one embodiment, the first power value is equal to the third reference power value.

In one embodiment, the first power value is less than the third reference power value.

Embodiment 41

Embodiment 41 illustrates a schematic diagram of a first power value according to one embodiment of the present disclosure; as shown in FIG. 41. In Embodiment 41, the first power value is a minimum value among the first reference power value, the third reference power value and a first power threshold.

Embodiment 42

Embodiment 42 illustrates a schematic diagram of a first power value according to one embodiment of the present disclosure; as shown in FIG. 42. In Embodiment 42, the first power value is a minimum value among the first reference power value, the third reference power value, a first power threshold and a third power threshold.

In one embodiment, the third power threshold is measured in Watts.

In one embodiment, the third power threshold is measured in dBm.

In one embodiment, the third power threshold is related to a priority level of the first signal.

In one embodiment, the third power threshold is related to a Channel Busy Ratio (CBR) measured in a slot (i-N); the first signal is transmitted in a slot i, and N refers to congestion control processing time.

In one embodiment, the first power threshold is a maximum Tx power of the first node in uplink, while the third power threshold is a maximum Tx power of the first node in sidelink.

Embodiment 43

Embodiment 43 illustrates a schematic diagram of a third reference power value according to one embodiment of the present disclosure; as shown in FIG. 43. In Embodiment 43, the third reference power value is linearly correlated with the third pathloss; and a linear coefficient between the third reference power value and the third pathloss is a third coefficient. The symbol " " illustrated in FIG. 43 denotes a linear correlation.

In one embodiment, the third reference power value is measured in Watts.

In one embodiment, the third reference power value is measured in dBm.

In one embodiment, the third pathloss is measured in dB.

In one embodiment, the third pathloss is equal to a Tx power of a third reference signal being subtracted by an RSRP of the third reference signal; the third reference signal comprises a sidelink reference signal.

In one embodiment, the third pathloss is equal to a Tx power of a third reference signal, which is measured in dBm, being subtracted by an RSRP of the third reference signal, which is also measured in dBm; the third reference signal comprises a sidelink reference signal.

In one embodiment, the third reference signal comprises an SL CSI-RS.

In one embodiment, the third reference signal comprises an SL DMRS.

In one embodiment, the third reference signal comprises an SRS.

In one embodiment, the third reference signal comprises an SL SS/PSBCH block.

In one embodiment, a transmitter of the third reference signal is a target receiver of the first signal.

In one embodiment, a transmitter of the third reference signal is the first node.

In one embodiment, a transmitter of the third reference signal is different from a target receiver of the first signal and the first node.

In one embodiment, the third signal comprises the third reference signal.

In one embodiment, the third signal comprises an RSRP of the third reference signal.

In one embodiment, the third coefficient is a non-negative real number no greater than 1.

In one embodiment, the third coefficient is configured by a higher layer parameter.

In one embodiment, the third coefficient is pre-configured.

In one embodiment, the third coefficient is α_SL used for power control in sidelink.

In one embodiment, the third coefficient is α_SL based on measurement of SL pathloss and used for power control in sidelink.

In one embodiment, the third reference power value is linearly correlated to a third component, and a linear coefficient between the third reference power value and the third component is 1; the third component is a Target power.

In one subembodiment, the third component is P_(O,SL) used for sidelink power control.

In one subembodiment, the third component is P_(O,SL) based on measurement of SL pathloss and used for sidelink power control.

In one subembodiment, the third component is pre-configured.

In one subembodiment, the third component is configured by a higher layer parameter.

In one embodiment, the third reference power value is linearly correlated to a second component, and a linear coefficient between the third reference power value and the second component is 1; the second component is related to a bandwidth allocated to the first signal.

In one embodiment, the third reference power value is linearly correlated to the third pathloss, the third component and the second component respectively; the linear coefficient between the third reference power value and the third pathloss is the third coefficient; linear coefficients between the third reference power value and the third component, and the third reference power value and the second component are 1, respectively.

Embodiment 44

Embodiment 44 illustrates a schematic diagram of a first information block according to one embodiment of the present disclosure; as shown in FIG. 44. In Embodiment 44, the first information block is used for determining configuration information of the first reference signal.

In one embodiment, the configuration information of the first reference signal comprises one or more of a time-domain resource, a frequency-domain resource, a code-domain resource, an RS sequence, a mapping mode, a cyclic shift, an OCC, a frequency-domain spreading sequence, or a time-domain spreading sequence.

In one embodiment, the configuration information of the first reference signal comprises an index of the first reference signal.

In one embodiment, the configuration information of the first reference signal comprises a TCI state.

In one embodiment, the first information block is carried by a higher layer signaling.

In one embodiment, the first information block is carried by an RRC signaling.

In one embodiment, the first information block is carried by a MAC CE signaling.

In one embodiment, the first information block is carried by an SSB.

In one embodiment, the first information block comprises information of all or part of fields in an IE.

In one embodiment, the first information block comprises information of all or part of fields in a ControlResourceSet IE.

In one embodiment, the first information block comprises all or part of information in an SSB.

In one embodiment, the first information block comprises all or part of information in a Physical Broadcast Channel (PBCH) payload corresponding to an SSB.

In one embodiment, the first information block is transmitted via a Uu interface.

In one embodiment, the first information block is transmitted in downlink.

In one embodiment, the first reference signal comprises an SSB, and a DMRS sequence of a PBCH carrying the first information block is used for determining all or part of bits comprised in an index of the first reference signal.

In one embodiment, the first reference signal comprises an SSB, and the first information block indicates part of bits comprised in an index of the first reference signal.

In one embodiment, the first information block indicates configuration information of the first reference signal.

In one embodiment, the first reference signal comprises a CSI-RS, and the first information block indicates an index of the first reference signal.

Embodiment 45

Embodiment 45 illustrates a structure block diagram of a processing device in a first node according to one embodiment of the present disclosure; as shown in FIG. 45. In FIG. 45, a processing device 4500 in a first node comprises a first receiver 4501 and a first transmitter 4502.

In Embodiment 45, the first receiver 4501 receives a first reference signal; the first transmitter 4502 transmits a first signal.

In Embodiment 45, a transmitting (Tx) power of the first signal is a first power value, a first reference power value is used for determining the first power value, and the first reference power value is linear with a first pathloss; a first spatial domain filter is used for transmitting the first signal; the first receiver 4501 uses the first spatial domain filter to measure the first reference signal to obtain the first pathloss; a transmitter of the first reference signal is different from a target receiver of the first signal.

In one embodiment, a measurement on the first reference signal is used for determining a second spatial domain filter, the first spatial domain filter being different from the second spatial domain filter.

In one embodiment, the first transmitter 4502 transmits a second signal; herein, a transmitting (Tx) power of the second signal is a second power value, the second reference power value is used for determining the second power value, and the second reference power value is linear with a second pathloss; the first receiver 4501 uses a second spatial domain filter to measure the first reference signal to obtain the second pathloss; a transmitter of the first reference signal is the same as a target receiver of the second signal.

In one embodiment, the first receiver 4501 receives other reference signal(s) of K first-type reference signals other than the first reference signal, K being a positive integer greater than 1, the first reference signal being one of the K first-type reference signals; herein, the first receiver 4501 uses the first spatial domain filter to measure the K first-type reference signals respectively to obtain K pathlosses; the first pathloss is a smallest one of the K pathlosses; a transmitter of any first-type reference signal of the K first-type reference signals is a transmitter of the first reference signal.

In one embodiment, the first spatial domain filter is one of P spatial domain filters, P being a positive integer; the first receiver 4501 uses the P spatial domain filters to measure the first reference signal respectively to obtain P pathlosses, and the P pathlosses are used for determining the first spatial domain filter out of the P spatial domain filters.

In one embodiment, the first receiver 4501 receives a third signal; herein, the third signal is used to determine a third pathloss; the first reference power value and a third reference power value are jointly used for determining the first power value, the third reference power value being linear with the third pathloss; a transmitter of the third signal is different from a transmitter of the first reference signal.

In one embodiment, the first receiver 4501 receives a first information block; herein, the first information block is used for determining configuration information of the first reference signal.

In one embodiment, the first node is a UE.

In one embodiment, the first node is a relay node.

In one embodiment, the first receiver 4501 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 4502 comprises at least one of the antenna 452, the transmitter 454, the transmitting processor 468, the multi-antenna transmitting processor 457, the controller/processor 459, the memory 460 or the data source 467 in Embodiment 4.

Embodiment 46

Embodiment 46 illustrates a structure block diagram of a processing device in a second node according to one embodiment of the present disclosure; as shown in FIG. 46. In FIG. 46, a processing device 4600 in a second node comprises a first processor 4601.

In Embodiment 46, the first processor 4601 transmits a first reference signal.

In Embodiment 46, a transmitter of a first signal uses a first spatial domain filter to measure the first reference signal to obtain a first pathloss; a transmitting (Tx) power of the first signal is a first power value, a first reference power value is used for determining the first power value, and the first reference power value is linear with the first pathloss; the first spatial domain filter is used for transmitting the first signal; a target receiver of the first signal is different from the second node.

In one embodiment, a measurement on the first reference signal is used for determining a second spatial domain filter, the first spatial domain filter being different from the second spatial domain filter.

In one embodiment, the first processor 4601 receives a second signal; herein, a transmitting (Tx) power of the second signal is a second power value, the second reference power value is used for determining the second power value, and the second reference power value is linear with a second pathloss; a transmitter of the first signal uses a second spatial domain filter to measure the first reference signal to obtain the second pathloss; a target receiver of the second signal is the second node.

In one embodiment, the first processor 4601 transmits other reference signal(s) of K first-type reference signals other than the first reference signal, K being a positive integer greater than 1, the first reference signal being one of the K first-type reference signals; herein, a transmitter of the first signal uses the first spatial domain filter to measure the K first-type reference signals respectively to obtain K pathlosses; the first pathloss is a smallest one of the K pathlosses.

In one embodiment, the first spatial domain filter is one of P spatial domain filters, P being a positive integer; a transmitter of the first signal uses the P spatial domain filters to measure the first reference signal respectively to obtain P pathlosses, and the P pathlosses are used for determining the first spatial domain filter out of the P spatial domain filters.

In one embodiment, a third signal is used to determine a third pathloss; the first reference power value and a third reference power value are jointly used for determining the first power value, the third reference power value being linear with the third pathloss; a transmitter of the third signal is different from a transmitter of the first reference signal.

In one embodiment, the first processor 4601 transmits a first information block; herein, the first information block is used for determining configuration information of the first reference signal.

In one embodiment, the second node is a base station.

In one embodiment, the second node is a relay node.

In one embodiment, the first processor 4601 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

Embodiment 47

Embodiment 47 illustrates a structure block diagram of a processing device in a third node according to one embodiment of the present disclosure; as shown in FIG. 47. In FIG. 47, a processing device 4700 in a third node comprises a second processor 4701.

In Embodiment 47, the second processor 4701 receives a first signal.

In Embodiment 47, a transmitting (Tx) power of the first signal is a first power value, a first reference power value is used for determining the first power value, and the first reference power value is linear with a first pathloss; a first spatial domain filter is used for transmitting the first signal; a transmitter of the first signal uses the first spatial domain filter to measure a first reference signal to obtain the first pathloss; a transmitter of the first reference signal is different from the third node.

In one embodiment, a measurement on the first reference signal is used for determining a second spatial domain filter, the first spatial domain filter being different from the second spatial domain filter.

In one embodiment, a transmitter of the first signal transmits a second signal, and a target receiver of the second signal is the same as a transmitter of the first reference signal; a Tx power of the second signal is a second power value, the second reference power value is used for determining the second power value, and the second reference power value is linear with a second pathloss; a transmitter of the first signal uses a second spatial domain filter to measure the first reference signal to obtain the second pathloss.

In one embodiment, the first reference signal is one of K first-type reference signals, K being a positive integer greater than 1; a transmitter of the first signal uses the first spatial domain filter to measure the K first-type reference signals respectively to obtain K pathlosses; the first pathloss is a smallest one of the K pathlosses; a transmitter of any first-type reference signal of the K first-type reference signals is a transmitter of the first reference signal.

In one embodiment, the first spatial domain filter is one of P spatial domain filters, P being a positive integer; the first receiver 4501 uses the P spatial domain filters to measure the first reference signal respectively to obtain P pathlosses, and the P pathlosses are used for determining the first spatial domain filter out of the P spatial domain filters.

In one embodiment, a third signal is used by a transmitter of the first signal for determining a third pathloss; the first reference power value and a third reference power value are jointly used for determining the first power value, the third reference power value being linear with the third pathloss; a transmitter of the third signal is different from a transmitter of the first reference signal.

In one embodiment, the second processor 4701 transmits the third signal.

In one embodiment, the third node is a UE.

In one embodiment, the third node is a relay node.

In one embodiment, the second processor 4701 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first processor, transmitting a first signal set;
wherein time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is allowed to trigger a second CSI report in the first time window; when the first condition set is fulfilled, the first node is not allowed to trigger the second CSI report in the first time window; when the first condition set is not fulfilled, the first node is allowed to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

2. The first node according to claim 1, wherein the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

3. The first node according to claim 2, wherein time-domain resources occupied by the S signals are respectively used for determining S time windows, and the S time windows are used for determining the first time window.

4. The first node according to claim 1, wherein the first processor receives a first information block; wherein the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first received quality and the second received quality being real numbers respectively, the first received quality being unequal to the second received quality.

5. The first node according to claim 4, wherein the first processor transmits a third signal in a first time-frequency resource block; wherein a target receiver of the third signal is a target receiver of the first signal set; a target channel quality is used for determining a Modulation and Coding Scheme (MCS) of the third signal, and the target channel quality is either the first channel quality or the second channel quality; whether the first time-frequency resource block is reserved is used for determining the target channel quality between the first channel quality and the second channel quality.

6. The first node according to claim 1, wherein the first processor transmits a second information block; wherein the second information block comprises configuration information of the first reference signal and a first parameter, the first parameter being used to determine the first time window.

7. The first node according to claim 1, wherein the first sub-signal comprises SCI, the first reference signal comprises an SL reference signal.

8. A second node for wireless communications, comprising:
a second processor, receiving a first signal set;
wherein time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether a transmitter of the first signal set is allowed to trigger a second CSI report in the first time window; when the first condition set is fulfilled, the transmitter of the first signal set is not allowed to trigger the second CSI report in the first time window; when the first condition set is not fulfilled, the transmitter of the first signal set is allowed to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

9. The second node according to claim 8, wherein the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

10. The second node according to claim 9, wherein time-domain resources occupied by the S signals are respectively used for determining S time windows, and the S time windows are used for determining the first time window.

11. The second node according to claim 8, wherein the second processor transmits a first information block; wherein the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first received quality and the second received quality being real numbers respectively, the first received quality being unequal to the second received quality.

12. The second node according to claim 11, wherein the second processor receives a third signal in a first time-frequency resource block; wherein a transmitter of the third signal is a transmitter of the first signal set; a target channel quality is used for determining an MCS of the third signal, and the target channel quality is either the first channel quality or the second channel quality; whether the first time-frequency resource block is reserved is used for determining the target channel quality between the first channel quality and the second channel quality.

13. The second node according to claim 8, wherein the second processor receives a second information block; wherein the second information block comprises configuration information of the first reference signal and a first parameter, the first parameter being used to determine the first time window.

14. The second node according to claim 8, wherein the first sub-signal comprises SCI, the first reference signal comprises an SL reference signal.

15. A method in a first node for wireless communications, comprising:
transmitting a first signal set;
wherein time-domain resource(s) occupied by one or more signals comprised in the first signal set is(are) used for determining a first time window; the first signal set comprises a first signal, the first signal comprising a first sub-signal and a first reference signal; the first sub-signal comprises a first field, and the first field of the first sub-signal is used for triggering a first CSI report; a first condition set is used for determining whether the first node is allowed to trigger a second CSI report in the first time window; when the first condition set is fulfilled, the first node is not allowed to trigger the second CSI report in the first time window; when the first condition set is not fulfilled, the first node is allowed to trigger the second CSI report in the first time window; the first condition set comprises at least one of a first condition or a second condition; the first condition comprises that a number of signals comprised in the first signal set is no less than a first threshold; the second condition comprises that a first index is equal to a second index, the first CSI report is associated with the first index, and the second CSI report is associated with the second index.

16. The method according to claim 15, wherein the first signal set comprises S signals, S being a positive integer greater than 1; the first signal is one of the S signals; the S signals respectively comprise S first-type sub-signals, and the S signals respectively comprise S reference signals; any one of the S first-type sub-signals comprises the first field, and the first fields respectively comprised by the S first-type sub-signals are respectively used for triggering S CSI reports; the S signals share a same target receiver.

17. The method according to claim 16, wherein time-domain resources occupied by the S signals are respectively used for determining S time windows, and the S time windows are used for determining the first time window.

18. The method according to claim 15, comprising:
receiving a first information block;
wherein the first information block comprises a first channel quality and a second channel quality; a measurement on the first reference signal is used for determining the first channel quality and the second channel quality, the first channel quality and the second quality are for a same frequency-domain resource, and respectively correspond to a first received quality and a second received quality, the first received quality and the second received quality being real numbers respectively, the first received quality being unequal to the second received quality.

19. The method according to claim 18, comprising:
transmitting a third signal in a first time-frequency resource block;
wherein a target receiver of the third signal is a target receiver of the first signal set; a target channel quality is used for determining a Modulation and Coding Scheme (MCS) of the third signal, and the target channel quality is either the first channel quality or the second channel quality; whether the first time-frequency resource block is reserved is used for determining the target channel quality between the first channel quality and the second channel quality.

20. The method according to claim 15, comprising:

transmitting a second information block;

wherein the second information block comprises configuration information of the first reference signal and a first parameter, the first parameter being used to determine the first time window.

\* \* \* \* \*